US006992796B1

(12) United States Patent
Taka et al.

(10) Patent No.: US 6,992,796 B1
(45) Date of Patent: Jan. 31, 2006

(54) IMAGE FORMING APPARATUS AND IMAGE PROCESSING METHOD USED FOR THE SAME

(75) Inventors: Kyosuke Taka, Nara (JP); Akihito Yoshida, Kuse-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 960 days.

(21) Appl. No.: 09/653,970

(22) Filed: Sep. 1, 2000

(30) Foreign Application Priority Data

Sep. 3, 1999 (JP) ................................. 11-250781

(51) Int. Cl.
G06F 15/00 (2006.01)
G03F 3/08 (2006.01)

(52) U.S. Cl. ........................................ 358/1.9; 358/521

(58) Field of Classification Search ................. 358/1.9, 358/521, 504, 514, 518; 382/193, 199, 219, 382/165
See application file for complete search history.

(56) References Cited

U.S. PATENT DOCUMENTS

| | | | | |
|---|---|---|---|---|
| 5,206,686 | A | * | 4/1993 | Fukui et al. .................... 399/1 |
| 5,389,955 | A | * | 2/1995 | Suzuki ......................... 347/112 |
| 5,463,473 | A | | 10/1995 | Yamanda et al. ............ 358/300 |
| 5,579,090 | A | | 11/1996 | Sasanuma et al. |
| 5,657,395 | A | | 8/1997 | Hirota ......................... 382/163 |
| 5,832,184 | A | * | 11/1998 | Konno et al. ................. 358/1.2 |
| 5,856,876 | A | * | 1/1999 | Sasanuma et al. ............ 358/300 |
| 6,034,788 | A | * | 3/2000 | Sasanuma et al. ............ 358/406 |
| 6,055,071 | A | | 4/2000 | Kuwata et al. |
| 6,061,144 | A | | 5/2000 | Mamizuka |
| 6,115,561 | A | * | 9/2000 | Fukushima ................... 399/49 |
| 6,404,510 | B1 | * | 6/2002 | Sawano et al. .............. 358/1.9 |
| 6,505,909 | B1 | * | 1/2003 | Kato et al. ..................... 347/19 |

FOREIGN PATENT DOCUMENTS

| | | |
|---|---|---|
| DE | 196 43 135 A1 | 4/1997 |
| DE | 197 19 742 A1 | 1/1998 |
| EP | 0 794 657 A2 | 8/1996 |
| EP | 0 840 497 A2 | 5/1998 |
| JP | 60-073654 | 4/1985 |
| JP | 05-088493 | 4/1993 |
| JP | 06-110286 | 4/1994 |
| JP | 06-194918 | 7/1994 |
| JP | 6-95240 | 11/1994 |
| JP | 7-160075 | 6/1995 |
| JP | 07-264411 | 10/1995 |
| JP | 8-202092 | 8/1996 |

(Continued)

*Primary Examiner*—Madeleine Nguyen
(74) *Attorney, Agent, or Firm*—David G. Conlin; David A. Tucker; Edwards Angell Palmer & Dodge LLP

(57) ABSTRACT

When an image forming means forms a reading gradation pattern chart, gradation patterns are formed so as to prevent an intensified electric field caused by a potential difference at a boundary of an electrostatic latent image on the gradation patterns, which are adjacent to each other in a sub-scanning direction of an image forming section. With this arrangement, an image forming apparatus for suitably correcting the gradation pattern can adjust image forming conditions in a positive and appropriate manner.

12 Claims, 38 Drawing Sheets

FOREIGN PATENT DOCUMENTS

| | | |
|---|---|---|
| JP | 09-018726 | 1/1997 |
| JP | 2643951 | 5/1997 |
| JP | 09-197775 | 7/1997 |
| JP | 10-145598 | 5/1998 |
| JP | 10-173942 | 6/1998 |
| JP | 10-226103 | 8/1998 |
| JP | 10-278347 | 10/1998 |
| JP | 11-102099 | 4/1999 |
| JP | 11-218974 | 8/1999 |
| WO | WO 97/42033 | 11/1997 |

* cited by examiner

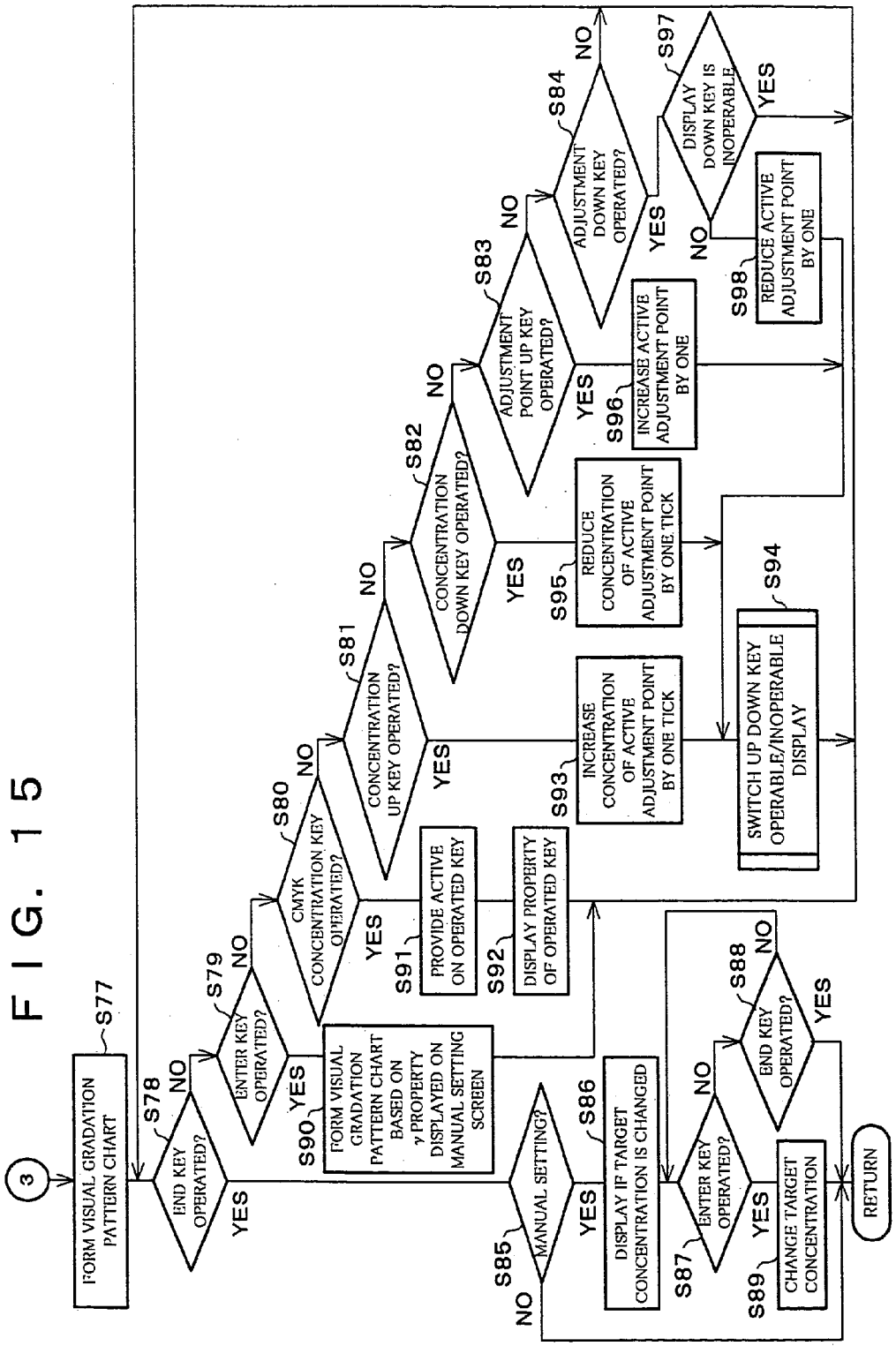
F I G. 15

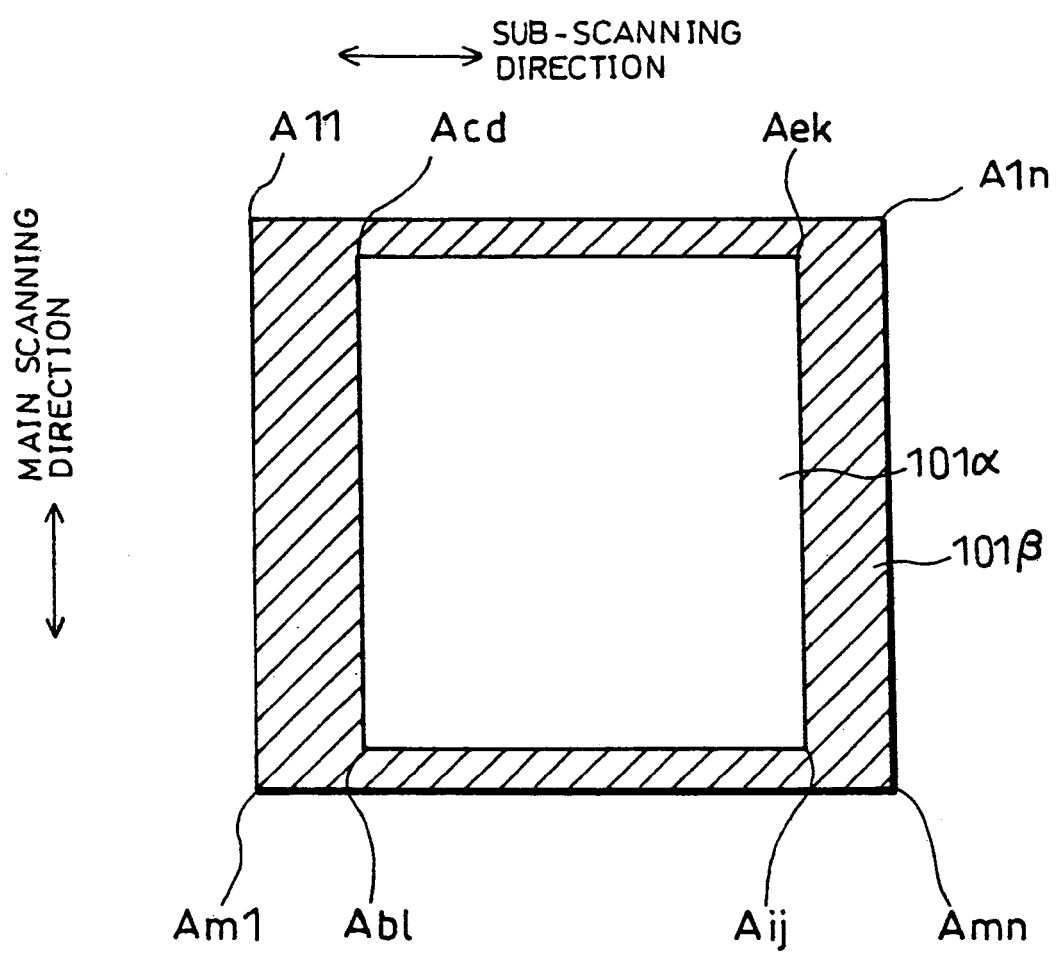

IMAGE FORMING APPARATUS AND IMAGE PROCESSING METHOD USED FOR THE SAME

FIELD OF THE INVENTION

The present invention relates to an image processing device for forming an image of multi-step gradation, an image forming apparatus including the image processing device, and a method for determining an input/output property of the image forming apparatus.

BACKGROUND OF THE INVENTION

Conventionally, in an image forming apparatus such as a printer and a copying machine, when an image is outputted based on inputted image data of multi-step gradation, the gradation of the inputted image data is corrected so as to precisely reproduce the gradation thereof according to a property of a device adopted for an input or output system.

Such a technique for correcting gradation is disclosed in publications such as ① Japanese Laid-Open Patent Publication No. 173942/1998 (Tokukaihei 10-173942, published on Jun. 26, 1998) and ② Japanese Laid-Open Patent Publication No. 278347/1998 (Tokukaihei 10-278347, published on Oct. 20, 1998).

In technique ①, firstly, a reference patch (gradation pattern) is formed on a light sensitive element, a target concentration value of the reference patch is stored and is directly read by an image reading means, and then, correction data is generated for correcting a property of concentration gradation on a formed image, according to a difference between the stored target concentration value and an actually read concentration value. Hence, the gradation can be corrected in a short time with high accuracy.

In technique ②, based on pattern information, in which test patterns (gradation pattern) with continuous gradation are formed so as to be adjacent to one another, a test pattern is formed in which different gradations are aligned in a two-dimensional manner, and the image forming conditions are controlled by reading the test pattern. Thus, it is possible to precisely detect a property of an image forming means, so that correction can be made to preferably form an image.

Moreover, when forming an image of the gradation pattern as a chart on a sheet in order to make the above gradation correction, if an electrostatic latent image corresponding to the gradation pattern is formed on a light sensitive element, a part such as an end of the gradation pattern rapidly changes its electrostatic potential. Such a part has a concentration higher than the original one. This phenomenon is generally called an edge effect. Technique such as ③ Japanese Laid-Open Patent Publication No. 160075/1995 (Tokukaihei 7-160075, published on Jun. 23, 1995) is disclosed for preventing the edge effect.

In technique ③, a quantity of reflected light is detected by a toner adhesion part and the other part on the light sensitive element, the detection result is subjected to time quadrature with a first degree or more, a maximum value of the time quadrature result is detected, and the concentration of the image is controlled according to a ratio of a maximum value of the detected adhesion part and a maximum value of the other part. Therefore, the concentration control is not affected by the edge effect.

Moreover, regarding an image forming apparatus using an electrophotographic process, a technique is available in which a base color is detected under a sheet having an image thereon, and the concentration of a formed image is adjusted according to the base color. With this arrangement, a desirable image can be formed according to the base color of the sheet. Such a technique is disclosed in ④ Japanese Laid-Open Patent Publication No. 230870/1990 (Tokukaihei 2-230870, published on Sep. 13, 1990, corresponding to U.S. Pat. No. 5,657,395) and ⑤ Japanese Laid-Open Patent Publication No. 145598/1998 (Tokukaihei 10-145598, published on May 29, 1998) and others.

In technique ④, before a final scan for reading a document, that is performed for outputting an image signal, a maximum concentration and a base concentration of a predetermined area on the document are detected so as to compute concentration coefficient data for correcting image data and base data which corresponds to the base concentration. Further, in the final scan, a base removing means reduces the image data according to the base data. A concentration correcting/operating means performs an operation for increasing an output from the base removing means according to the concentration coefficient data, and outputs a resulting correction image data. This arrangement makes it possible to form a clear image with high contrast regardless of a concentration of the base.

Next, in technique ⑤, a plurality of reference patches are formed with different concentrations, and a concentration on each of the reference patches and the base are measured. A reference correction of the base is computed according to a measurement value and a predetermined target value of the base concentration, and regarding each of the reference patches, a concentration measurement value or a predetermined target value of concentration is corrected according to correction quantity, which is not more than the computed reference base correction and decreases as the concentration of the reference patch is higher. With this arrangement, it is possible to reduce errors resulted from a various kinds of sheets on a highlighted part and a various kinds of concentration measurement devices, while preventing excessive correction on a high-concentration part.

Additionally, when the gradation pattern is read by an image reading means, interference may appear between spacial frequencies of a document having the gradation pattern thereon and a CCD (image reading means), resulting in moire, etc. ⑥ Japanese Examined Patent Publication No. 95240/1994 (Tokukohei 6-95240, published on Nov. 24, 1994) discloses a technique for preventing such interference.

In technique ⑥, when a test chart is read by the image reading means, an optical path length of an image-forming optical system in the image reading means is changed from an optical path length used for reading an ordinary document; thus, a spacial frequency of the image reading means is changed so as to prevent interference between spacial frequencies of the image reading means and an image outputting means. Therefore, it is possible to precisely read a test chart by the image reading means and to precisely adjust a property. Besides, the property adjustment does not depend upon a spacial frequency of the image output means, so that a property can be automatically adjusted in response to a variety of image outputting means having different spacial frequencies.

In addition, a relationship between a concentration input value and a concentration output value is generally referred to as γ property. Namely, the γ property is a parameter indicating a scale of gradation. The γ property is arbitrarily corrected so as to adjust the gradation of a formed image in a suitable manner. Technique ① and ⑦ Japanese Patent Publication No. 2643951 (Patent No. 2643951, published on Aug. 25, 1997) relates to a technique for correcting the γ property.

In technique ①, as described above, correction data, which corrects a property of concentration gradation (γ property) on a formed image, is generated according to a difference between the stored target concentration value and an actually read concentration value.

In technique ⑦, correction data of the image reading means is generated based on image data of a reference chart that is read by an image reading means. An image is corrected by an output means according to reference data for correcting the output means and is read by the image reading means which is corrected by the generated correction data. Correction data of the outputting means is generated based on the read image data.

With this arrangement, the image reading means and the output means can be separately corrected, and it is possible to precisely correct a change in properties of means. Moreover, at this point, the image reading means for correcting a property is used for generating correction data of the output means. Hence, the output means can be corrected with a simple construction without the necessity for a special input device.

Incidentally, a main scanning direction is more susceptible to the edge effect than a sub-scanning direction. Further, regarding an image forming apparatus using an electrophotographic process, when an electrostatic latent image is developed so as to correspond to a gradation pattern, a concentration of toner is determined based on a concentration of a representative place. The toner concentration decides if the toner should be replenished or not. For this reason, if gradation patterns with high concentration successively appear in the sub-scanning direction, responsivity in replenishing the toner may be deteriorated.

Therefore, without considering the edge effect and responsivity in replenishing the toner to an electrostatic latent image, it is not possible to form a gradation pattern having suitable gradation. Also, it is not possible to read a concentration of the gradation pattern by the image reading means, resulting in improper adjustment of the image forming apparatus.

However, techniques ① and ② do not discuss a reduction in accuracy of reading, that occurs on the gradation pattern due to the edge effect. Further, technique ③ can correct uneven concentrations that appear on the gradation pattern due to the edge effect. However, the responsivity of a developing bias, etc. is less likely to change in response to an edge of the gradation pattern. Consequently, the gradation pattern is less likely to have a desired concentration, so that a suitable gradation pattern cannot be achieved.

Meanwhile, in techniques ④ and ⑤ relating to image correction based on a base color of a sheet having an image formed thereon, image data is read and is simply corrected according to base data of the sheet. Here, a zero level regarding a reading value of the image reading means is determined by reading a reference whiteboard. Regarding the sheet having a gradation pattern thereon, when a degree of white is higher than the reading value of the reference whiteboard, the base and the gradation pattern cannot achieve a suitable contrast for gradation correction.

Therefore, when the gradation pattern is read on the sheet, a readout value of the gradation pattern does not correspond to a white level of the base, so that the image reading means cannot obtain a suitable reading value, resulting in insufficient gradation correction. Namely, it is not possible to effectively use the formed gradation pattern.

Besides, in technique ⑥ for preventing interference between spacial frequencies of a document and the image reading means, an optical path length of the image-forming optical system is changed to prevent interference. Namely, in technique ⑥, a mechanical means is necessary for changing the optical length, and a driving means is further required for improving accuracy of reading a gradation pattern. For this reason, the construction of the apparatus becomes more complicated.

In techniques ① and ⑦, simply, the gradation pattern is read and a curve of a reference γ property is changed accordingly. Moreover, when correcting gradation of an image, a visual gradation pattern chart may be used in addition to a reading gradation pattern chart which is read by the image reading means. The visual gradation pattern chart prevents an inter-gradation concentration from being recognized as a different concentration. However, the foregoing techniques do not discuss the setting of the number of the reading gradation patterns and the number of the visual gradation patterns.

SUMMARY OF THE INVENTION

The objective is to provide an image forming apparatus, in which gradation patterns are formed and are read by an image reading means so as to suitably correct the gradation, wherein a chart of the gradation patterns is formed in view of an edge effect and responsivity in replenishing toner so as to achieve a more suitable reading concentration of the gradation pattern, thereby adjusting image forming conditions in a positive and appropriate manner.

Another objective of the present invention is to provide an image forming apparatus, in which when reading the gradation pattern, a base of a sheet having the gradation patterns thereon is corrected so as to achieve a more suitable reading concentration of the gradation patterns, thereby adjusting image forming conditions in a positive and appropriate manner.

Still another objective of the present invention is to provide an image forming apparatus, in which when reading the gradation patterns, accuracy of reading the gradation patterns can be readily improved without the necessity for a complicated device using a mechanical means.

Still another objective of the present invention is to provide an image forming apparatus, in which the gradation patterns are read and a relationship between an input concentration and a dither value is obtained so as to readily determine a γ property in an appropriate manner, and an image processing method used for the apparatus.

In order to attain the above objectives, the image forming apparatus of the present invention, including:
- an image forming section for forming a pattern chart having a plurality of gradation patterns aligned thereon so as to suppress uneven concentrations appearing depending upon a scale of an electrostatic potential difference on the gradation patterns which are adjacent to each other in a sub-scanning direction of image formation,
- an image reading section for reading image information from the pattern chart, and
- an image processing section for adjusting image forming conditions based on the image information.

According to this arrangement, the pattern chart having a plurality of the gradation patterns aligned thereon is formed by the image forming section. Based on image information read from the pattern chart by the image reading section, the image processing section adjusts the image forming conditions.

A conventional image forming apparatus was not devised in view of a reduction in accuracy of reading the gradation patterns, that is caused by an edge effect appearing on the gradation pattern at an end of the pattern chart. Thus, it was not possible to obtain an original desired concentration on the gradation pattern at the end of the pattern chart. Consequently, the obtained pattern does not have a proper gradation, so that the image forming conditions of the image forming apparatus cannot be suitably adjusted.

Meanwhile, according to the arrangement of the present invention, on the pattern chart, a plurality of the gradation patterns are aligned so as to suppress uneven concentrations which appear depending upon an electrostatic potential difference on the gradation patterns adjacent to each other in a sub-scanning direction of image formation.

As described above, in the present invention, a plurality of gradation patterns are aligned so as to suppress uneven concentrations in a sub-scanning direction, considering that uneven concentrations caused by the edge effect are likely to appear in the sub-scanning direction rather than in a main scanning direction. Therefore, the arrangement of the present invention makes it possible to positively form an image having even concentrations both in the main scanning direction and in the sub-scanning direction.

Moreover, in the image forming apparatus of the present invention, the image processing section preferably processes the image information read by the image reading section with a base color of the pattern chart serving as a reference level, and preferably adjusts image forming conditions based on the processed image information.

According to the above arrangement, the base is corrected when the gradation patterns are read. Thus, it is possible to prevent a reduction in accuracy of reading the gradation patterns and to adjust the image forming conditions in a positive and appropriate manner.

Also, in order to attain the foregoing objectives, another image forming apparatus of the present invention, including:
an image forming section for forming a pattern chart having a plurality of gradation patterns aligned thereon,
an image reading section for reading image information from the pattern chart, and
an image processing section for adjusting image forming conditions based on the image information,
wherein the image forming section forms the pattern chart such that the image reading section has a larger output value on a high-concentration gradation pattern than on a low-concentration gradation pattern.

With this arrangement, a desired gradation can be obtained without reversing the order of a low-concentration gradation and a high-concentration gradation.

Besides, in order to attain the foregoing objectives, an image processing method of the present invention includes:
a step 'a' of reading a predetermined gradation pattern,
a step 'b' of obtaining a relationship between a target readout value serving as an input value of image formation and a readout reference value which is outputted as a resulting value of the reading and is used as an input value of image formation,
a step 'c' of forming a reading pattern chart composed of a plurality of gradation patterns corresponding to a plurality of dither values,
a step 'd' of obtaining a relationship between an actual readout value obtained by reading the reading pattern chart and the corresponding dither value, and
a step 'e' of obtaining a relationship between an input value and a dither value during image formation based on the relationships obtained in the steps 'b' and 'd'.

With this method, it is possible to determine a property in a simple and precise manner based on the relationship between an input value and a dither value. Therefore, an obtained γ property is arbitrarily corrected so as to suitably adjust the gradation of a formed image.

For a fuller understanding of the nature and advantages of the invention, reference should be made to the ensuing detailed description taken in conjunction with the accompanying drawings.

BRIEF DESCRIPTION OF THE DRAWINGS

FIG. 15 is a flowchart showing the following steps of the flowchart shown in FIG. 14.

FIG. 35 is an explanatory drawing showing an outline of a concentration distribution on each of the gradation patterns in the reading gradation pattern chart of FIG. 1.

FIG. 36($b$) is an explanatory drawing showing a relationship between the gradation patterns and a pixel when the CCD reads the reading gradation pattern chart of FIG. 1.

DESCRIPTION OF THE EMBODIMENTS

Referring to FIGS. 1 to 40, the following explanation describes one embodiment of the present invention. Here, the present invention is not limited to the present embodiment.

In an image forming apparatus of the present invention, in order to correct gradation, a gradation pattern is generated in which different gradations are aligned respectively for image forming means. In this case, a concentration difference, which occurs between areas adjacent to each other in a sub-scanning direction of the image forming means in the gradation pattern, is set within a predetermined value, so that the concentration of the gradation pattern is not affected by an edge effect.

Further, in the image forming apparatus of the present invention, a dynamic range is expanded by correcting the base of the gradation pattern, and the image filter is made equal in size to a dither matrix of a gradation pattern during a reading of the gradation pattern, so as to realize a more suitable reading concentration of the gradation pattern. Thus, it is possible to adjust the image forming conditions of the image forming apparatus in an appropriate manner.

Furthermore, in the image forming apparatus and an image processing method used for the same, a relationship between an output concentration of an image forming means and a dither value obtained by a multilevel dither method is found based on a readout value and a reference readout value of an image reading means (image information input means). The readout value is obtained by reading a gradation pattern corresponding to a known dither value by the image reading means, and the reference readout value corresponds to a target image forming concentration. With this arrangement, a γ property can be readily determined in an appropriate manner.

Figure 2:
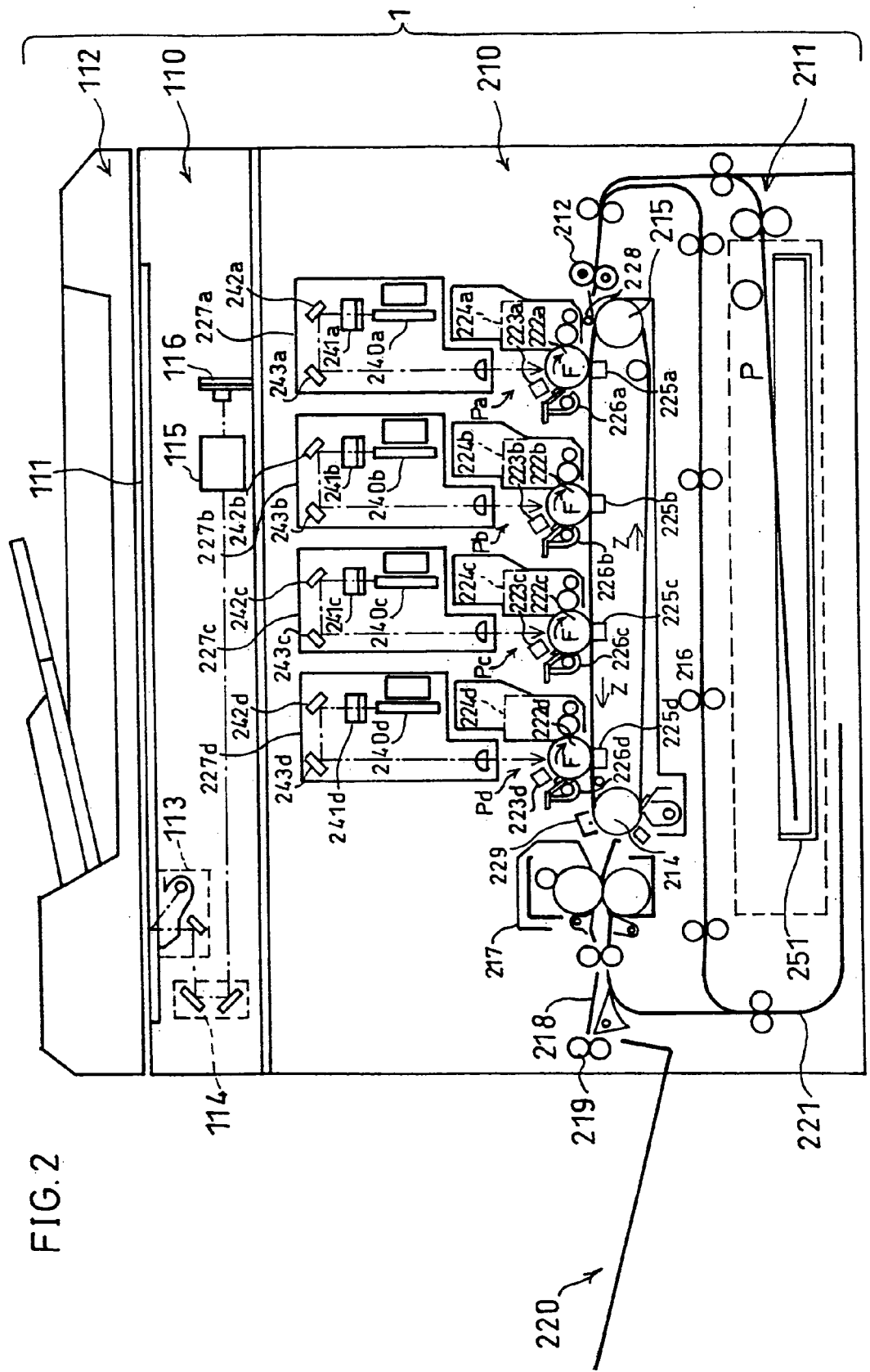
FIG. 2 is sectional view schematically showing the construction of the image forming apparatus according to the present invention using the gradation pattern charts of FIG. 1.

Firstly, the construction of the image forming apparatus is discussed according to the present invention. As shown in FIG. 2, a digital color copying machine (hereinafter, simply referred to as an image forming apparatus 1) is adopted as the image forming apparatus of the present invention. The image forming apparatus is provided with a color image reading section (image reading means, hereinafter, simply referred to as an image reading section) 110 in the upper part, a color image forming section (hereinafter, simply referred to as an image forming section) 210 in the lower part, and an image processing section 2 (not shown, described later).

In the image forming apparatus 1, a document table 111, a reversing automatic document feeder (RADF) 112, and operation panel 5 (described later) are provided above the image reading section 110.

The document table 111 is disposed on the upper surface of the image forming apparatus 1. Meanwhile, the RADF 112 is supported reclosably on the upper surface of the document table 111 at a predetermined position thereof. The RADF 112 is provided for performing an automatic reversing operation, namely, automatically placing the document face up and face down on the document table 111.

The following is the detail of the reversing feeding. Firstly, a document is transported to the document table 111 such that one of the surfaces of the document faces the image reading section 110 at a predetermined position of the document table 111. Subsequently, after an image on the surface is inputted (read) by the image reading section 110, the document is transported to the document table 111 such that the other surface faces the image reading section 110 at a predetermined position of the document table 111. After the images are inputted to both surfaces of the document, the RADF 112 discharges the document to a discharging section provided on the RADF 112. And then, the same reversing feeding is carried out on the following document. Here, the transportation and the reversing operation of the RADF 112 are controlled according to an overall operation of the image forming apparatus 1.

The image reading section 110 is disposed below the document table 111 to input the image information of the document transported by the RADF 112 onto the document table 111. The image reading section 110 includes first and second document scanners 113 and 114, which move to and fro in parallel along a lower surface of the document stand 111, an optical lens 115, and a CCD (Charge Coupled Device) 116 acting as an optoelectronic transducer.

The first document scanner 113 is provided with an exposure lamp for exposing a document surface bearing an image, and a first mirror for changing a direction of a light image reflected from the document to a predetermined direction. The first document scanner 113 moves to and fro in parallel along the lower surface of the document stand 111 at a predetermined scanning speed while maintaining a fixed distance from the lower surface of the document stand 111. The second document scanner 114 is provided with second and third mirrors for further developing deflection on the light image in a predetermined direction. The light image is reflected from the document after having been deflected by the first mirror of the first document scanner 113. The second document scanner 114 moves to and fro in parallel with the first document scanner 113 at a fixed speed relative to the first document scanner 113.

The optical lens 115 reduces the reflection light from the document, that has been deflected by the third mirror of the second document scanner 114, and allows the reduced light image to be formed at a predetermined position on the CCD 116. The CCD 116 optically transduces the formed light image and outputs it as an electrical signal.

The CCD 116 reads a monochrome image or a color image on a surface of a document and acts as a line sensor of a three-line color CCD which can output line data decomposed into color components of R(red), G(green) and B(blue). The image information of the document is converted into an electrical signal (RGB signal, etc.) by the CCD 116, and is transferred to an image processing section (image processing means, described later) 2, which carries out the foregoing image processing such as color correction.

The image forming section 210 below the image reading section 110 is positioned around the center of the image forming apparatus 1 and is provided with a sheet tray 251, a feeding mechanism 211, a pair of resist rollers 212, image forming stations Pa to Pd, a transfer/transportation belt mechanism 213, a fixing device 217, a switching gate 218, discharging rollers 219, a discharging tray 220, and a switchback transporting path 221 and other members.

The sheet tray 251 is disposed below the image forming section 210 to store sheets P, which serve as recording mediums. The feeding mechanism 211 is also disposed below the image forming section 210 and supplies the sheets P, which are stacked in the sheet tray 251, one by one to the image forming stations Pa to Pd of the image forming section 210. The paired resist rollers 212 are disposed so as to oppose each other across a transporting path of the sheets P at a position before the sheets P are transported into the image forming stations Pa to Pd. Moreover, the resist rollers 212 control a timing of transporting the supplied sheets P into the image forming stations Pa to Pd. Here, when the sheet P bears an image on one of the surfaces, it is supplied again to the image forming stations Pa to Pd at a timing of forming images therein.

The image forming stations Pa to Pd form images on the transported sheets P. The transfer/transport belt mechanism 213 is disposed below the image forming stations Pa to Pd and transports the sheets P by electrostatically absorbing them onto the transfer/transportation belt 216, which is tensioned between a driving roller 214 and a driven roller 215 substantially in parallel. Here, the detail of the transfer/transportation belt mechanism 213 will be described later.

The fixing device 217 is disposed on a downstream side of the transfer/transportation belt mechanism 213 (i.e., a downstream side with respect to a transporting direction of sheets) and fixes a toner image transferred on the sheet P. The fixing device 217 is provided with a pair of fixing rollers. The sheet P transported through a nip between the fixing rollers passes the transporting direction switching gate 218 and is discharged through the discharging rollers 219 to the discharging tray 220, which is mounted on an outer wall of the image forming apparatus 1.

The switching gate 218 selectively switches a transporting path of the fixed sheet P between a) a path for discharging the sheet P to the image forming apparatus 1 and b) a path for feeding the sheet P again to the image forming section 210. When the switching gate 218 switches a transporting path of the sheet P to the image forming stations Pa to Pd, the sheet P is reversed by the switchback transportation path 221 and is fed again to the image forming stations Pa to Pd.

As mentioned earlier, above the transfer/transportation belt mechanism 213, the four image forming stations Pa to Pd are disposed near the transfer/transportation belt 216. The image forming stations Pa to Pd are disposed in this order from an upstream side with respect to a transporting direction of the sheet P. The image forming stations respectively form an image using different colors.

Here, from the upstream side of the transporting direction of the sheet P, the image forming stations are referred to as the first image forming station Pa, the second image forming station Pb, the third image forming station Pc, and the fourth image forming station Pd. Moreover, in the present embodiment, the first image forming station Pa uses toner of black (black•K), the second image forming station Pb uses toner of cyan (C) and the third image forming station Pc uses toner of magenta (M), and the fourth image forming station Pd uses toner of yellow (Y).

The transfer/transportation belt mechanism 213 is provided with the transfer/transportation belt 216, the driving roller 214, the driven roller 215, a sheet-absorbing charging device 228, and an electricity-removing device 229 and other members. As described earlier, the transfer belt mechanism 213 is below the image forming stations Pa to Pd, and the transfer/transportation belt 216 is tensioned between the driving roller 214 and the driven roller 215 substantially in parallel. The transfer/transporting belt mechanism 213 serves as a sheet transporting path.

The transfer/transportation belt 216 is supported by the driving roller 214 and the driven roller 215 substantially in parallel and is driven rotatively by the driving roller 214. As shown in FIG. 2, a side of the transfer/transportation belt 216, that is opposite from the image forming stations Pa to Pd, is driven so as to move from the resist rollers 212 to the fixing device 217 (arrow Z in FIG. 2). In this case, as described above, the sheets P fed from the feeding mechanism 211 are held and are transported successively to the image forming stations Pa to Pd.

A surface of the transfer/transportation belt 216 is electrically charged by the sheet-absorbing charging device 228 to transport the sheets P in a stable manner. The sheet-absorbing charging device 228 is disposed between the first image forming station Pa and the feeding mechanism 211, namely, on the upstream side in a rotating direction of the transfer/transportation belt 216. With this arrangement, it is possible to transport the sheets P, which have been fed from the feeding mechanism 211, from the first image forming station Pa to the fourth image forming station Pd without displacement while the sheets P are positively absorbed onto the transfer/transportation belt 216.

Meanwhile, the electricity-removing device 229 is provided on the downstream side with respect to a rotating direction of the transfer/transportation belt 216, namely, above the driving roller 214 between the fourth image forming station Pd and the fixing device 217. Alternating voltage is applied to the electricity-removing device 229 to separate the sheets P, which are electrostatically absorbed onto the transfer/transportation belt 216, from the transfer/transportation belt 216. Hence, the sheets P can be exfoliated from the transfer/transportation belt 216.

The image forming stations Pa to Pd are substantially identical to one another in construction. The image forming stations Pa, Pb, Pc, and Pd are disposed so as to oppose the transfer/transportation belt 216 and respectively include light sensitive drums 222a, 222b, 222c, and 222d, which are rotatively driven in a forward direction (arrow F in FIG. 2) to a rotating direction of the transfer/transportation belt 216.

Around the light sensitive drums 222a to 222d, a) charging devices 223a, 223b, 223c, and 223d, b) developing devices 224a, 224b, 224c, and 224d, c) transfer devices 225a, 225b, 225c, and 225d, and d) cleaning devices 226a, 226b, 226c, and 226d are disposed in this order in a rotating direction of the light sensitive drums 222a to 222d.

The charging devices 223a, 223b, 223c, and 223d evenly apply charge onto the light sensitive drums 222a to 222d. The developing devices 224a, 224b, 224c, and 224d develop electrostatic latent images respectively on the light sensitive drums 222a to 222d. Electrostatic latent images are developed, which have been formed by laser beam scanner units 227a, 227b, 227c, and 227d (described later). The transfer devices 225a, 225b, 225c, and 225d transfer toner images, which have been developed on the light sensitive drums 222a, 222b, 222c, and 222d, onto the sheets P. The cleaning devices 226a, 226b, 226c, and 226d remove toner which remains on the light sensitive drums 222a to 222d.

The laser beam scanner units (hereinafter, abbreviated as LSU) 227a, 227b, 227c, and 227d are respectively disposed above the light sensitive drums 222a to 222d. The LSU 227a to 227d are each provided with a semiconductor laser element (not shown); polygon mirrors (deflecting device) 240a to 240d; fθ (scanning) lenses 241a to 241d; mirrors 242a, 242b, 242c, and 242d; and mirrors 243a, 243b, 243c, and 243d. The semiconductor laser element emits light modulated according to output data, which is subjected to an image processing such as color correction by the image processing section 2. The polygon mirrors 240a to 240d deflect a laser beam, which is transmitted from the semiconductor laser element, in a main scanning direction. The fθ lenses 241a to 241d, the mirrors 242a to 242d, and the mirrors 243a to 243d and other members form an image of a laser beam, which is deflected by the polygon mirrors 240a to 240d, on the surfaces of the light sensitive drums 222a to 222d.

An image signal corresponding to a black component image of a color document image is inputted to the LSU 227a. An image signal corresponding to a cyan component image of a color document image is inputted to the LSU 227b. An image signal corresponding to a magenta component image of a color document image is inputted to the LSU 227c. An image signal corresponding to a yellow component image of a color document image is inputted to the LSU 227d.

The developing devices 224a to 224d, which are respectively provided in the image forming stations Pa to Pd, store color toners corresponding to image signals inputted to the image forming stations Pa to Pd. Specifically, the developing device 224a stores black toner, the developing device 224b stores cyan toner, the developing device 224c stores magenta toner, and the developing device 224d stores yellow toner. The electrostatic latent images on the light sensitive drums 222a to 222d are developed by the color toners. In this way, the image forming section 210 reproduces information about a document image as toner images of the colors.

In the image forming apparatus 1 with the above arrangement, a cut sheet is used as the sheet P. The sheet P is sent from the sheet tray 251 and is fed to a guide of the feeding/transportation path of the feeding mechanism 211. At this point, the end of the sheet P is detected by a sensor (not shown), and the sheet P is temporarily stopped by the paired resist rollers 212 in response to a detection signal outputted from the sensor.

And then, the sheet P is transported to the transfer/transportation belt 216, which rotates in a direction of the arrow Z, at timing of the image forming stations Pa to Pd. As mentioned above, a predetermined charge is applied from the sheet-absorbing charging device 228 to the transfer/transportation belt 216. Hence, the sheet P is transported in a stable manner while passing through the image forming stations Pa to Pd.

In the image forming stations Pa to Pd, toner images of black, cyan, magenta, and yellow are respectively formed and are superimposed to one another on a supporting surface of the transfer/transportation belt 216, on which the sheet P is electrostatically absorbed and transported. Upon completion of transfer of an image in the fourth image forming station Pd, the electricity-removing device 229 exfoliates the sheet P from the end on the transfer/transportation belt 216, and the sheet P is directed to the fixing device 217. Finally, the sheet P on which the toner images are fixed is discharged from a sheet discharging outlet (not shown) to the discharging tray 220.

Here, in the above description, the LSU 227a to 227d scan a laser beam for exposure so as to perform an optical reading on the light sensitive drums 222a to 222d. However, the writing means for performing optical writing on the light sensitive drums 222a to 222d are not limited to the LSU 227a to 227d.

For instance, another writing means is a writing optical system (LED: Light Emitting Diode head) composed of a light-emitting diode array and an image-forming array. The LED head is smaller than a laser beam scanner unit in size and has no movable part which causes sound. Therefore, the LED head can be preferably used in a digital color image forming apparatus of tandem system, which requires a plurality of optical writing units.

Figure 3:
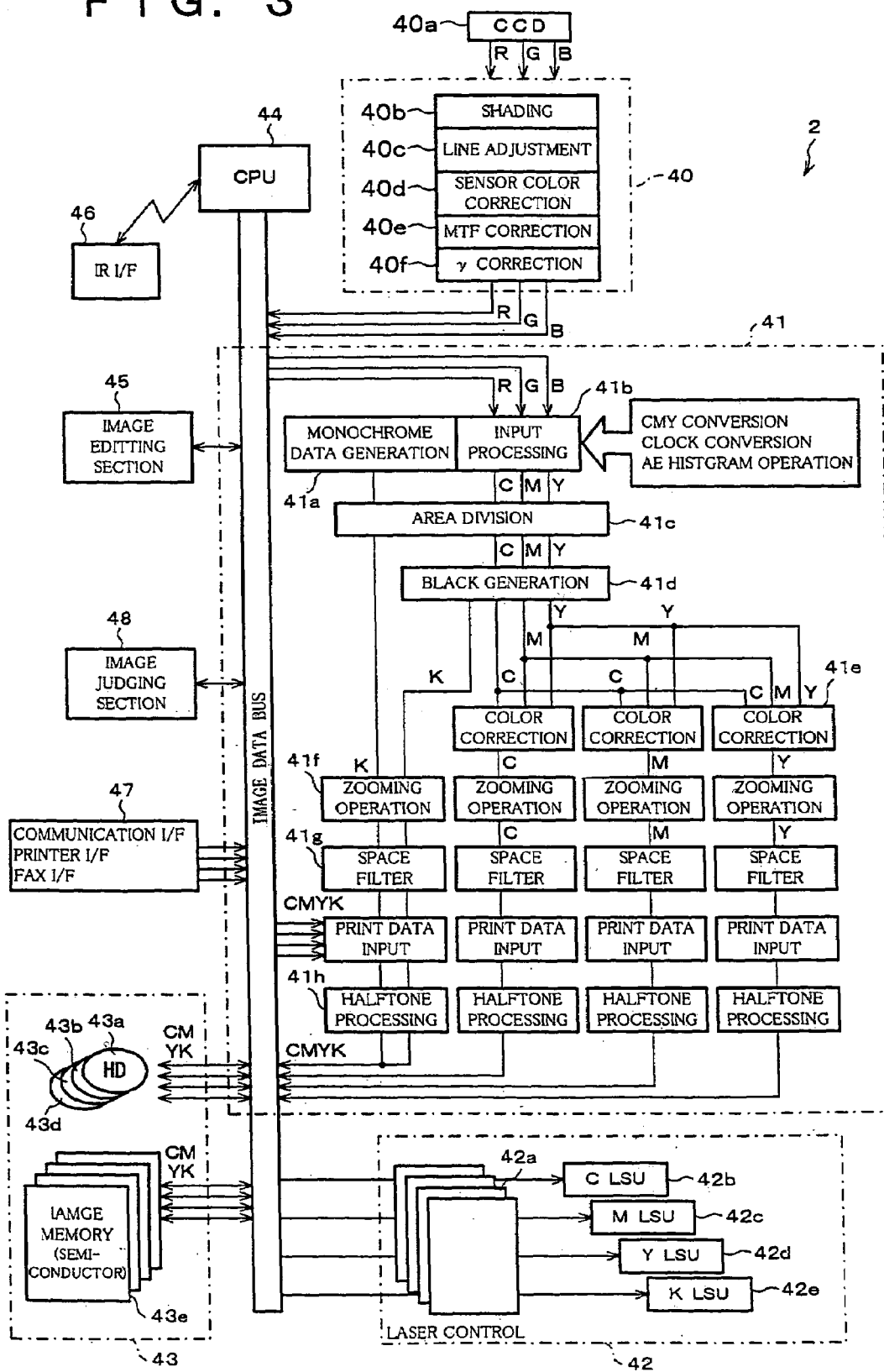
FIG. 3 is a block diagram showing the construction of an image processing section in the image forming apparatus shown in FIG. 2.

The image processing section 2 provided in the image forming apparatus 1 will be described. As shown in FIG. 3, the image processing section 2 is constituted by an image data inputting section 40, an image data processing section 41, an image memory 43 including a hard disk device or RAM (random access memory), an image data outputting section 42, a central processing unit (hereinafter, abbreviated as CPU) 44, an image editing section 45, external interface sections 46 and 47, and an image judging section 48.

The image data inputting section 40 includes a color CCD 40a, a shading correction circuit 40b, a line adjusting section 40c, a sensor color correcting section 40d, an MTF correcting section 40e, and a γ correcting section 40f.

As mentioned above, the color CCD 40a is a three-line color CCD, which reads a monochrome document or a color document and outputs line data decomposed into RGB color components. The color CCD 40a corresponds to the CCD 116 serving as an optoelectronic transducer in the image reading section 110 of FIG. 2.

The shading correcting circuit 40b is provided for correcting a line image level of line data which is read in the color CCD 40a. The line adjusting section 40c is provided for correcting a shift of image line data which is read in the color CCD 40a, and is composed of a line buffer and others.

The sensor color correcting section 40d is provided for correcting color data of line data that is outputted from the three-line color CCD 40a. The MTF correcting section 40e makes correction to emphasize a change in a signal of each pixel. The γ correcting section 40f makes visibility correction by correcting contrast of an image.

The image data processing section 41 is provided with a monochrome data generating section 41a, an input processing section 41b, an area separating section 41c, a black generating section 41d, a color correcting circuit 41e, a zooming circuit 41f, a space filter 41g, and a halftone processing section 41h.

In the case of a monochrome document, the monochrome data generating section 41a generates monochrome data from an RGB signal, which is a color image signal inputted from the image data inputting section 40.

In the case of a color document, the input processing section 41b converts R•G•B signals, which are color image signals inputted from the image data inputting section 40, into CMY signals corresponding to the image forming stations Pb•Pc•Pd. Further, the input processing section 41b performs a clock converting operation and an AE histogram operation. The AE histogram operation can separate character and picture information of the document based on a color image signal inputted from the image data inputting section 40.

The area separating section 41c separates image data, which is inputted from the monochrome data generating section 41a or the input processing section 41b, into characters, a dot picture, and a photographic paper picture.

The black generating section 41d removes a base color in response to CMY signals outputted from the input processing section 41a so as to generate a black color, so that color data (K signal) of black is generated upon formation of a color image. The color correcting circuit 41e adjusts colors of CMY color image signals.

The zooming circuit 41f is provided for zooming in and out image information which is inputted according to a predetermined scaling factor. The halftone processing section 41h is provided for displaying gradation such as multilevel error dispersion and multilevel dither.

The image memory 43 is provided for temporarily storing image data of colors that is subjected to a halftone processing in the halftone processing section 41h. The image memory 43 includes four hard disks (rotatable memory medium) 43a•43b•43c•43d, which successively receive image data of 8 bits and 4 colors (32 bits) outputted from the image data processing section 41 in a serial manner, convert 32-bit data into 8-bit image data of four colors while temporarily storing the data in the buffer, and store and control the image data for each color.

Besides, since the image forming stations Pa•Pb•Pc•Pd are disposed at different positions, a delay buffer memory 43e (semiconductor memory) of the image memory 43 temporarily stores image data of each color so as to transmit the image data to the LSUs 227a to 227d at different timings, causing no displacement of color. The image memory 43 further includes an image synthesizing memory (not shown) for synthesizing a plurality of images.

The image data outputting section 42 is provided with laser control units (hereinafter, abbreviated as LCU) 42a, and LSU 42b•42c•42d•42e.

The LCU 42a carries out pulse width modulation based on image data of each color that is transmitted from the halftone processing section 41h. The LSUs 42b•42c•42d•42e perform laser recording in response to a pulse width modulated signal corresponding to an image signal of each color that is outputted from the LCU 42a. The LSUs 42b to 42e correspond to the LSU 227a to 227d of the image forming section 210 shown in FIG. 2.

The CPU 44 controls the image data input section 40, the image data processing section 41, the image memory 43, the image data outputting section 42, the image editing section 45 (described later), and the external interfaces 46 and 47, based on a predetermined sequence.

The image editing section 45 performs a predetermined edit on image data, which has been transmitted to the image data inputting section 40, the image data processing section 41, or the external interfaces 46 and 47 (described later) and has been temporarily stored in the image memory 43. The edit of the image data is carried out by using an image synthesizing memory of the image memory 43.

The external interface 46 is an external image input processing means, which is provided in addition to the image forming apparatus 1 and includes a communication interface means (image information input means) for receiving image data from a communication portable terminal, a digital camera, digital video camera.

Here, it is preferable to temporarily input image data, which has been inputted from the external interface 46, to the image data processing section 41 for color space correction. With this arrangement, the data level of the image data is converted to a processing level of the image recording section 210 in the image forming apparatus 1, and then, the image data is stored and controlled in the hard disks 43*a* to 43*d* of the image memory 43.

Further, the external interface 47 is a printer interface for inputting image data generated by a personal computer (not shown) or a monochrome or color FAX interface for receiving image data from a FAX machine. Image data inputted from the external interface 47 is composed of CMYK signals. The image data is subjected to a halftone operation in the halftone processing section 41*h* and is stored and controlled in the hard disks 43*a* to 43*d* of the image memory 43.

The image judging section 48 separates an area into a character area and a photographic area and judges if a read area is a color image or a monochrome image. Moreover, the image judging section 48 prevents copies of bills and securities by checking a variety of patterns included in the read image. Additionally, for judging if a read area is a color image or a monochrome image, pre-scanning is necessary.

Figure 4:
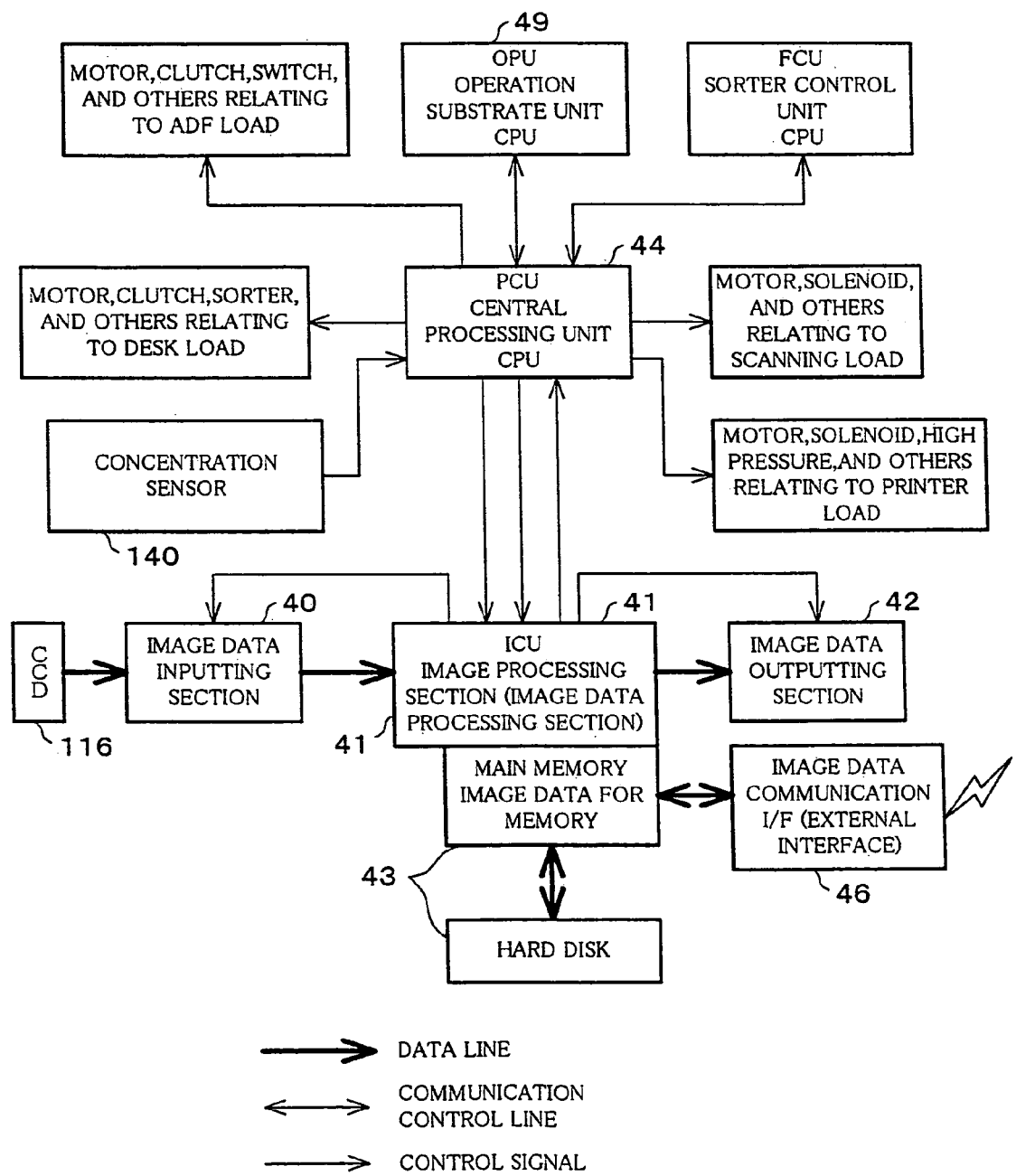
FIG. 4 is a block diagram showing the construction of a control system in the image forming apparatus shown in FIG. 2.

In a control system for entirely controlling an operation of the image forming apparatus 1, as shown in FIG. 4, the CPU 44 controls the operations of all the parts of the apparatus.

As shown in FIG. 4, the above explanation discusses the detail of the image data inputting section 40, the image data processing section 41, the image data outputting section 42, the image memory 43, the CPU 44, and the external interface 46. As will be described later, a concentration sensor 140 is provided for measuring a concentration of a high-concentration toner patch, that is formed on surfaces of the light sensitive drums 222*a* to 222*d*. Here, the external interface 46 can exchange data with the image memory 43 and is connected to the CPU 44 via the image memory 43.

The CPU 44 further controls driving mechanisms according to sequence control and outputs a control signal thereto. The driving mechanisms such as the RADF 112, the image reading section 110, and the image forming section 210 constitute the image forming apparatus 1.

Further, an operation substrate unit 49 composed of an operation panel 5 is connected to the CPU 44 so as to interactively communicate with each other. The operation substrate unit 49 transfers a control signal, which is indicative of the content of a copy mode and is inputted by the operator on the operation panel 5, to the CPU 44, so that the entire image forming apparatus 1 is operated in accordance with the set mode.

Moreover, the CPU 44 makes connection so as to interactively transmit a control signal with the operation substrate unit 49. The control signal is indicative of the operations of the image forming apparatus 1 including the operation panel 5 (see FIG. 5, described later).

When the user sets a copy mode by using the operation panel 5, a control signal indicative of the content is transmitted from the operation substrate unit 49 to the CPU 44. Thus, the CPU 44 exercises controls such that the entire image forming apparatus 1 is operated in accordance with the set mode.

In contrast, the CPU 44 transmits a control signal, which is indicative of the operations of the image forming apparatus 1, to the operation substrate unit 49. The operation substrate unit 49 displays the current state of the image forming apparatus 1 on a touch panel liquid crystal display device 6 (described later), which is disposed on the operation panel 5 to provide a color display in response to the control signal. Hence, the user can visually recognize the current state.

Figure 5:
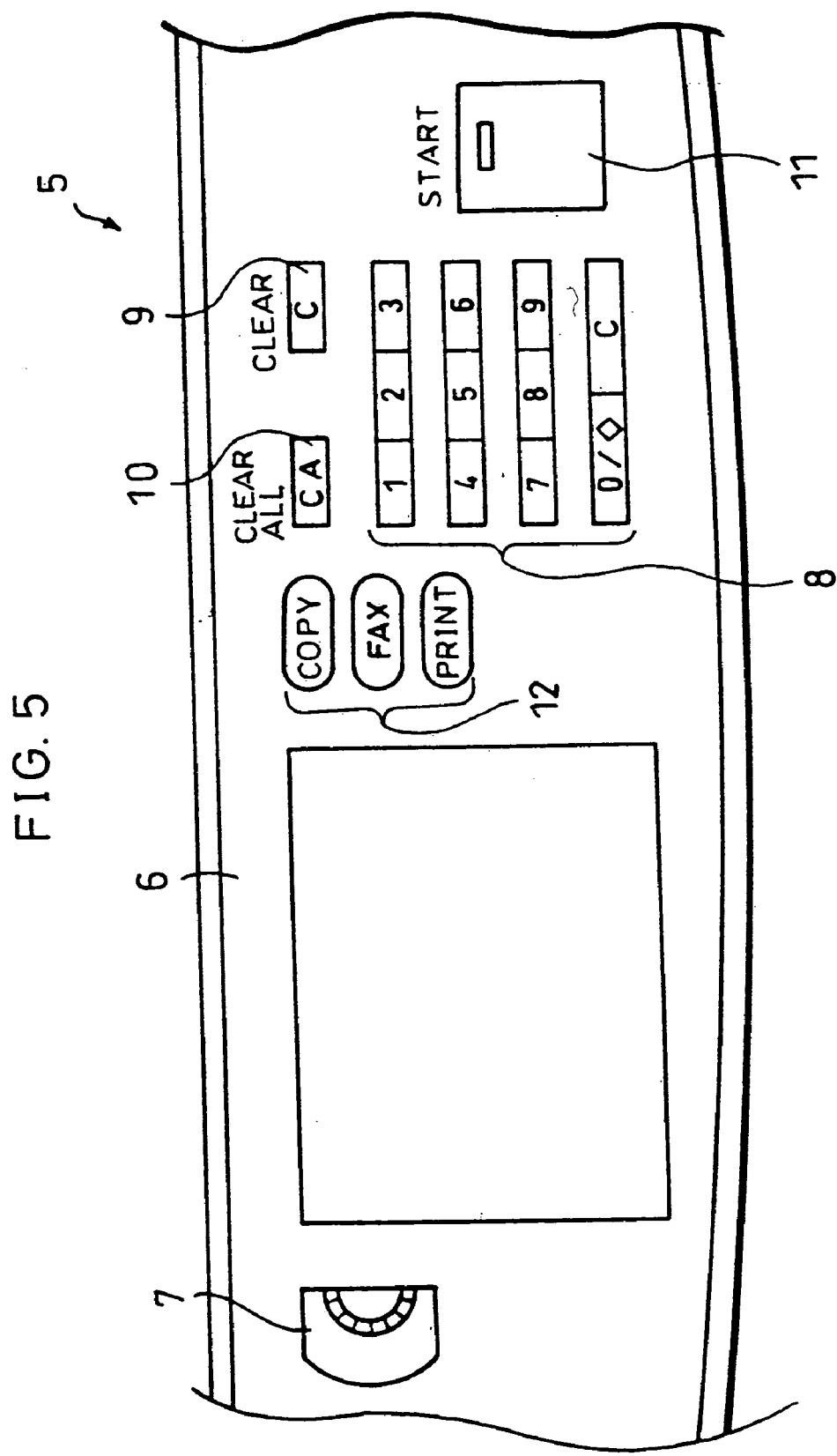
FIG. 5 is a plan view showing the construction of an operation panel provided in the image forming apparatus of FIG. 2.

The operation panel 5, as shown in FIG. 5, includes a touch panel liquid crystal display device 6 (hereinafter, referred to as a color LCD) at the center to provide a color display. On the right, a ten-digit keypad 8, a start key 11, a clear key 9, and a clear all key 10 are provided. On the left of the color LCD 6, a dial 7 is provided for adjusting brightness on a screen of the color LCD 6.

Of a group of keys disposed on the right of the color LCD 6, the ten-digit keypad 8 is used for inputting a numerical value on the screen of the color LCD 6. The start key 11 is used for instructing the start of an image forming operation. A mode switching key 12 is used for selecting an image forming operations including a copy mode, a FAX mode, and a print mode.

Also, the clear key 9 is used for clearing a set value on the color LCD 6 and for canceling an image forming operation. The clear all key 10 is used for returning a setting of an image forming condition to a default value. Here, the operation panel 5 may include an interrupt key (not shown in FIG. 5) for suspending an image forming operation to handle another copying operation.

As will be described later, a variety of screens are switched and displayed on the screen of the color LCD 6. Touch keys are provided for setting a variety of conditions on the screens. A variety of conditions can be set by performing a direct pressing operation (hereinafter, simply referred to as the operation) with fingers on the touch key. Further, an operation guidance and a warning are also displayed on the color LCD 6.

Figure 6:
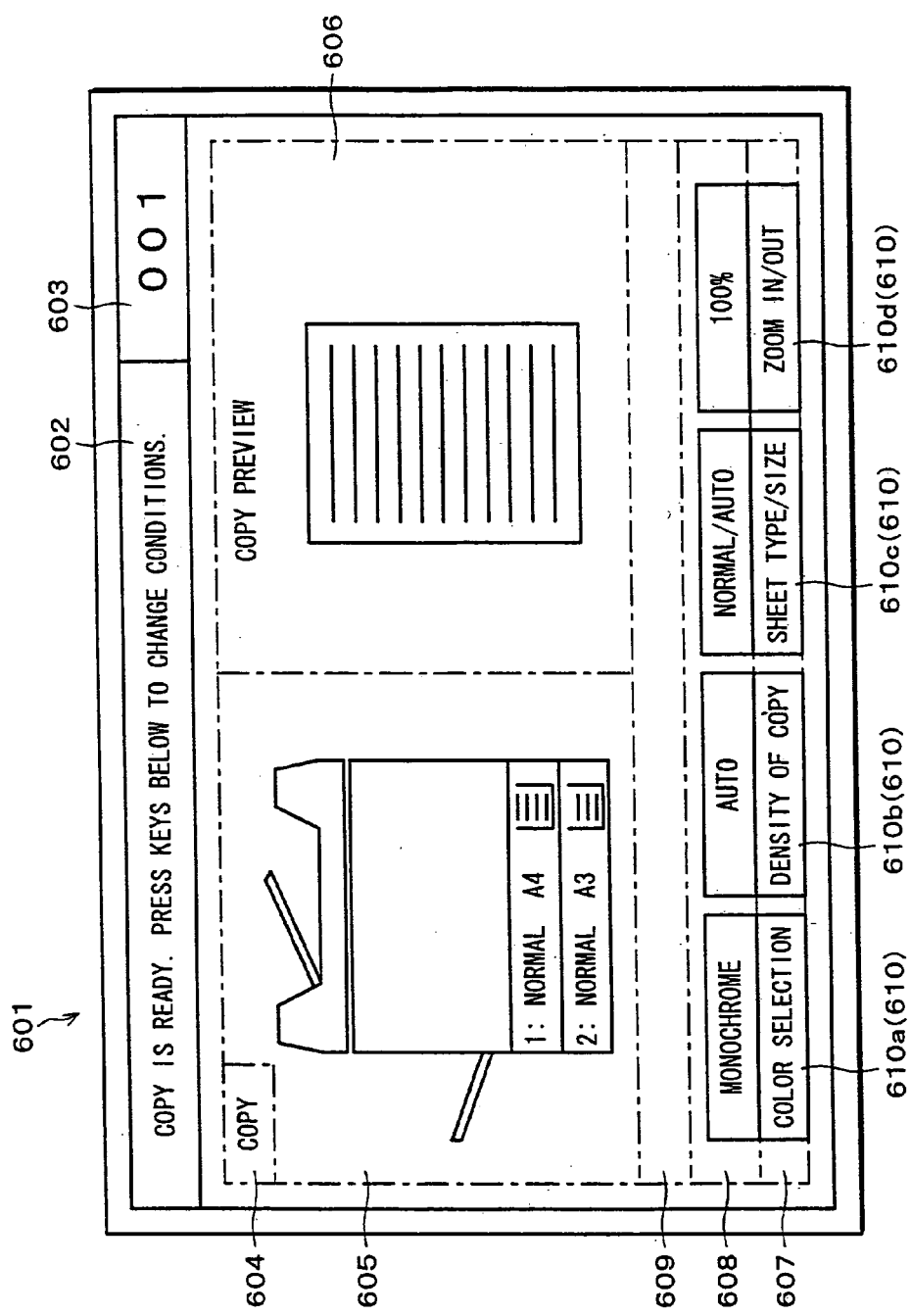
FIG. 6 is an explanatory drawing showing a standby screen which is displayed during standby of a color LCD on the operation panel shown in FIG. 5.

The following explanation describes the outline of the screens displayed on the color LCD 6. When the image forming apparatus 1 is in a standby state, the color LCD 6 displays a standby screen 601 as shown in FIG. 6. The upper part of the standby screen 601 has a message area 602 and an image number display area 603. The message area 602 arbitrarily displays a message for instructing procedures so that the user can positively operate the operation panel 5. In the image number display area 603, the number of formed images is inputted by the ten-digit keypad 8 and the number is displayed.

On the left of the central part of the standby screen 601, an external view displaying area 605 is provided for schematically showing an external view of the entire image forming apparatus 1. The external view displaying area 605 displays a body of the apparatus, the sheet tray, and options mounted on the apparatus (RADF112, sorters, a large-capacity tray, a multi-step desk). A type of set sheets, sheet size, and the number of remaining sheets are displayed on the sheet tray.

On the right of the central part of the standby screen 601, a preview display area 606 is provided for schematically showing a preview of a formed image. The preview shows an area of an image formed on a selected sheet. The user can confirm the image so as to prevent a misoperation. The preview display area 606 can arbitrarily show conditions which can be illustrated, of conditions set by condition keys (described later) provided as touch keys.

On the upper left of the external view displaying area 605, a mode displaying area 604 is provided for displaying a current mode of the image forming apparatus 1. As described above, a copy mode, a FAX mode, or a printer mode is selected by operating the mode switching key 12, and the selected mode is displayed (copy mode in FIG. 6) on the mode displaying area 604. Further, when a ten-digit keypad 8 is operated in a specific order, it is possible to display a mode for a serviceperson who provides maintenance of the image forming apparatus 1.

On a lower part of the standby screen 601, a condition key area 607 is provided. The condition key area 607 includes touch keys acting as condition keys 610 for setting conditions of the image forming apparatus 1. The present embodiment includes a color selection key 610a for selecting a color mode, a copy concentration key 610b for setting concentration of image formation, a sheet type/size key 610c for selecting a type and size of sheets, and an zoom key 610d for setting a magnification of image formation. However, the condition keys 610 are not particularly limited to these.

A setting display area 608 is provided on the condition key area 607. The conditions selected on the condition keys 610 are displayed thereon so as to correspond to the condition keys 610. In FIG. 6, "monochrome" is displayed as a condition of the color selection key 610a, "auto (automatic setting)" is displayed as a condition of the copy concentration key 610b, "normal type/auto (automatic setting)" is displayed as a condition of the sheet type/size key 610c, and "100% (full size)" is displayed as a condition of the zoom key 610d.

Further, a selected condition display area 609 is provided between a) the setting display area 608 and b) the external view display area 605 and the preview display area 606. The selected condition display area 609 displays a selection keys 611 for selecting conditions corresponding to the condition keys 610 during an operation of the condition keys 610.

Figure 7:
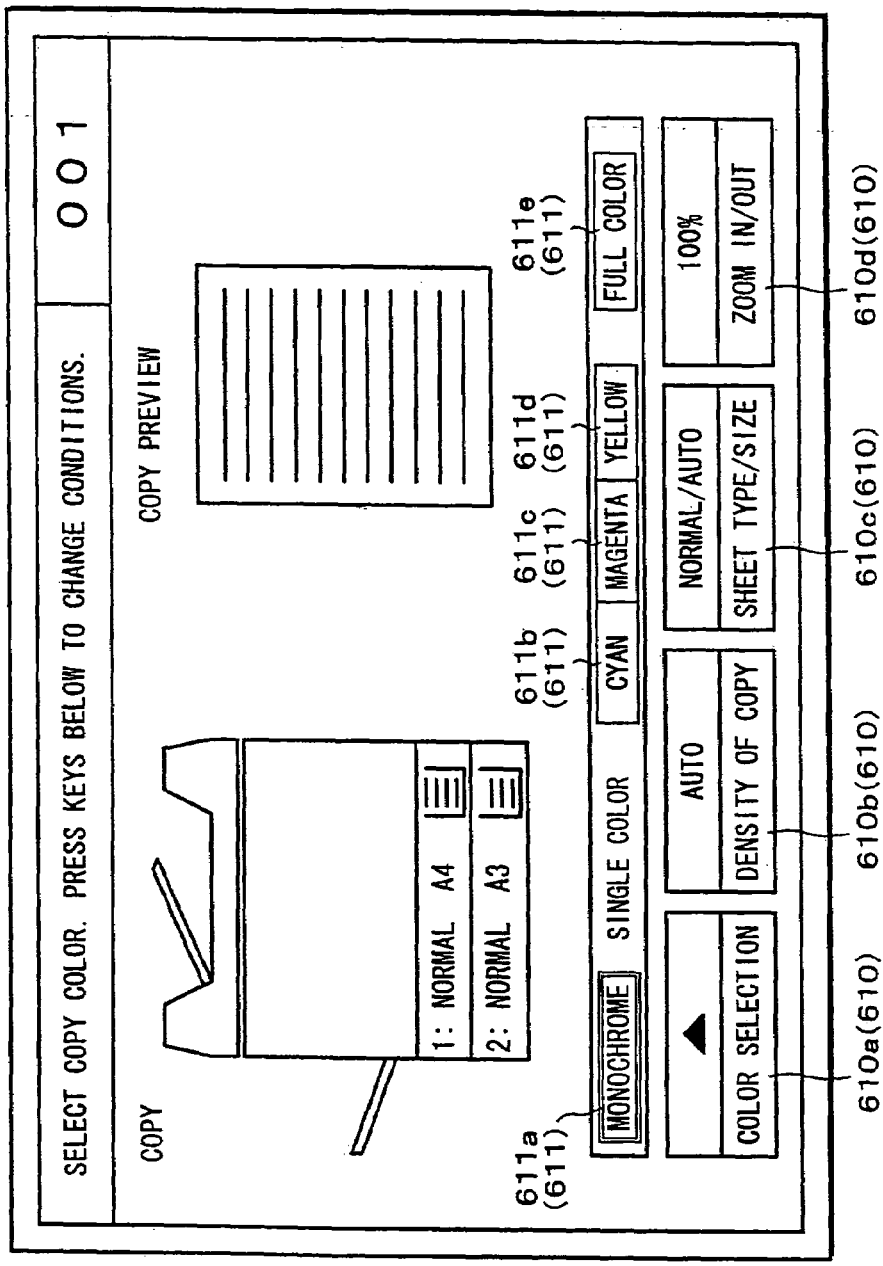
FIG. 7 is an explanatory drawing showing an example of a selection screen which is displayed during standby of the color LCD on the operation panel shown in FIG. 5.

For example, as shown in FIG. 7, when selecting the color selection key 610a of the condition keys 610, the selected condition display area 609 displays the selection keys 611 including a monochrome key 611a, single-color keys such as a cyan key 611b, a magenta key 611c, and a yellow key 611d, and a full-color key 611e.

When selecting a monochrome mode, the monochrome key 611a is operated as shown in FIG. 7. Hence, a monochrome mode is selected and the monochrome key 611a is displayed as an active key. The method of the active display is not particularly limited. For example, in FIG. 7, the active key is displayed in a double frame or in a thick line.

Figure 8:
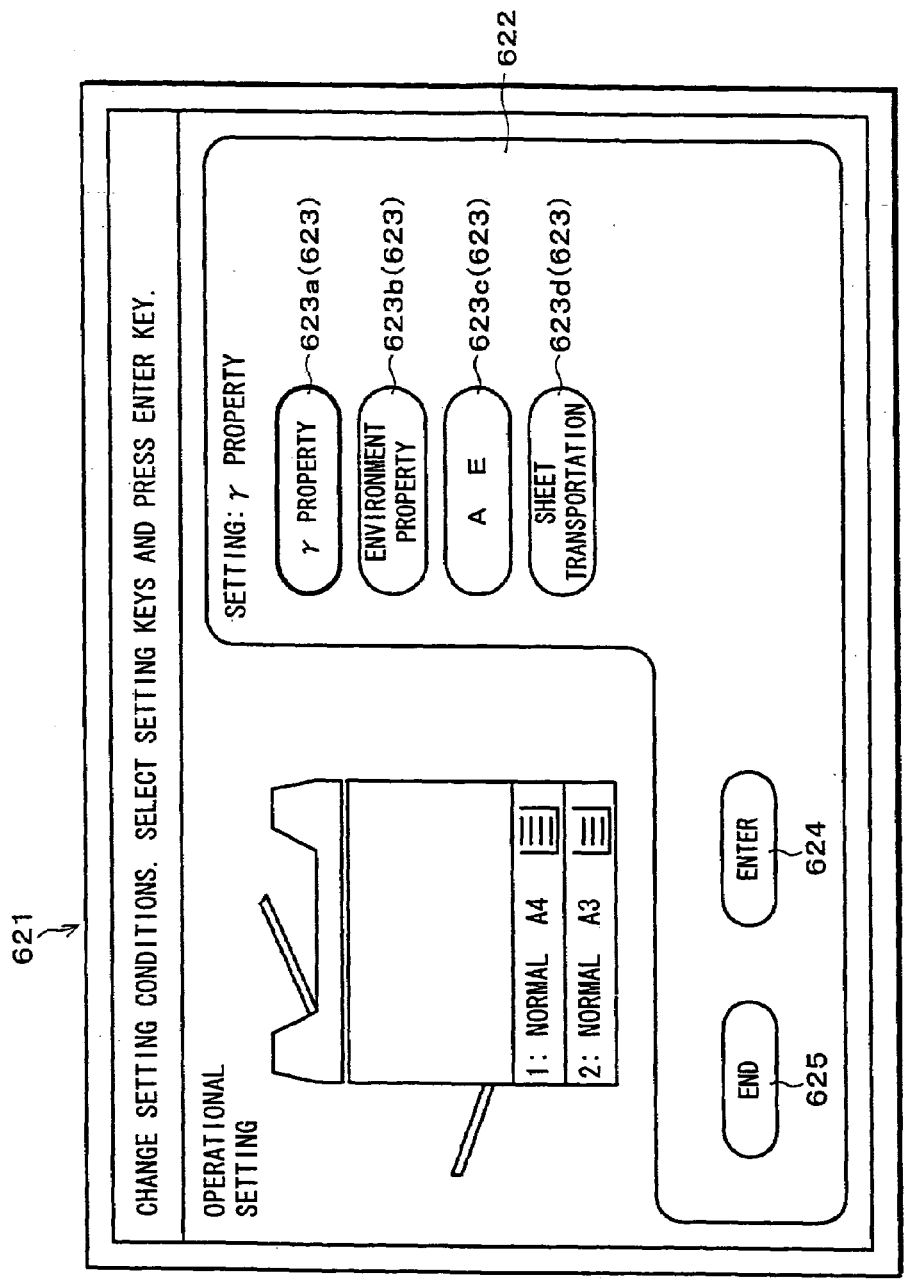
FIG. 8 is an explanatory drawing showing an operation reset screen which is displayed during an operational resetting of the color LCD on the operation panel shown in FIG. 5.

When the image forming apparatus 1 enters an operational setting status from a standby status, the color LCD 6 displays an operation reset screen 621 as shown in FIG. 8. Unlike the standby screen 601 of FIG. 6, in the operation reset screen 621, the image forming number display area 603 is closed, and an operational setting area 622 is displayed in place of the preview display area 606, the condition key area 607, the setting display area 608, and the selected condition display area 609. The mode display area 604 shows a mode for setting an operation.

Besides, like the standby screen 601, the external view display area 605 displays the external view of the image forming apparatus 1. The external view is used to indicate a function required for perform the selected operational settings. The operational setting area 622 displays a setting keys 623 (a γ property key 623a, an environment property key 623b, an AE key 623c, and a sheet transportation key 623d), an enter key 624, and an end key 625.

Of the setting keys 623, the γ property key 623a determines how a concentration input value is changed to a concentration output value. The setting of a γ property by the γ property key 623a will be discussed later. The environment property key 623b is used to set if an image condition is necessary or not in view of an environmental characteristic such as temperature and humidity. The AE key 623c is used for making correction to suitably adjust an automatic concentration. The sheet transportation key 623d is used for setting a condition of transporting a sheet, e.g., deflection of a sheet on a matching roller (such as the resist roller 212 of FIG. 2).

After one of the setting keys 623 is operated to provide an active display, when the enter key 624 is operated, an operation starts according to a selected setting. The end key 625 terminates the operational setting status and brings it to a standby status.

Figure 9:
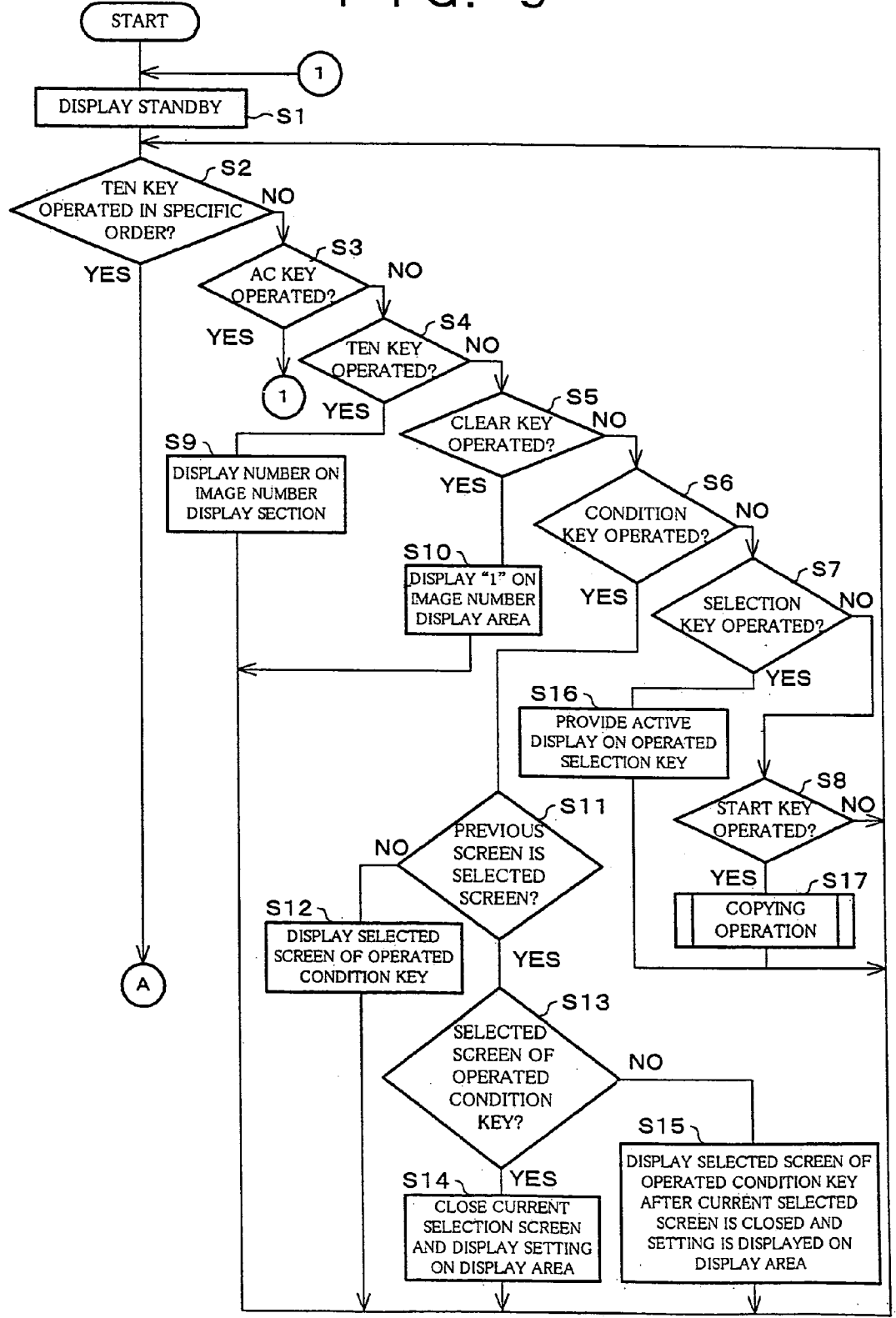
FIG. 9 is a flowchart showing operation procedure of the operation panel in the image forming apparatus shown in FIG. 2.
Figure 10:
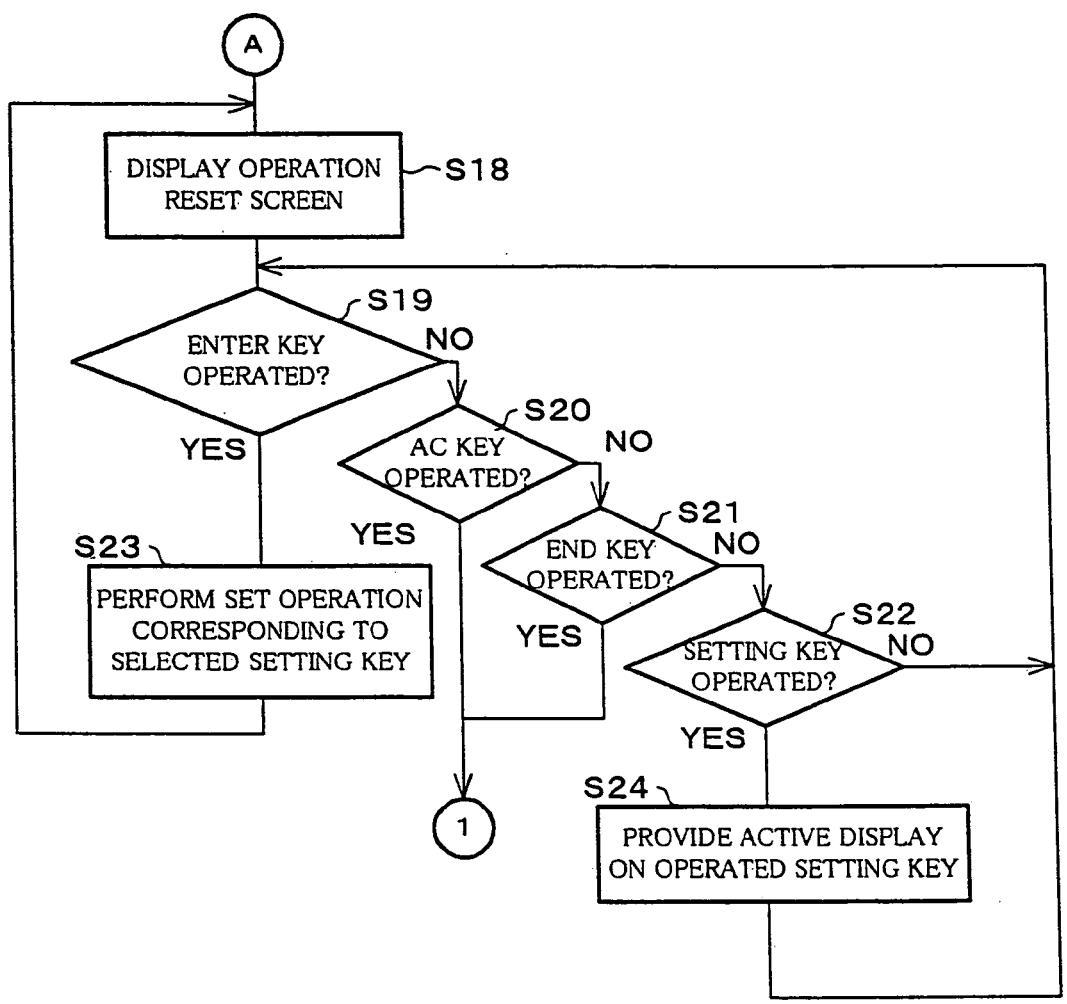
FIG. 10 is a flowchart showing the following steps of the flowchart shown in FIG. 9.

Referring to flowcharts of FIGS. 9 and 10, the following explanation describes an operating method of shifting from a standby status to an operational setting status and from a standby status to an image forming operation status by using the operation panel 5.

In a standby status in which the operation panel 5 displays the standby screen 601 (step 1, hereinafter, a step is abbreviated as S), judgement is made if the ten-digit keypad 8 is operated in a specific order or not (S2). If the ten-digit keypad 8 is not operated in a specific order, judgement is made if the clear all key 10 is operated or not (S3). If the clear all key 10 (abbreviated as the AC key in FIGS. 9 and 10) is operated, the step returns to S1 and the standby screen 601 is displayed again. If the clear all key 10 is not operated, judgement is made if the ten-digit keypad 8 is operated or not (S4). If the ten-digit keypad 8 is operated, a numerical value corresponding to an operated key of the ten-digit keypad 8 is displayed on the image forming number display area 603 (S9), and the step returns to S2.

If the ten-digit keypad 8 is not operated in S4, judgement is made if the clear key 9 is operated or not (S5). If the clear key 9 is not operated, 1 is displayed on the image forming number display area 603 (S1), and the step returns to S2. If the clear key 9 is not operated in S5, judgement is made if the condition keys 610 are operated or not (S6). If the condition keys 610 are operated, judgement is made if a screen (selection screen) is provided or not, in which the selected condition display area 609 displays the selection keys 611, as a previous screen (S11).

If the selection keys 611 are displayed, judgement is made if the selected screen on display corresponds to the operated condition key 610 (S13).

If the selected screen corresponds to the operated condition key 610 in S 13, the selected screen on the current display is closed, the selected condition is displayed on the setting display area 608 (S14), and the step returns to S2. In S11, if the previous screen does not display the selected screen, a selected screen corresponding to the operated condition key is displayed (S12), and the step returns to S2.

In S13, if the selected screen does not correspond to the operated condition key 610, the selected screen on the current display is closed, the selected condition is displayed on the setting display area 608, a selected screen corresponding to the operated condition key 610 is displayed (S15), and the step returns to S2. In S6, if the condition key 610 is not operated, judgement is made if the selection keys 611 are operated or not (S7). If the selection keys 611 are operated, an active display is provided on the operated selection key 611 (S16) and the step returns to S2.

In S7, if the selection keys 611 are not selected, judgement is made if the start key 11 is operated or not (S8). If the start key 11 is operated, the image forming operation is performed (S17). Upon completion of the image forming operation, the step returns to S2. If the start key 11 is not operated in S8, the step returns to S2.

Additionally, in S2, if the ten-digit keypad 8 is operated in a specific order, the screen of the color LCD 6 is switched to the operation reset screen 621 (S18). The setting of the operations in S18 and later will be discussed later.

In the above operational control of S1 to S17, the following explanation describes an example of a change on screen after the condition keys 610 are operated in S6. Firstly, the following discusses an operation for changing color selection from a monochrome mode to a full color mode of the condition keys 610, on the standby screen 601 of FIG. 6.

When the color selection key 610a of the condition key area 607 is operated, as shown in FIG. 7, the selected condition display area 609 displays the selection keys 611 (611a to 611e, described above), which correspond to selection conditions of colors including a monochrome, single colors (cyan, magenta, and yellow), and a full color.

In this case, before operating the color selection key 610a, a monochrome condition is selected, so that an active display is provided on the monochrome key 611a of the selection keys 611 until another selection key 611 is operated. When an active display is provided on the selection keys 611, a condition display frame of the setting display area 608 (a display frame right above the color selection key 610a) displays ▲ to indicate that a condition is being selected.

Figure 11:
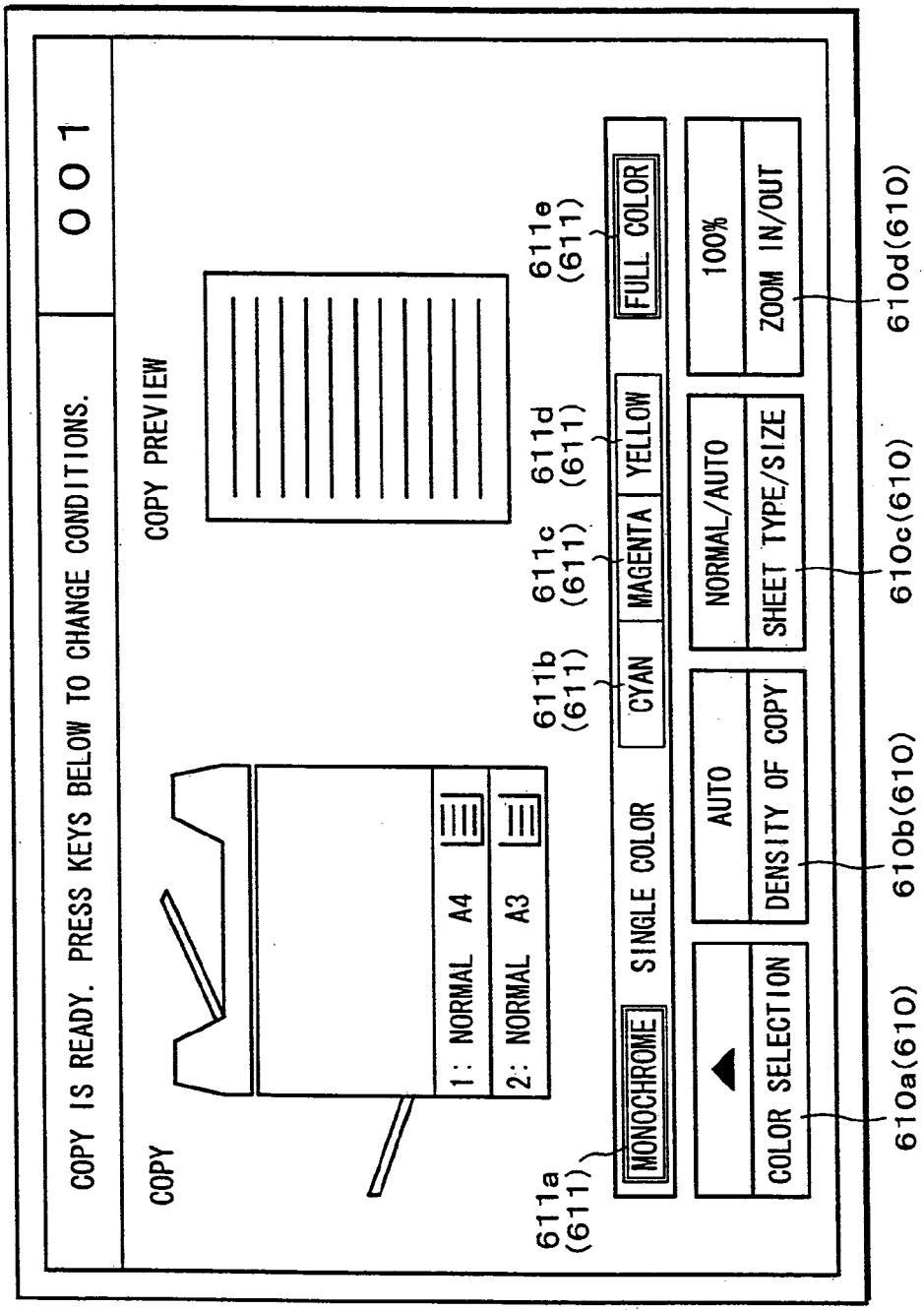
FIG. 11 is an explanatory drawing showing another example of the selection screen which is displayed during standby of the color LCD on the operation panel shown in FIG. 5.
Figure 12:
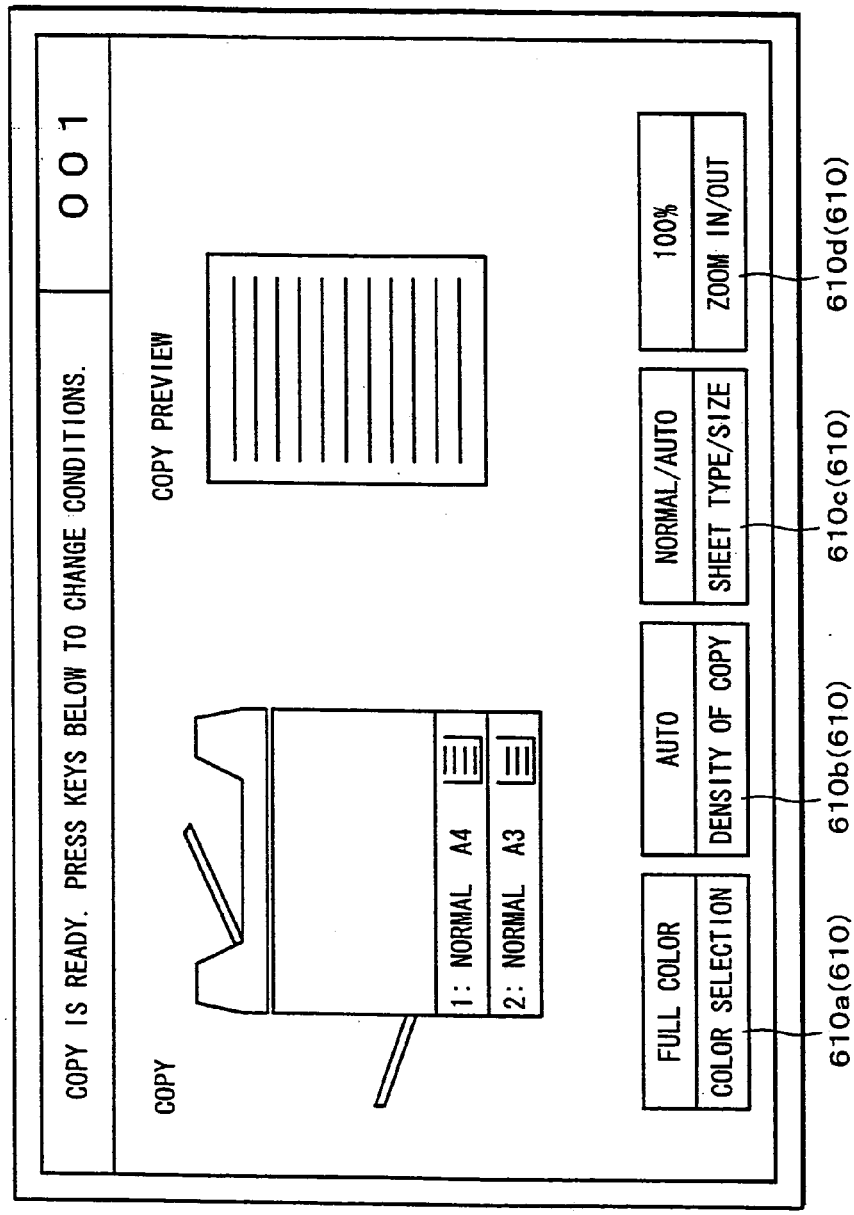
FIG. 12 is an explanatory drawing showing another example of the selection screen which is displayed during standby of the color LCD on the operation panel shown in FIG. 5.

As shown in FIG. 11, during color selection of the selected condition display area 609, when the full-color key 611e is operated, an active display is provided on the full-color key 611e. And then, when the color selection key 610a of the condition keys 610 is operated once again, as shown in FIG. 12, the selection keys 611 of the selected condition display area 609 are closed. And then, "full color", which is a condition of the full-color key 611e with an active display, is displayed on the display frame of the setting display area 608. The display frame is right above the color selection key 610a.

Figure 13:
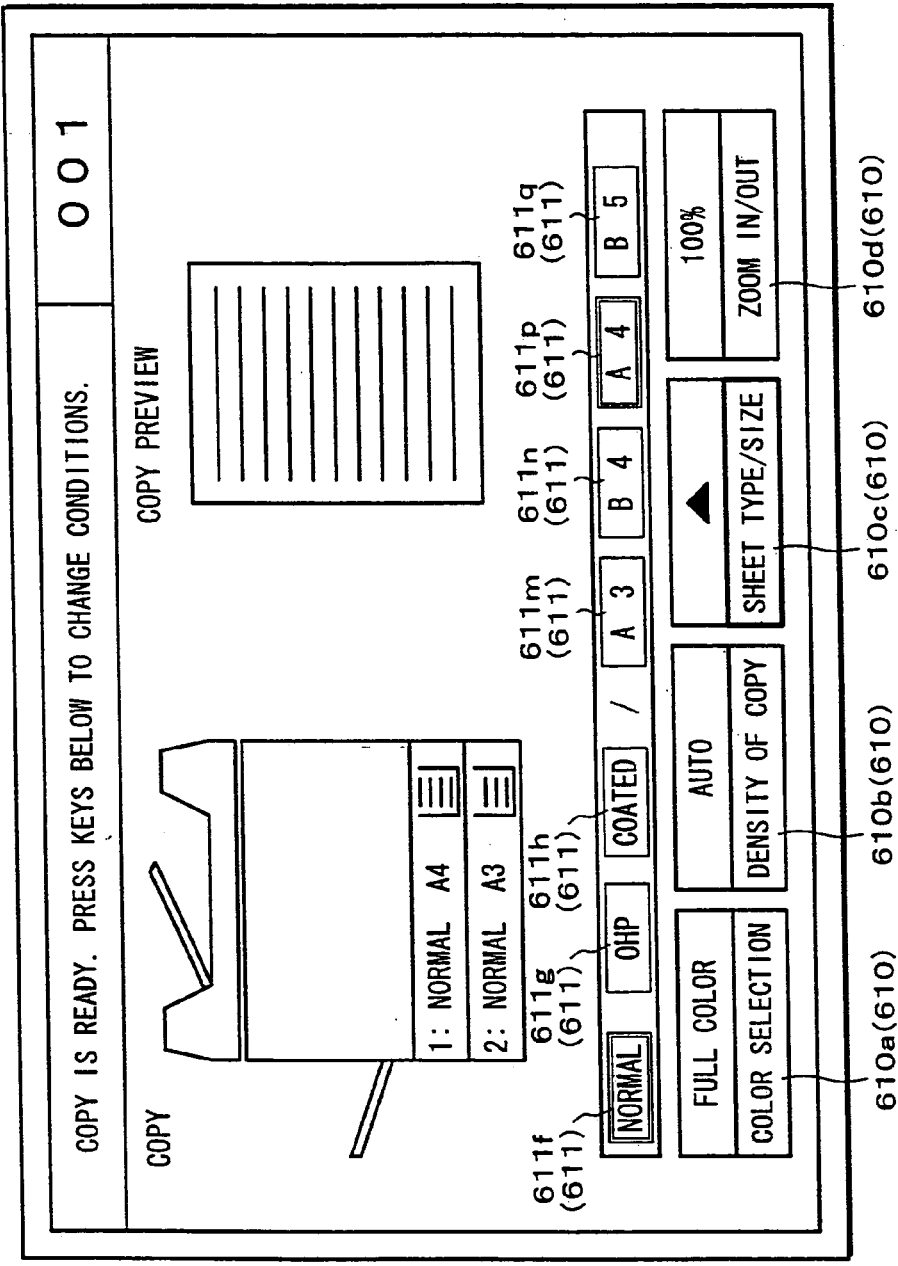
FIG. 13 is an explanatory drawing showing another example of the selection screen which is displayed during standby of the color LCD on the operation panel shown in FIG. 5.

Also, instead of operating the condition keys 610 again to close the selection keys 611 of the selected condition display area 609 in FIG. 11, another condition key 610, e.g., the sheet type/size key 610c may be operated. In this case, as shown in FIG. 13, the selection keys 611 for color selection are closed, "full color" is displayed on a display frame of the display frame of the setting display area 608, and the selection keys 611 of the sheet type/size key 610c are displayed.

In this case, a display frame of the setting display area 608, that corresponds to the sheet type/size key 610c, displays ▲ to indicate that a type and size of sheets are being selected. In FIG. 13, the selection keys 611 on display include a normal sheet key 611f, an OHP key 611g, and a coated paper key 611h for sheet type selection; and an A3 key 611m, a B4 key 611n, an A4 key 611p, and a B5 key 611q for size selection.

Next, in the case of the operational setting status of the image forming apparatus 1, as described above, when the ten-digit keypad 8 is operated in a specific order in S2, the standby screen 601 is switched to the operation reset screen 621 on the color LCD 6 (S18). And then, judgement is made if the enter key 624 displayed on the operational setting area 622 is operated or not (S19). If the enter key 624 is operated, a set operation is performed, which corresponds to the content of the selected setting key 623 displayed on the operational setting area 622 (S23).

If the enter key 624 is not operated in S19, judgement is made if the clear all key 10 is operated or not (S20). If the clear all key 10 is operated, the step returns to S1. Meanwhile, if the clear all key 10 is not operated in S20, judgement is made if the end key 625 is operated or not (S21). If the end key 625 is operated, the step returns to S1 as the clear all key 10 is operated.

In S21, if the end key 625 is not operated, judgement is made if the setting keys 623 is operated or not (S22). If the setting key 623 is operated, an active display is provided on the operated setting key 623 (S24). In S22, if the setting key 623 is not operated, the step returns to S19 to wait for an operation of the enter key 624, the clear all key 10, the end key 625, or the setting key 623.

In the image forming apparatus 1 of the present embodiment, it is necessary to determine how a concentration input value of image data is changed to a concentration output value in order to suitably form an image, which is read in the image reading section 110, in the image forming section 210. This is because an image forming property of the image forming section 210 differs between the image forming sections 210. Here, a relationship between a concentration input value and a concentration output value is generally referred to as a γ property.

The γ property is determined before shipping the image forming apparatus 1 from a factory or upon installing the image forming apparatus 1. Referring to flowcharts of FIGS. 14 and 15, the steps of setting the γ property will be discussed.

Figure 14:
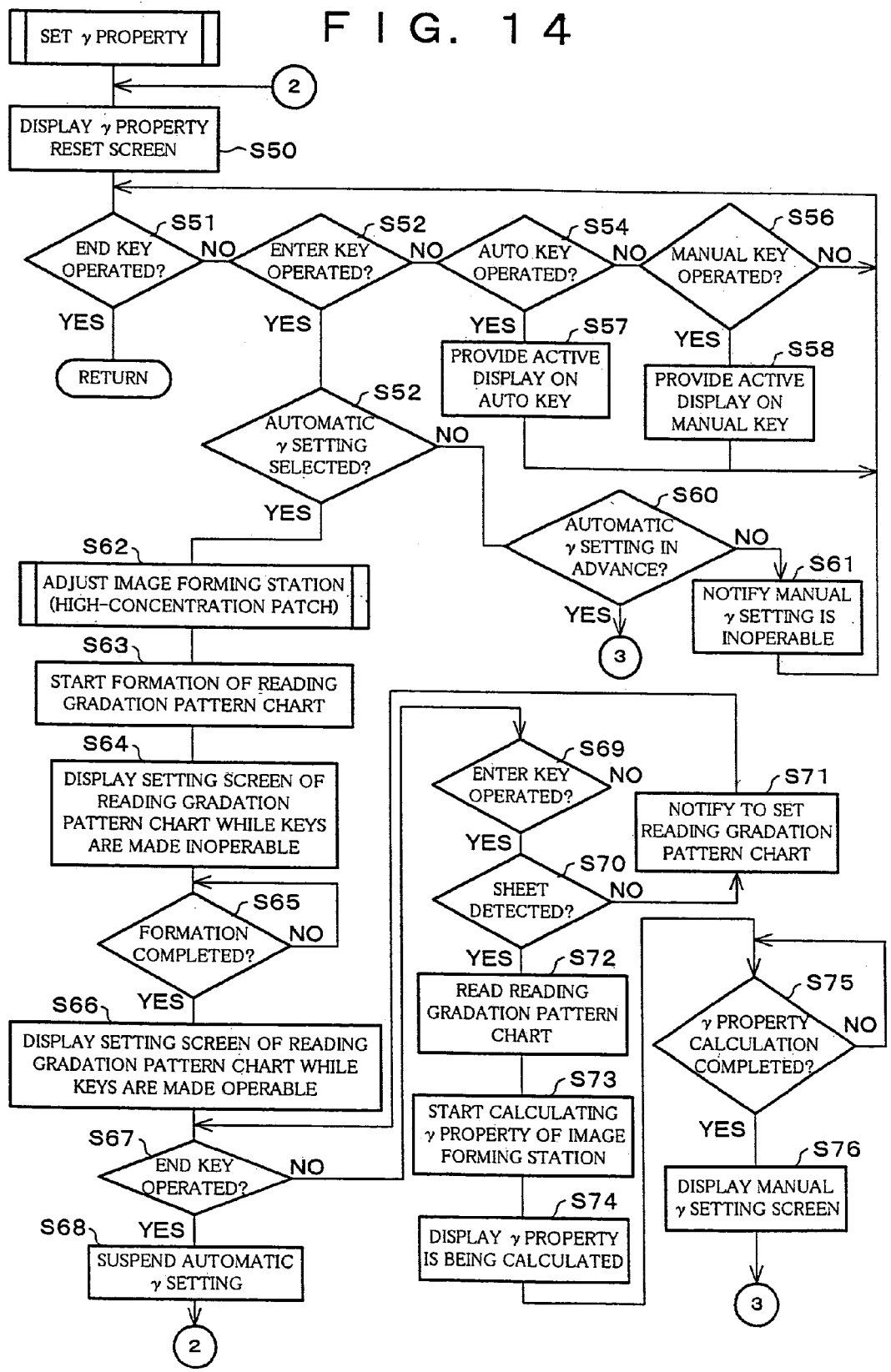
FIG. 14 is a flowchart showing the operation procedure of setting a γ property in the image forming apparatus of FIG. 2.

The flowcharts of FIGS. 14 and 15 show steps of operating the γ property key 623a of the setting keys 623 in the operational setting status (S18 to S24) of the operation flowcharts shown in FIGS. 9 and 10.

Firstly, while the operation reset screen 621 is displayed, when the γ property key 623a of the operation setting area 622 is operated, an active display is provided on the γ property key 623a as shown in FIG. 8. And then, the enter key 624 is operated and a γ property is set.

Figure 16:
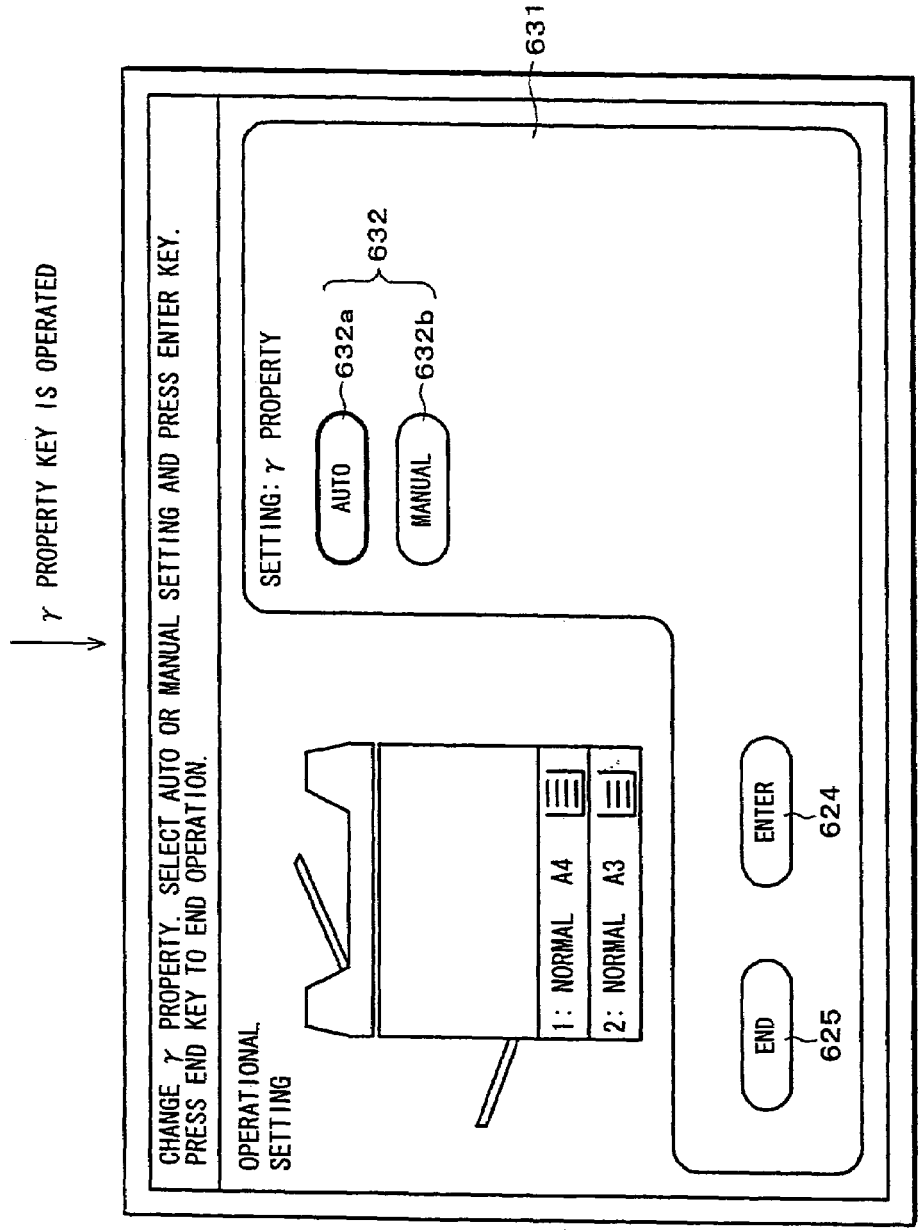
FIG. 16 is an explanatory drawing showing a γ property reset screen which is displayed during a γ property setting of the color LCD on the operation panel shown in FIG. 5.

Afterwards, as shown in FIG. 16, a γ property reset screen 631 is displayed (S50). The γ property reset screen 631 displays a γ property selection key 632 composed of an automatic key 632a and a manual key 632b. The automatic key 632a allows the image forming apparatus 1 to automatically set a γ property, and the manual key 632b allows the user to manually set a γ property. Further, the γ property reset screen 631 simultaneously displays the enter key 624 and the end key 625.

The γ property reset screen 631 waits for an operation of the enter key 624, the end key 625, the automatic key 632a, or the manual key 632b (loop connecting S51, S53, S54, S56, and S51). If the end key 625 is operated in S51, the setting of a γ property is completed, the step returns to S18 of the flowcharts of FIGS. 9 and 10, and the operation reset screen 621 (FIG. 8) is displayed in S18. In S54, if the automatic key 632a is operated, an active display is provided on the automatic key 632a (S57), and the step returns to S51. If the manual key 632b is operated in S56, an active display is provided on the manual key 632b (S58), and the step returns to S51. If the enter key 624 is operated in S53, judgement is made if an automatic setting of a γ property (hereinafter, abbreviated as arbitrary γ setting) is selected or not (S59).

In S59, if an automatic γ setting is not selected, namely, if a manual γ setting is selected, judgement is made if an automatic γ setting has been previously made or not (S60). In 60, if it is found that an automatic γ setting has been made before, the step goes to S77 (③ of FIG. 15). In S60, if it is found that an automatic γ setting has not been made before, notification is made that a manual γ setting is not allowed, and the step returns to S51.

As described above, in S60, judgement is made if an automatic γ setting has been previously made or not. This is because when setting and judging a γ property of the image forming apparatus 1 in the factory, it is necessary to prevent the manual setting from preceding the automatic setting in order to avoid a long setting time of a γ property.

Moreover, a characteristic differs between the constituents including the charging devices 223a, 223b, 223c, and 223d, the transfer devices 225a to 225d, the light sensitive drums 222a to 222d, developing devices 224a to 224d, and the image forming stations Pa to Pd such as a high-voltage transformer. If the constituents are exchanged, an image-forming property of the image-forming stations Pa to Pd is varied due to a change in the combination of the constituents.

Therefore, in S60, judgement may be made if an automatic γ setting is made or not after the constituents of the image forming stations Pa to Pd are exchanged. Hence, during a γ setting after exchanging the constituents of the image forming stations Pa to Pd, it is possible to prevent a manual γ setting from preceding an automatic γ setting so as to previously make an automatic setting. This arrangement makes it possible to avoid a long setting time of a γ property.

Figure 17:
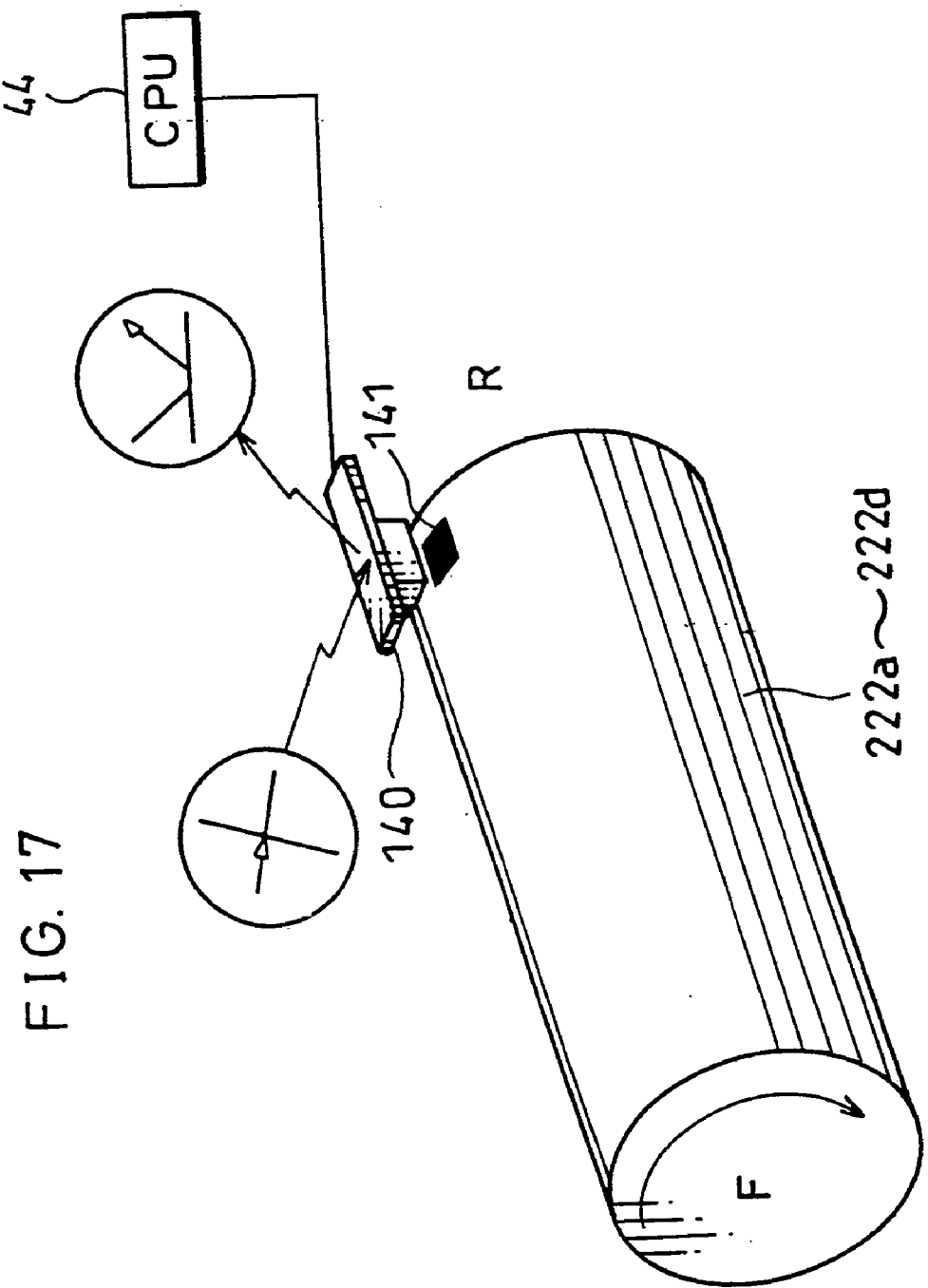
FIG. 17 is an explanatory drawing showing the formation of a toner patch with a high-concentration area, that is used for adjusting an image forming station in the image forming apparatus of FIG. 2.

In 59, if an automatic γ setting is selected, a γ setting is automatically made thereafter. In the automatic γ setting, the image forming stations Pa to Pd are firstly adjusted (S62) The adjustment on the image forming stations Pa to Pd is described. First, adjustment is made to arbitrarily change parameters of the image forming stations Pa to Pd. As shown in FIG. 17, when the front of the image forming apparatus 1 is represented by F and the rear is represented by R, a high-concentration toner patch (hereinafter, abbreviated as a high-concentration patch) 141 is formed on a rear end of each of the light sensitive drums 222a to 222d.

And then, in the concentration sensor 140 (FIG. 4) such as a light detecting sensor, that is provided on a pattern image detection unit, a concentration of the high-concentration patch 141 is detected and a detected value is outputted to the image data processing section 41. In the image data processing section 41, the detected value is compared with a predetermined reference value, and parameters of the image forming stations Pa to Pd are computed such that the detected value is within a predetermined range of the reference value.

As described above, in S62, based on a) a detected concentration value of the high-concentration patch 141 and b) parameters of the image forming stations Pa to Pd, that correspond to the detected high-concentration patches 141 (the patch is formed by a predetermined parameter value), it is possible to compute parameter values of the image forming stations Pa to Pd that can preferably form an image across concentration areas. Here, with the detection of the high-concentration patches 141, parameter values of the image forming stations Pa to Pd are computed as representative values of all concentration areas. This is because the high-concentration patches 141 can realize toner patches with more stable concentrations in the event of a change in conditions such as surroundings, as compared with a toner patch having a medium concentration area or a low concentration area.

Additionally, in the present embodiment, parameters of the image forming stations Pa to Pd, that are adjusted according to detected concentration values of the high-concentration patches 141, are a developing bias voltage and a grid voltage of a scorotron charging device. The parameters are not particularly limited. For example, a charging potential or writing laser power are also applicable as disclosed in Japanese Laid-Open Patent Application No. 202092/1996 (Tokukaihei 8-202092, published on Aug. 9, 1996).

Further, in the present embodiment, when adjusting the image forming stations Pa to Pd, a concentration is detected on the high-concentration patch 141 which is formed on each of the light sensitive drums 222a to 222d. The detection is not particularly limited. For example, it is also possible to detect a concentration of the high-concentration patch 141 which is transferred on the transfer/transportation belt 216.

Figure 18:
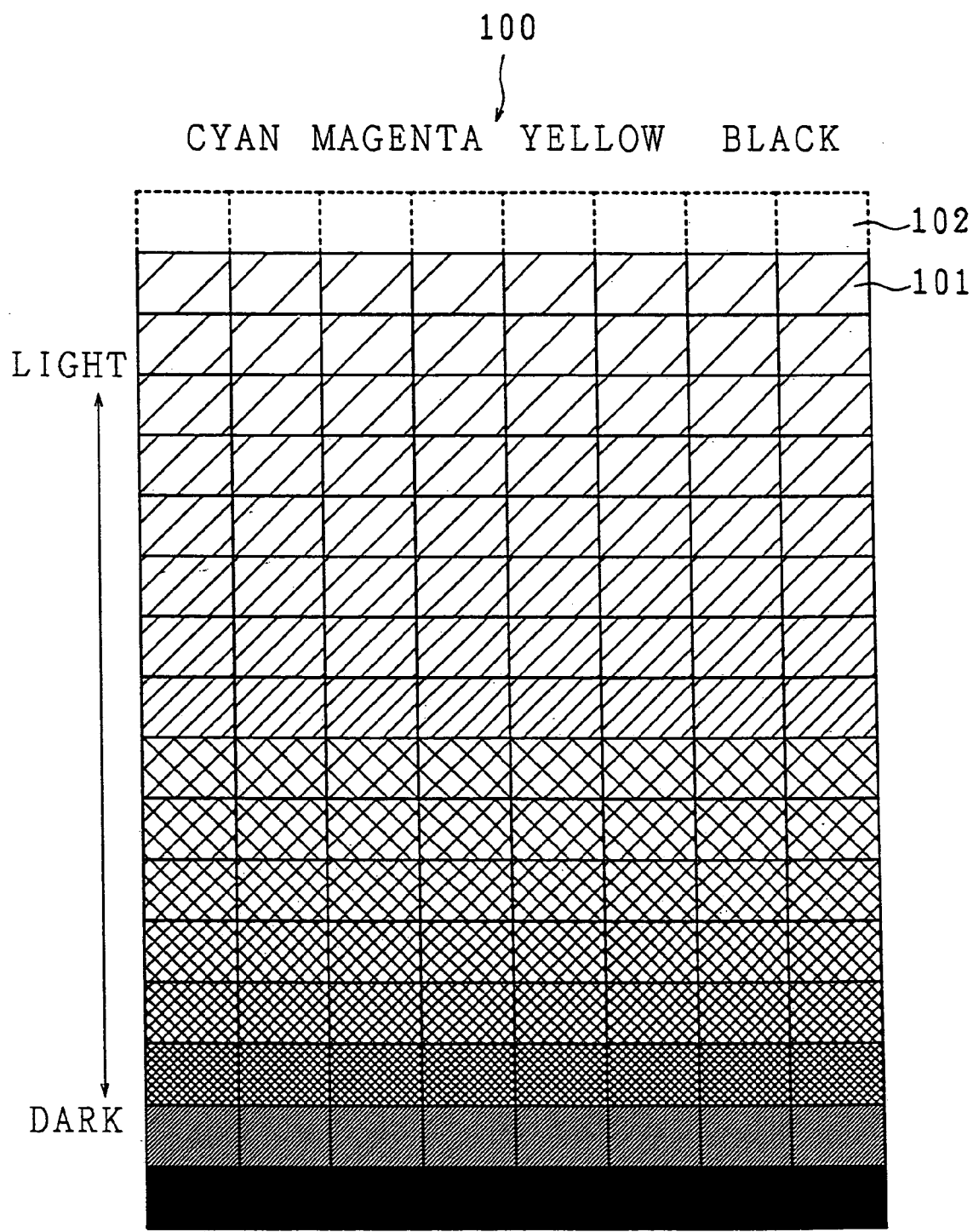
FIG. 18 is an explanatory drawing showing an outline of the reading gradation pattern chart shown in FIG. 1.

In S62, upon completion of adjustment on parameters of the image forming stations Pa to Pd, image formation of a reading gradation pattern chart (pattern chart) is started as shown in FIG. 18 (S63). Next, while key operation is made inoperable, a display is provided for notifying how the reading gradation pattern chart is set (S64).

Subsequently, waiting is made for completion of the image formation of the reading gradation pattern chart (S65). Upon completion of image formation of the reading gradation pattern chart, the display is provided for notifying a setting of the reading gradation pattern chart previously shown on the color LCD6, while the key operation is made operable (S66).

Figure 19:
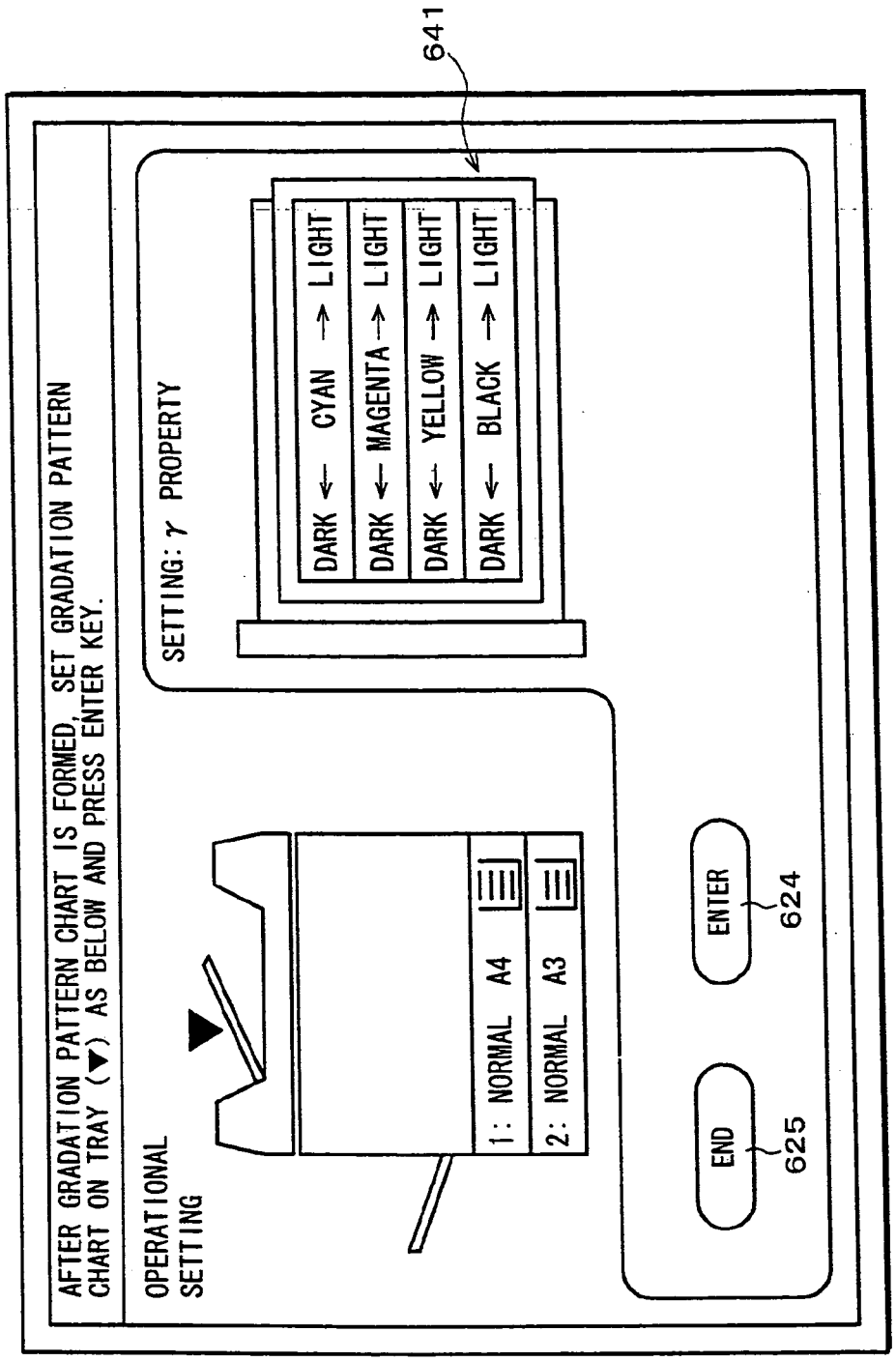
FIG. 19 is an explanatory drawing showing the γ property reset screen which is displayed during a γ property setting of the color LCD on the operation panel shown in FIG. 5.

As shown in FIG. 19, the display provided on the color LCD 6 in S66 is changed from the γ property reset screen 631 to a γ property setting second screen 641. The γ property setting second screen 641 is a setting screen for setting the reading gradation pattern chart, and the enter key 624 and the end key 625 are displayed as in the γ property reset screen 631. Moreover, the external view displaying area 605 displays an external view of the image forming apparatus 1. A pattern chart set diagram is also displayed beside the external view in order to show the arrangement of the reading gradation pattern chart (described later).

Here, the display provided on the color LCD 6 in S64 is fundamentally identical to the γ property setting second screen 641. However, the key operation is made inoperable. Thus, the frames of the enter key 624 and the end key 625 may be shown in dotted lines or the keys may be displayed in a light color to notify that key operation is not operable.

Next, on the γ property setting second screen 641, judgement is made if the end key 625 is operated or not (S67). If the end key 625 is operated, the automatic γ setting is suspended (S68), the step returns to S50, and the γ property reset screen 631 waits for key operation. If the end key 625 is not operated in S67, judgement is made if the enter key 624 is operated or not (S69). If the enter key 624 is not operated, the step returns to S67. If the enter key 624 is operated, judgement is made if the reading gradation pattern chart (sheet) is set at a setting position of the reading gradation pattern chart (S70).

In S70, if a sheet is not detected, notification is made to set the reading gradation pattern chart (S71), and the step returns to S67. If a sheet is detected in S71, on the assumption that the reading gradation pattern chart is set, reading gradation patterns formed in the reading gradation pattern chart are read (S72).

Regarding the image forming stations Pa to Pd, calculation of a γ property starts based on read concentrations of the read gradation patterns and dither values corresponding to the gradation patterns (S73). A display is provided to notify that calculation of a γ property has been carried out (S74). Waiting is made for calculation of a γ property (S75). When calculation is completed, a γ property calculated by an automatic setting is displayed (S76). In S76, a manual setting screen is displayed for making a manual setting of a γ property. When calculation of a γ property is completed, an image of a visual gradation pattern chart (pattern chart) 200 is formed as shown in FIG. 20 (S77 of FIG. 15).

Figure 20:
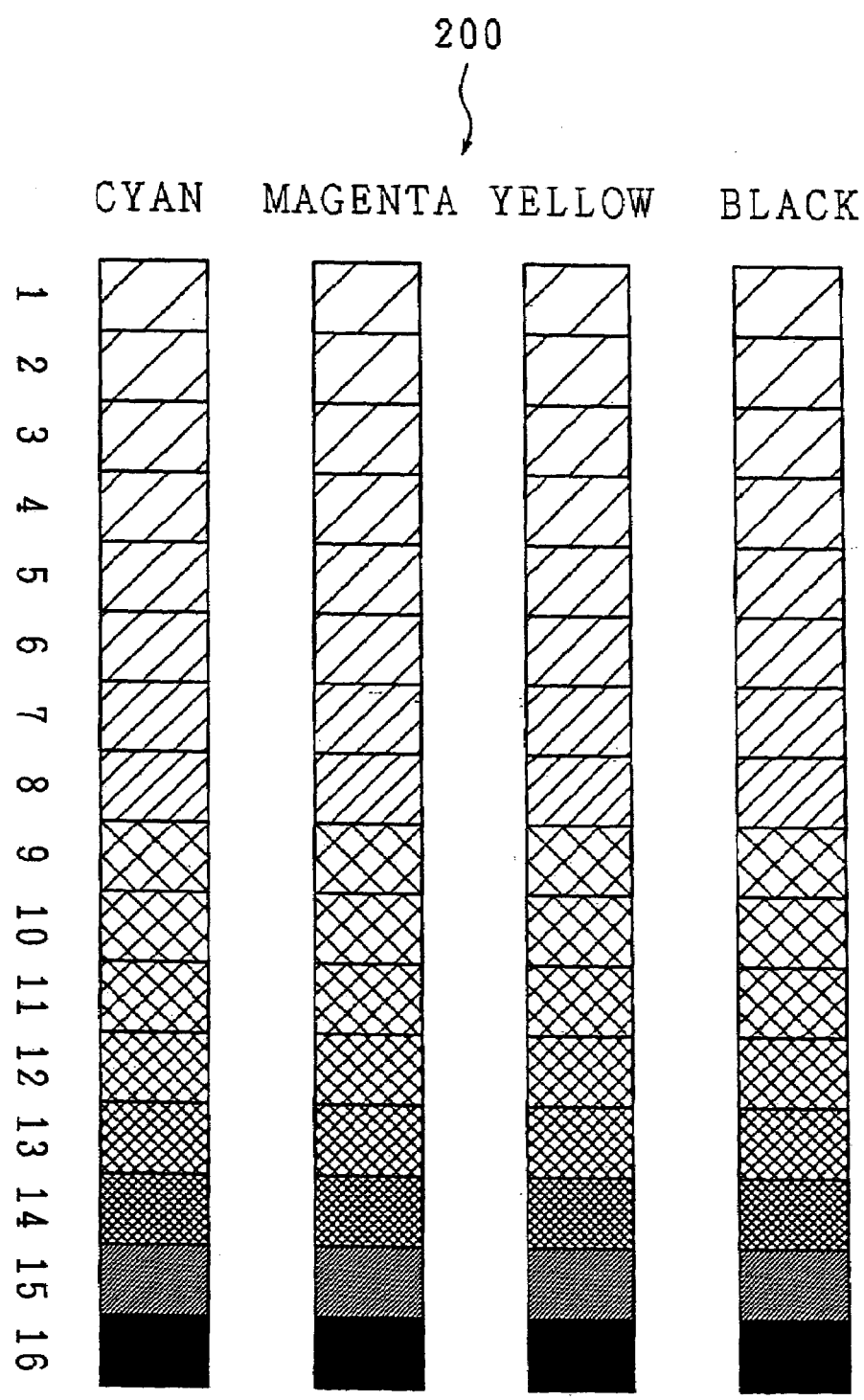
FIG. 20 is an explanatory drawing showing an outline of a visual gradation pattern chart which is used for manually adjusting a γ property of the image forming apparatus shown in FIG. 2.

Here, the visual gradation pattern chart 200 of FIG. 20 is smaller in number of gradation steps than the reading gradation pattern chart (described later).

As described above, in the image forming apparatus 1 of the present invention, a reading gradation pattern chart is formed on a sheet based on original image information (referred to as first image information). Thereafter, the reading gradation pattern chart is read as second image information and adjustment information (in this case, γ property) is obtained. The image processing section 2 adjusts image processing conditions based on the adjustment information.

However, only the above automatic judgement on gradation cannot satisfy the preference and needs of the user. Hence, it is preferable to use the foregoing visual gradation pattern chart 200 to judge gradation. Here, when the reading gradation pattern chart is referred to as a first image, the visual gradation pattern chart 20*b* is referred to as a second image.

Generally, when the image reading means is used for judging gradation, a large number of gradation steps enable judgement with higher accuracy. When the user judges gradation, too many gradation steps result in complicated judgement, causing inaccurate judgement. In contrast, fewer gradation steps are preferable for the user; however, the image reading means cannot make judgement with accuracy.

Hence, as earlier mentioned, the visual gradation pattern chart 200 is smaller in number of gradation steps than the reading gradation pattern chart. Namely, the reading gradation pattern chart is larger in number of the steps than the visual gradation pattern chart 200. As a result, gradation can be judged with higher accuracy.

The γ property setting second screen 641 displays a position for setting the reading gradation pattern chart and a message on the reading gradation pattern chart before image formation of the reading gradation pattern chart is completed. In other words, the user can recognize a setting of the obtained reading gradation pattern chart before completion of the image formation.

As shown in FIG. 19, the external view of the external view display area 605 shows information about the reading gradation pattern chart. The information includes a position for setting the reading pattern chart, face up or face down, and orientation.

To be specific, the document set tray of the RADF 112 (FIG. 2) displays ▼, which indicates a setting position (set information) of the reading gradation pattern chart. The reading gradation pattern chart is set so as to place the gradation pattern face up, a gradation pattern of cyan on the rear of the apparatus, and a gradation pattern of black on the front of the apparatus. In the RADF 112, the surfaces of the reading gradation pattern charts are reversed before the chart is transported to a contact glass. Hence, when setting the chart, the gradation pattern is placed face up.

Figure 21:
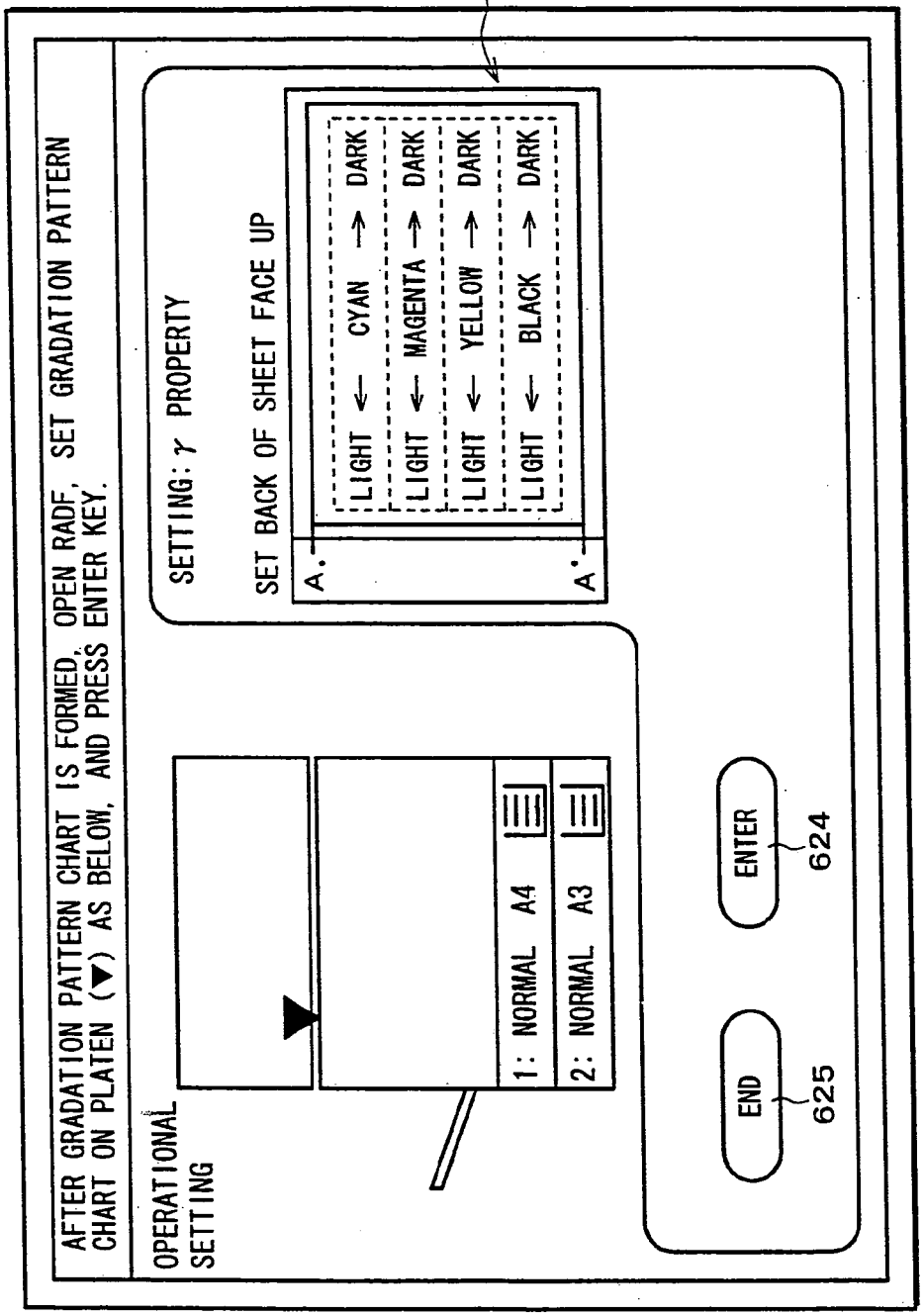
FIG. 21 is an explanatory drawing showing the γ property reset screen which is displayed during a γ property setting of the color LCD on the operation panel shown in FIG. 5.

Incidentally, when the RADF 112 transports the reading gradation pattern chart, the reading gradation pattern chart may get dirty or jammed during transportation. Thus, as shown in FIG. 21, notification may be provided that the reading gradation pattern chart should be directly set on the contact glass instead of using the RADF 112. In this case, the external view of the apparatus shows that the reversing automatic document feeder 112 is opened, and ▼ is displayed on a part of the contact glass.

The direction of the reading gradation pattern chart is set as follows: the pattern chart is set at a document set reference stage of A3 size, gradation pattern is placed face down (namely, the reverse side is set upward), a gradation pattern of cyan is placed on the rear of the apparatus, and a gradation pattern of black is placed on the front of the apparatus. The setting pattern is displayed on the pattern chart set diagram.

Figure 22:
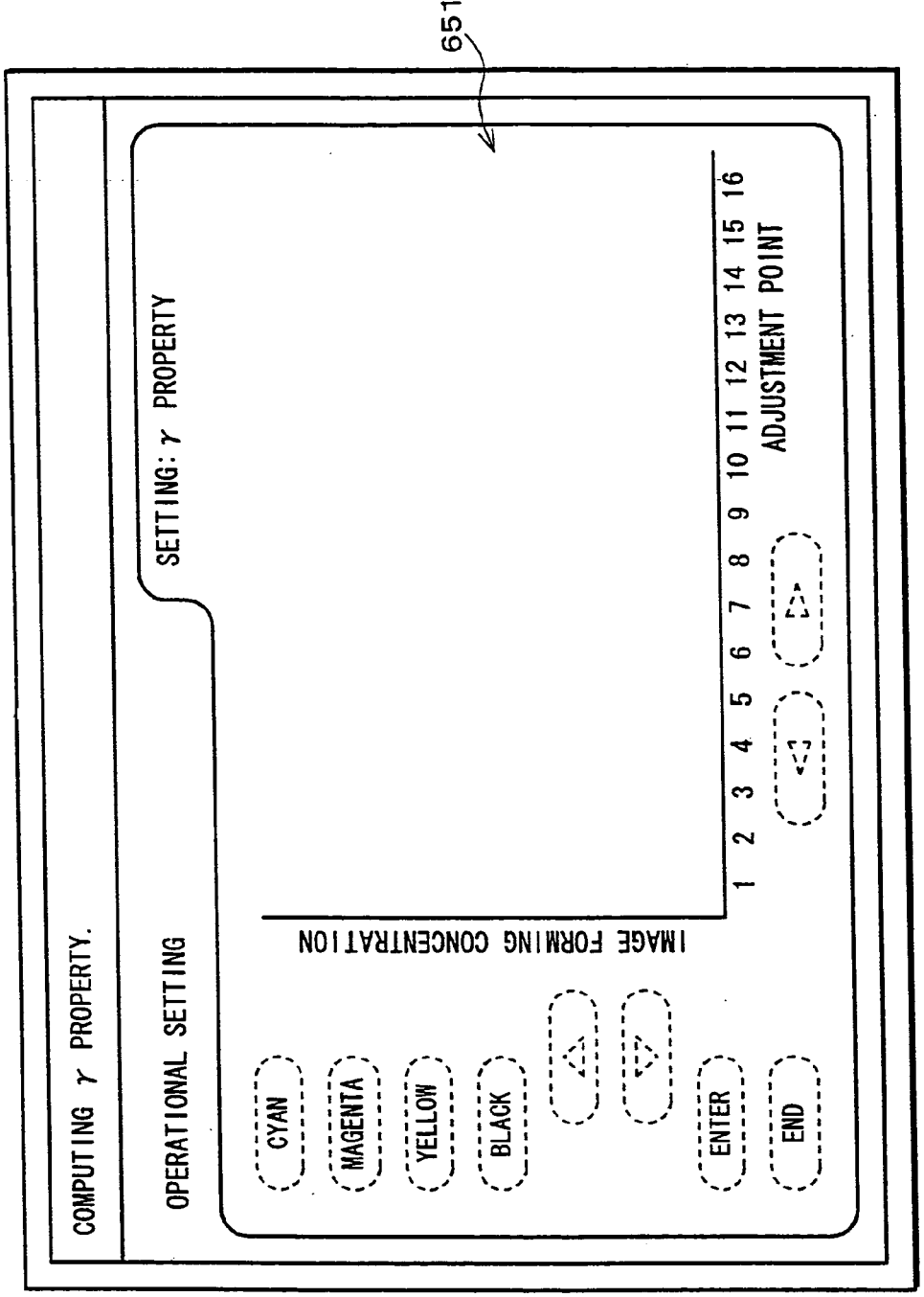
FIG. 22 is an explanatory drawing showing an automatic computing screen for computing a γ property, that is displayed during a γ property setting of the color LCD on the operation panel shown in FIG. 5.

Here, regarding the above process, the screen on the color LCD 6 will be discussed. In S74, during calculation of a γ property, the color LCD 6 displays a γ property setting third screen 651 in place of the γ property setting second screen 641 as shown in FIG. 22. On this screen, the message area 602 notifies that a γ property is being computed, and key operation is made inoperable (as described above, when the key operation is inoperable, the keys are displayed in dotted lines).

Figure 23:
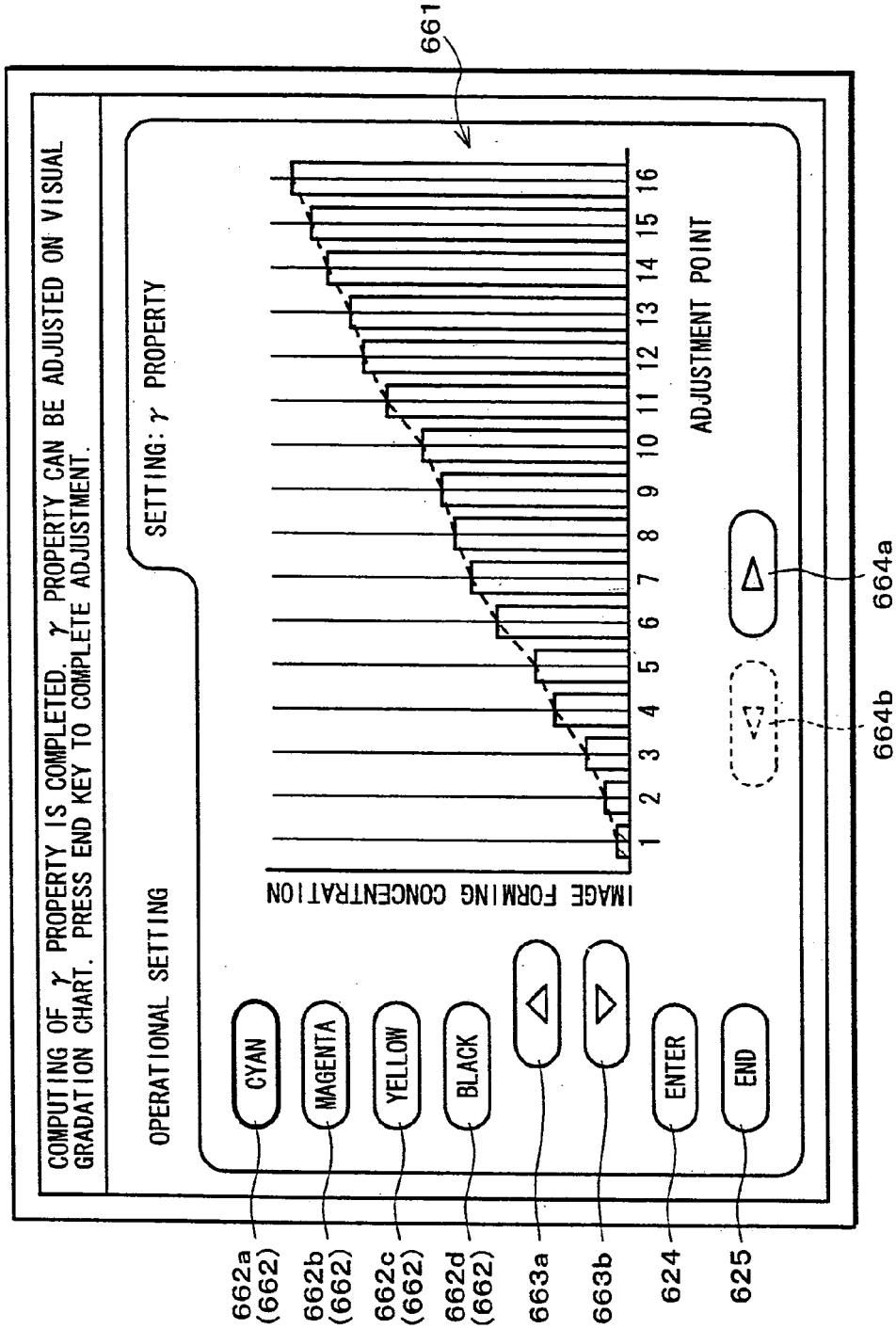
FIG. 23 is an explanatory drawing showing a screen for manually setting a γ property, that is displayed during a γ property setting of the color LCD on the operation panel shown in FIG. 5.

Further, after computing a γ property in S75, the color LCD 6 displays a γ property setting fourth screen 661 in place of the γ property setting third screen 651 as shown in FIG. 23. On this screen, CMYK concentration keys 662 are provided for displaying a γ property for each of the colors. FIG. 23 shows four keys including a cyan concentration key 662*a*, a magenta concentration key 662*b*, a yellow concentration key 662*c*, and a black concentration key 662*d*.

When the CMYK concentration keys 662 are operated, a γ property of a color corresponding to the operated key can be displayed by a γ property graph, in which a vertical axis represents an image forming concentration and a horizontal axis represents an adjustment point. In FIG. 23, the cyan concentration key 662*a* is operated and a γ property of cyan is displayed in the graph.

Moreover, in the γ property setting fourth screen 661 of FIG. 23, a γ property computed for each color is displayed in the graph, and a hue of cyan, magenta, yellow and black can be adjusted to meed the user's preference. To be specific, while the user visually checks the visual gradation pattern chart 200 obtained in S77, a hue of colors can be adjusted. Thus, the γ property setting fourth screen 661 is provided with a concentration up key 663*a*, a concentration down key 663*b*, an adjustment point up key 664*a*, and an adjustment point down key 664*b*.

In FIG. 23, the concentration up key 663*a* and the concentration down key 663*b* are provided below the CMYK concentration keys 662 to adjust a concentration of a color selected by the CMYK concentration keys 662. The adjustment point up key 664*a* and the adjustment point down key 664*b* are used for shifting the adjustment point on the horizontal axis of the γ property graph and are provided below the γ property graph in FIG. 23.

Moreover, the adjustment point of the γ property graph and the gradation pattern of the visual gradation pattern chart 200 correspond to each other. The adjustment point is shifted by the adjustment up key 664*a* and the adjustment point down key 664*b*, so that a concentration of the gradation pattern in the visual gradation pattern chart 200 can be changed according to the user' preference, while the user visually checks the visual gradation pattern chart 200.

Referring to the flowchart of FIG. 15, a manual setting of the γ property will be discussed. As shown in FIG. 15, after forming the visual gradation pattern chart 200 in S77, judgement is made if the end key 625, the enter key 624, the CMYK concentration keys 662, the concentration up key 663*a*, the concentration down key 663*b*, the adjustment point up key 664*a*, and the adjustment point down key 664*b* are operated or not respectively in S78, S79, S80, S81, S82, S83, and S84.

In S78, if the end key 625 is operated, judgement is made if a γ property is manually set or not (S85). If a manual setting is not made, the setting of a γ property is completed. Hence, S23 is completed and the step returns to S18 in the flowcharts of FIGS. 9 and 10.

If a manual setting is made in S85, display is provided for selecting if a target concentration of a γ property (an image forming concentration at a predetermined adjustment point in the γ property graph) is replaced with the manually set value or not (S86), and judgement is made if the enter key 624 is operated or not (S87). If the enter key 624 is operated, a target concentration is replaced with the manually set value (S89) and the setting of a γ property is completed. Meanwhile, if the enter key 624 is not operated in S87, judgement is made if the end key 625 is operated or not (S88). If the end key 625 is operated, the setting of a γ property is completed. If the end key 625 is not operated in S88, the step returns just before S87 to wait for the operation of the enter key 624 or the end key 625.

In S79, if the enter key 624 is operated, an image of the visual gradation pattern chart 200 is formed again based on a γ property adjusted on the screen (S90), and the step returns to S78. In S80, if the CMYK concentration keys 662 are operated, an active display is provided on the operated CMYK concentration key (S91). And then, a γ property of a color, which corresponds to the operated CMYK concentration key 662, is displayed on a graph (S92), and the step returns to S78.

In S81, if the concentration up key 663a is operated, a concentration of the adjustment point shown by an active display is increased by one tick in the γ property graph (S93), and an operation for switching operable/inoperable of up/down key operation (described later) is carried out (S97). And then, the step returns just before S78.

In S82, if the concentration down key 663b is operated, a concentration of the adjustment point shown by an active display is decreased by one tick (S95), and the operation for switching operable/inoperable of up/down key operation is carried out (S94). And then, the step returns to S78.

In S83, if the adjustment point up key 664a is operated, the active adjustment point is shifted upward by one point (S96), and the operation for switching operable/inoperable of up/down key operation is carried out (S94). And then, the step returns just before S78.

In S84, if the adjustment down key 664b is operated, judgement is made if the operation of the adjustment point down key 664b is operable or not (S97), the active adjustment point is shifted downward by one point (S98), and the operation for switching operable/inoperable of up/down key operation is carried out (S94). And then, the step returns to S78.

Here, in S97, judgement is made if the operation of the adjustment point down key 664b is operable or not. This is because an active adjustment point is disposed at 1 on a screen displayed in S76 (screen shown in FIG. 23), so that even when the adjustment point down key 664b is operated in this state, a lower adjustment point is not available and the shift cannot be made.

Figure 24:
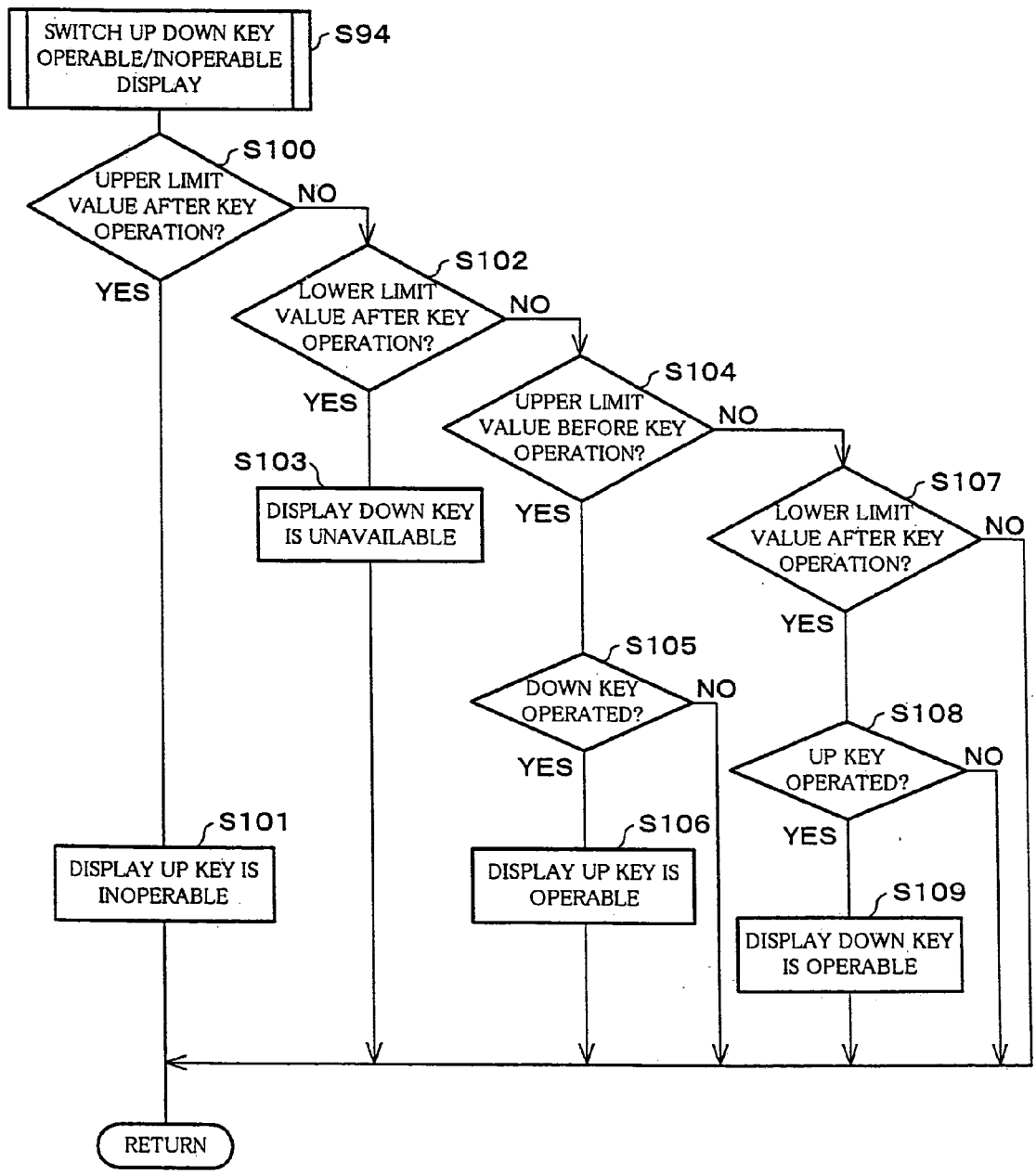
FIG. 24 is a flowchart showing the controlling steps of switching an operable/inoperable display of an up down key operation in the flowchart shown in FIG. 15.

Referring to a flowchart of FIG. 24, the operation for switching operable/inoperable of up/down key operation will be discussed.

The operation for switching operable/inoperable of the up/down key operation is performed as follows: during operation of the concentration up key 663a, the concentration down key 663b, the adjustment point up key 664a, and the adjustment point down key 664b, when an image forming concentration or an adjustment point rises to an upper limit, a notification is provided that keys for increasing a concentration or an adjustment point (hereinafter, referred to as up keys) cannot be operated; meanwhile, when an image forming concentration or an adjustment point decreases to a lower limit, a notification is provided that keys for decreasing a concentration or an adjustment point (hereinafter, referred to as down keys) cannot be operated.

Furthermore, in the operation for switching operable/inoperable of up/down key operation, when the up keys or the down keys are operable on display, the unavailable operation can be made available by operating the other operable keys.

At the start of the operation for switching operable/inoperable of the up/down key operation, judgement is made if a value of an up key operation reaches an upper limit value or not after an up key or a down key is operated (S100). If a value of the up key operation reaches an upper limit value, the up keys are made inoperable (S101) and the operation for switching operable/inoperable of the up/down key operation is completed. In S100, if the value of the operation does not reach an upper limit value, judgement is made if the value of an up key operation reaches a lower limit value or not after an up key or a down key is operated (S102). If a value of the up key operation reaches a lower limit value, the down keys are made inoperable (S103) and the operation for switching operable/inoperable of the up/down key operation is completed. In S102, if the value of the down key operation does not reach a lower limit value just after a key operation, judgement is made if a value of an up key or a down key reaches an upper limit value or not just before operation (S104). If the value reaches an upper limit value, judgement is made if the operated key is a down key or not (S105). If the operated key is a down key, the unavailable operation of the up keys is made available on display (S106). And then, the operation for switching operable/inoperable of the up/down key operation is completed. In S105, if the operated key is not a down key, the operation for switching operable/inoperable of the up/down key operation is completed.

In S104, if a value of the key operation does not reach an upper limit value just before an operation of an up key or a down key, judgement is made if a value of an up key or a down key operation is a lower limit value or not (S107). If the value reaches a lower limit value, judgement is made if the operated key is an up key or not (S108). If the operated key is an up key, the display "unavailable" of the down keys is switched to "available" (S109) and the operation for switching operable/inoperable of the up/down key operation is completed. If the operated key is not an up key, the operation for switching operable/inoperable of the up/down key operation is completed.

Figure 25:
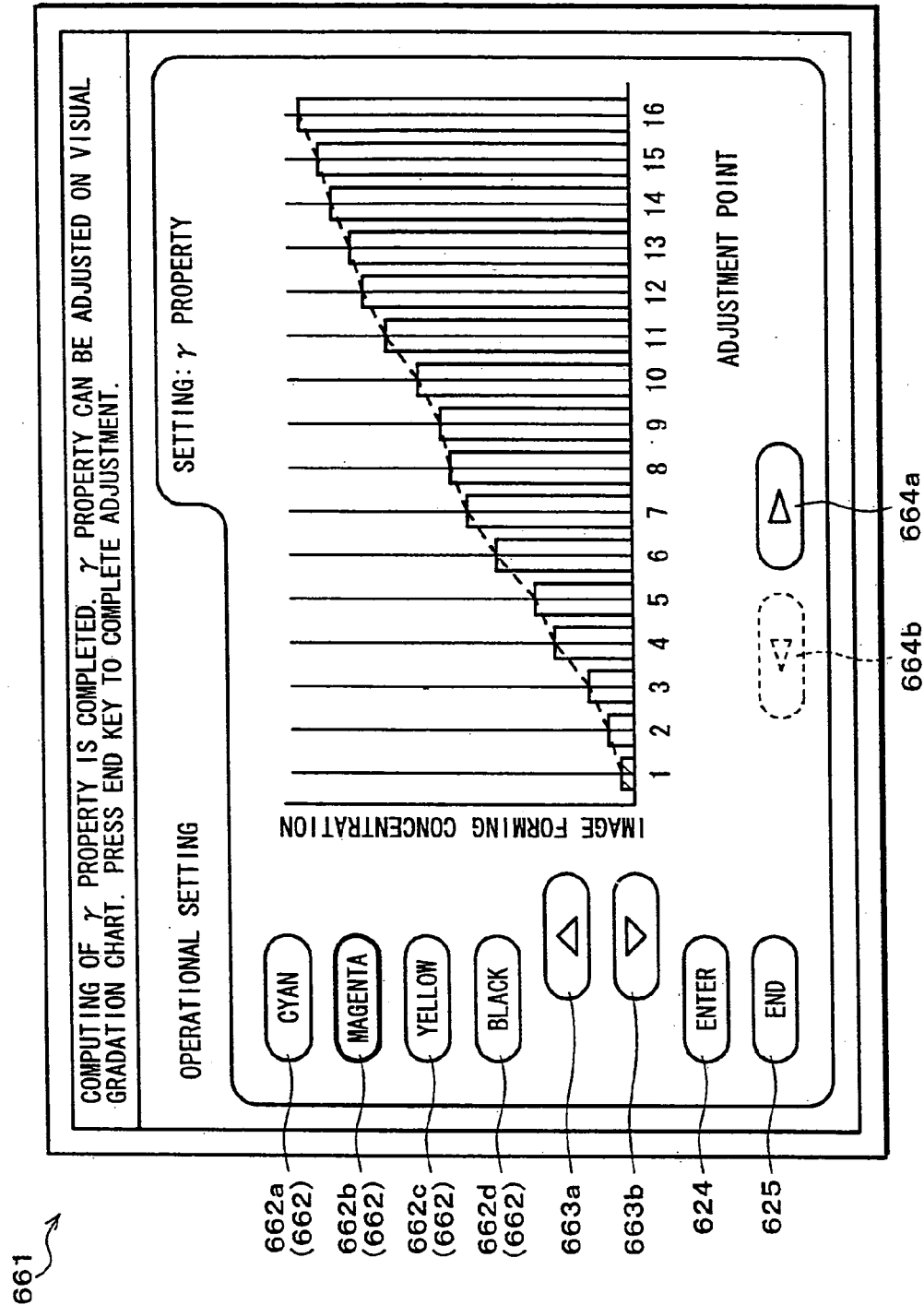
FIG. 25 is an explanatory drawing showing a screen for manually setting a γ property, that is displayed during a γ property setting of the color LCD on the operation panel shown in FIG. 5.

Next, the manual setting of a γ property will be discussed in detail. For instance, in FIG. 23, a γ property graph of cyan is firstly displayed, and the user needs to increase a concentration of magenta from an adjustment point 10 after visually confirming the visual gradation pattern chart 200. In this case, on the γ property setting fourth screen 661 of FIG. 23, the magenta concentration key 662b of the CMYK concentration keys 622 is operated so as to display a γ property graph of magenta as shown in FIG. 25.

Figure 26:
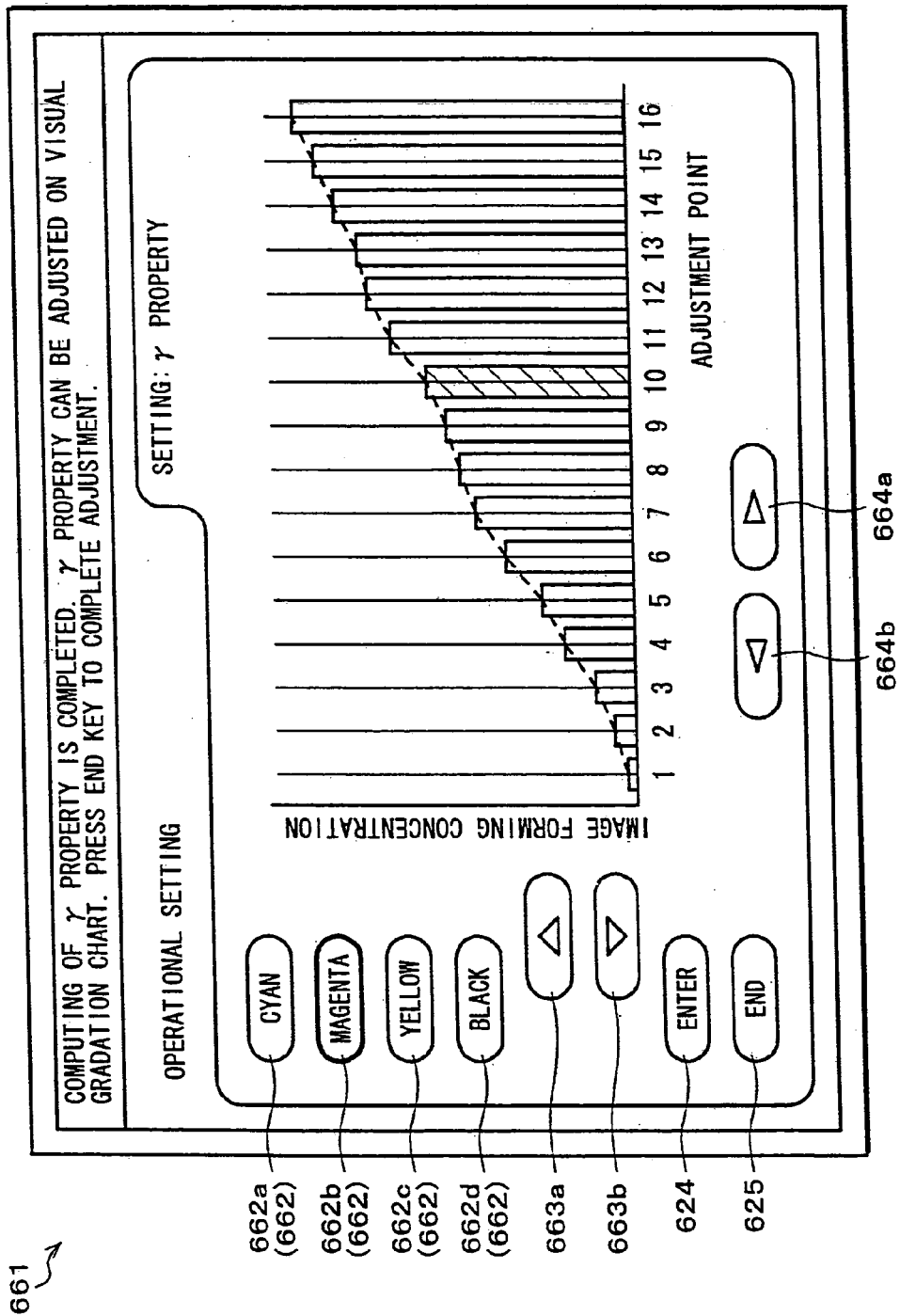
FIG. 26 is an explanatory drawing showing the screen for manually setting a γ property, that is displayed during a γ property setting of the color LCD on the operation panel shown in FIG. 5.
Figure 27:
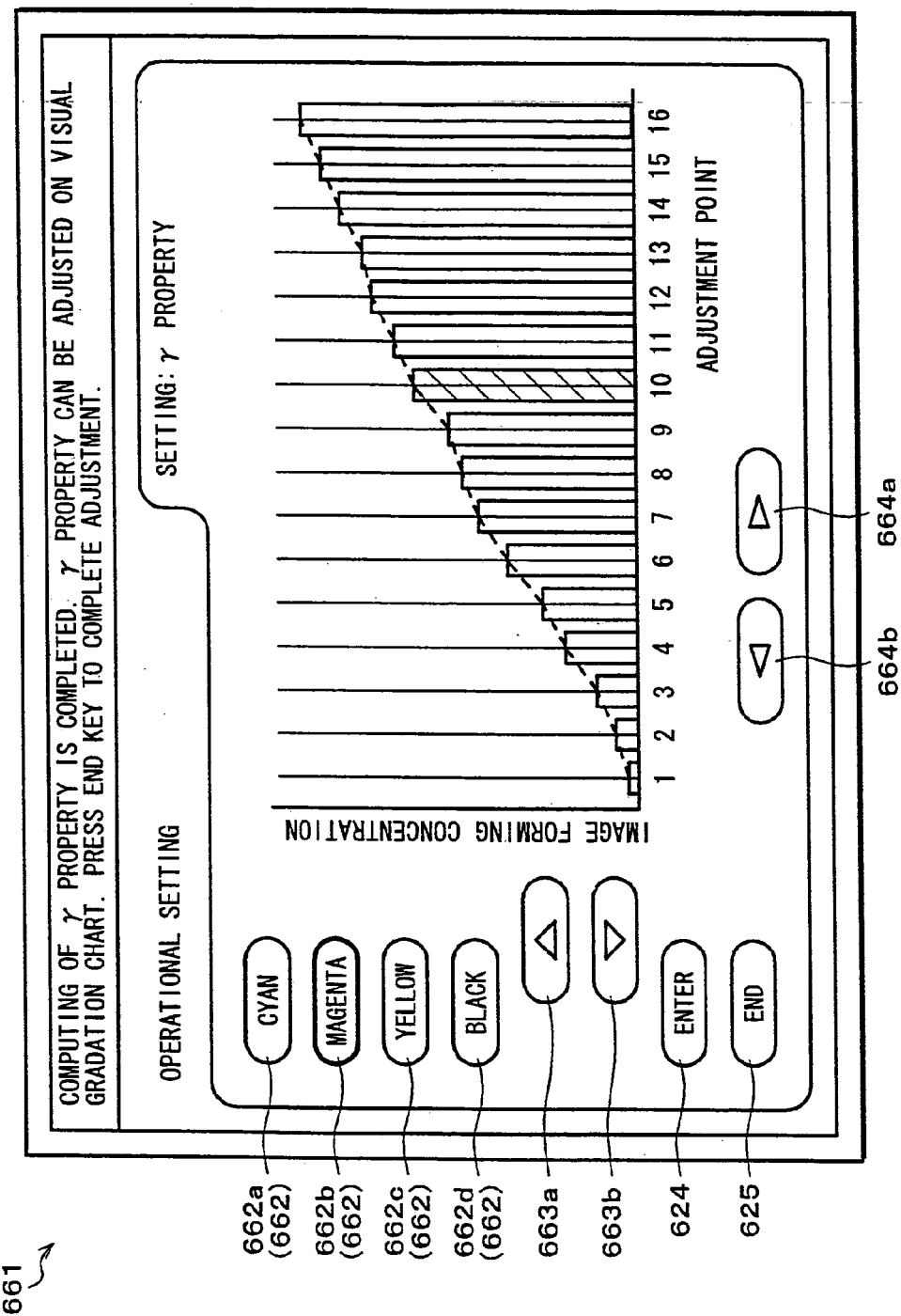
FIG. 27 is an explanatory drawing showing the screen for manually setting a γ property, that is displayed during a γ property setting of the color LCD on the operation panel shown in FIG. 5.

Subsequently, in order to improve a concentration of magenta from the adjustment point 10, on the screen (γ property setting fourth screen 661) of FIG. 25, the adjustment point up key 664a is operated so as to shift an active adjustment point to the adjustment point 10 (FIG. 26). Next, as shown in FIG. 26, the concentration up key 663a is operated so as to increase an image forming concentration of the adjustment point 10 (FIG. 27). As a result, as shown in FIG. 27, a concentration of magenta at the adjustment point 10 is preferably readjusted after visual confirmation of the user. In such a manner, a concentration can be manually adjusted at each adjustment point and each color.

In other words, the following keys are manual input means for manually inputting image information: the concentration up key 663a, the concentration down key 663b, the adjustment point up key 664a and the adjustment point down key 664b, that are displayed in the γ property setting fourth screen 661, and the enter key 624 for performing the setting of the γ property setting fourth screen 661. The manual input means and the image reading section 110 (image reading means) constitute an image information input means of the image forming apparatus 1 in accordance with the present invention.

It is preferable to set a range of manual adjustment in advance. Namely, an adjustment point preferably has an adjustment upper limit value and an adjustment lower limit value to prevent a concentration from varying beyond the range. In this case, an upper limit value of an adjustment point is smaller than a concentration of the following adjustment point by a predetermined amount. Meanwhile, a lower limit value of the adjustment point is larger than a concentration of the previous adjustment point by a predetermined amount. The upper limit value and the lower limit value are set in this manner to prevent an improper display of gradation, that is caused by a concentration difference smaller than a predetermined difference between adjustment points, and to prevent a concentration of an adjustment point from exceeding that of the following adjustment point.

Figure 28:
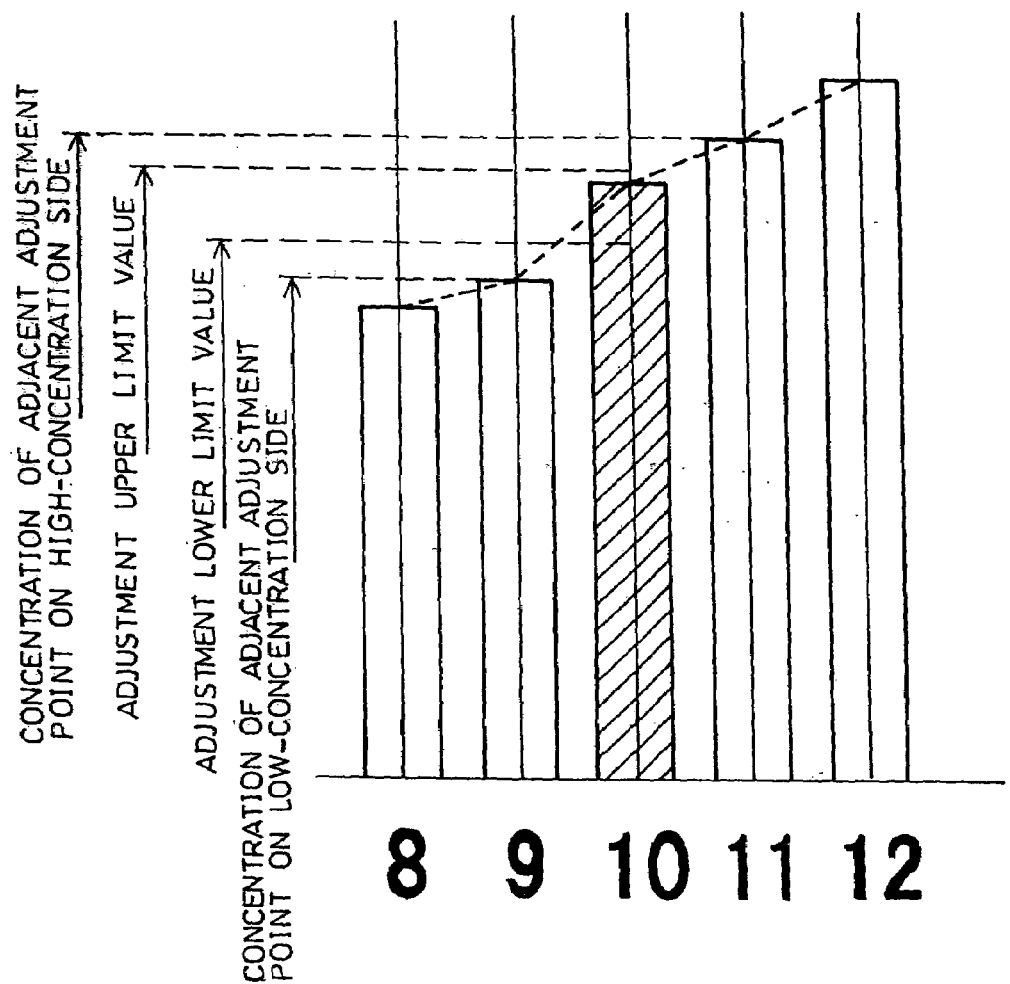
FIG. 28 is an explanatory drawing an example of a range of an upper limit value and a lower limit value of an adjustment point during a γ property setting of the color LCD on the operation panel shown in FIGS. 25 to 27.

For example, as shown in FIG. 28, regarding an adjustment lower limit value and an adjustment upper limit value of the adjustment point 10, the adjustment upper limit value is set smaller by a predetermined amount than an adjacent adjustment point on a high-concentration side (adjustment point 11). The lower limit value is set larger by a predetermined amount than an adjustment point on a low-concentration side (adjustment point 9). For this reason, a concentration of the adjustment point 10 is set between concentrations of the adjacent adjustment point 11 and adjustment point 9. Consequently, gradation can be secured in image formation.

Hence, with the image forming apparatus 1 of the present invention, a γ property is manually set by the user with the visual gradation pattern chart 200 as well as a γ property is automatically setting in order to increase or decrease a specific hue in a specific concentration area. As a result, it is more possible to respond to the preference of the user in color correction.

Additionally, when increasing a specific hue across the γ property areas, another key may be provided for increasing or decreasing concentration values of all the adjustment points in the γ property graph so as to adjust a hue (not shown in the present embodiment). Moreover, the adjustment may be simplified by adjusting a series of several adjustment points at one time.

Further, in the present embodiment, if the enter key 624 is operated in S89, a target concentration is replaced with a manually set value. Additionally, a manually set concentration value may be stored in addition to a target concentration, which has been originally stored, and a γ property may be set by using one of the values depending on the state.

The originally stored target concentration is a standard concentration which does not reflect the preference of the user. Meanwhile, when a manually set concentration value is adopted as a target concentration value, the concentration value reflects the preference of the user by manual adjustment. Therefore, these target concentration values are separately used as follows.

First, when the image forming apparatus 1 is shipped from a factory, the user is not limited, so that it is not necessary to consider the user's preference. Thus, adjustment is made by using a standard target concentration value. Thereafter, when the image forming apparatus 1 is delivered to the user and installed, it is necessary to consider the preference of the user. Thus, a manually set concentration value is replaced with a target concentration value. In this case, when setting a γ property by using the reading gradation pattern chart, a target concentration value reflecting the user's preference is used. Therefore, it is possible to omit the step of manually adjusting a γ property while looking at the visual gradation pattern chart 200 to meet the user's preference.

Moreover, when the user moves the image forming apparatus 1 to another section, an originally set standard concentration value does not meet the preference of the new section because it reflects the preference of the previous section. Hence, when the image forming apparatus 1 is moved, an original standard concentration can be selected.

Next, the reading gradation pattern chart is discussed. As shown in FIG. 18, the reading gradation pattern chart 100 has 32 gradation patterns 101 formed on a sheet such as an A3-size sheet. Every two columns of the gradation patterns 101 correspond to four colors of CMYK with different concentrations, each column including 16 gradation patterns.

On a low-concentration end (light color end) of the reading gradation pattern chart 100, a base concentration measuring section 102 is provided for measuring a concentration of the base of the sheet. Further, regarding two columns of the gradation patterns 101 that is provided for each color, a left column has a light color and a right column has a dark color (described later). Moreover, when setting the reading gradation pattern chart 100, colors and a direction of shades (changing direction of a concentration) are arranged together with the formation of the gradation patterns 101 so as to readily correspond to a setting direction displayed on the color LCD 6.

Furthermore, an image of the reading gradation pattern chart 100 is formed based on pattern information, which is the above-mentioned first image information. The pattern information may be arbitrarily generated by a pattern information generating means or may be stored in the hard disks 43a to 43d (see FIG. 3) of the image memory 43 so as to correspond to a dither value and information of an image forming position.

When forming an image of the reading gradation pattern chart 100, firstly, the pattern information of the gradation patterns 101, that is read from the hard disks 43a to 43d, is transferred to the LCU 42a via an image data bus. And then, the LCU 42a controls the LSUs 42b, 42c, 42d, and 42e so as to form electrostatic latent images on the light sensitive drums 222a to 222d (see FIG. 2). The images are fixed so as to form the gradation patterns 101 by using dither values at positions corresponding to the pattern information. The dither values correspond to the pattern information.

Incidentally, as a property of image formation in the electrostatic image forming stations Pa to Pd, a potential of an electrostatic latent image is dramatically changed and the part has a higher concentration than an original one. To be specific, strong electrostatic electric field occurs at a boundary of an electrostatic latent image composed of lines or planes. Meanwhile, at a wide area of an electrostatic latent image, for example, a center of a plane image an area other than the boundary, an electric field becomes weak and the image is less likely to be developed in a developing process. Hence, a boundary may have a higher concentration than the center particularly in the case of a plane image. This phenomenon is generally referred to as an edge effect.

In other words, the edge effect appears as follows: a potential difference is large at an end (boundary) of a plane image, so that an electric field is likely to increase; meanwhile, a potential difference is not large at the center of the plane image, so that an electric field is likely to be reduced. Therefore, when forming the gradation patterns 101 as a plane image, an end of the gradation pattern 101 has a higher concentration than an original concentration due to the edge effect. However, a high-concentration area becomes larger in a sub-scanning direction than in a main scanning direction of image formation.

Here, the sub-scanning direction of image formation is a direction along a rotating direction of the light sensitive drums 222*a* to 222*d*, and the main scanning direction is a direction perpendicular to the rotating direction of the light sensitive drums 222*a* to 222*d*.

As described above, the edge effect appears for the following reason. At a part on which a concentration difference rapidly becomes large, namely, at a boundary on which a potential difference is large between electrostatic latent images on the light sensitive drums 222*a* to 222*d*, an electric field is concentrated on the boundary so as to gather toner more than necessary during development.

Figure 29:
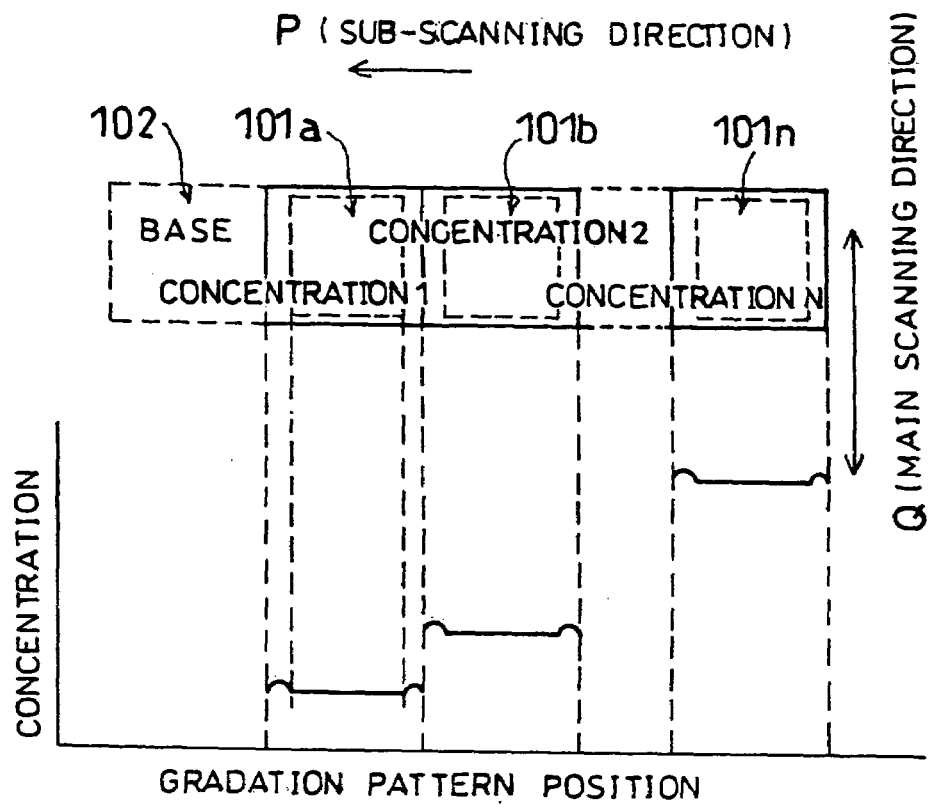
FIG. 29 is an explanatory drawing showing a problem in reading the reading gradation pattern chart in the image forming apparatus of FIG. 2.

Further, regarding the sub-scanning direction of the gradation pattern 101, a previously developed end tends to have a wider high-concentration area than the following end. For example, as shown in FIG. 29, a developing direction (i.e., sub-scanning direction) is indicated by an arrow P. The base concentration measuring section 102, a gradation pattern 101*a* with concentration 1, a gradation pattern 101*b* with concentration 2, and a gradation pattern 101*n* with concentration N are developed in this order. Here, the main scanning direction perpendicular to the sub-scanning direction is indicated by an arrow Q in FIG. 29.

Figure 30:
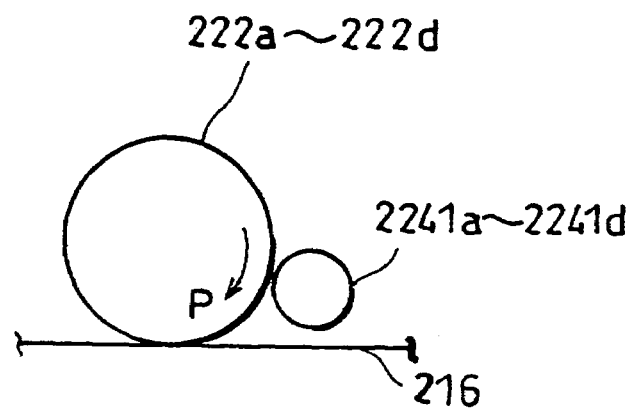
FIG. 30 is an explanatory drawing showing a rotating direction of a light sensitive drum, that describes a reading direction of the reading gradation pattern chart shown in FIG. 29.

Additionally, a concentration of the gradation patterns 101 increases from the concentration 1 to the concentration N. Moreover, as shown in FIG. 30, the direction P is a rotating direction of the light sensitive drums 222*a* to 222*d*, and electrostatic latent images formed thereon are developed by developing rollers 2241*a* to 2241*d*, which are disposed so as to oppose the light sensitive drums 222*a* to 222*d*. Consequently, an area (development width) extending in the main scanning direction with a fixed width is gradually developed in the sub-scanning direction according to the rotation of the light sensitive drums 222*a* to 222*d*.

At this point, as shown in a graph at the bottom of FIG. 29, an end of the gradation pattern 101*a* with concentration 1, that is adjacent to the base concentration measuring section 102, has a larger high-concentration area than an end being adjacent to the gradation pattern 101*b* having concentration 2. The gradation pattern 101*b* with concentration 2 and the gradation pattern 101*n* with concentration N are arranged as above.

Namely, when forming the base concentration measuring section 102, the low-concentration (light) gradation pattern 101, and the high-concentration (dark) gradation pattern 101 are formed in this order, an end (boundary) of the gradation pattern 101, that is previously developed in the sub-scanning direction, has a larger high-concentration area than an end which is developed later in the sub-scanning direction. Moreover, the end of the gradation pattern 101, that is developed later in the sub-scanning direction, has a larger high-concentration area than an end in the main scanning direction. Hence, the larger a concentration difference is at an end of the gradation pattern 101, the larger a concentration difference is between the high-concentration area of the gradation pattern 101 and an original concentration thereof.

Figure 31:
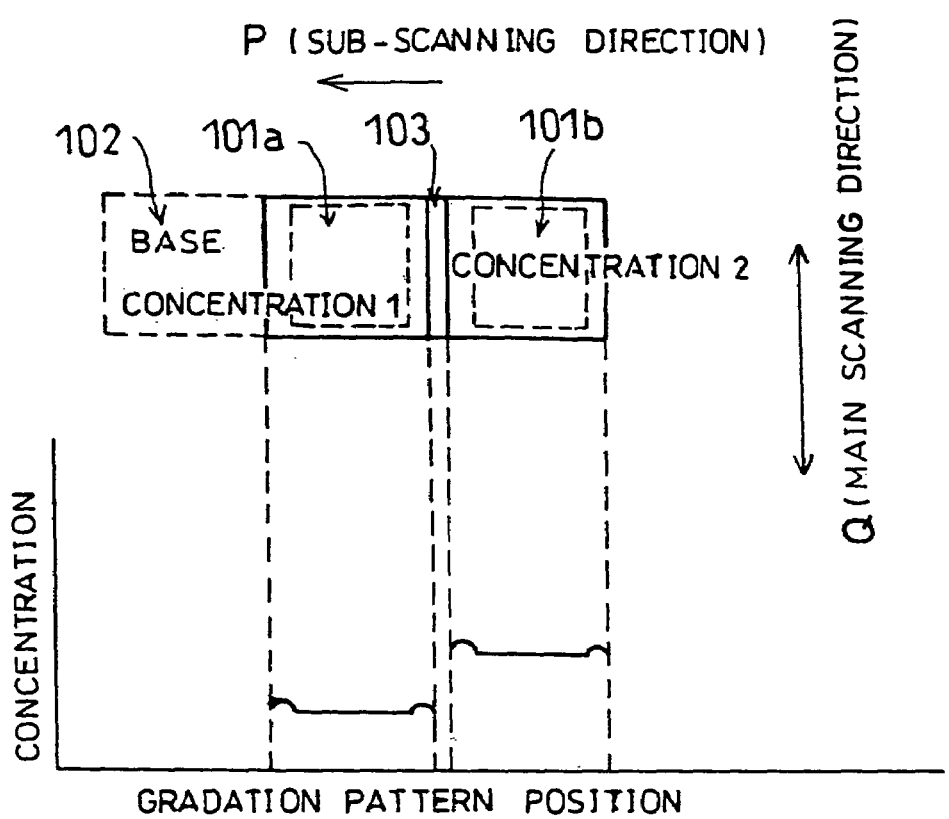
FIG. 31 is an explanatory drawing showing another problem in reading the reading gradation pattern chart in the image forming apparatus of FIG. 2.

Additionally, as shown in FIG. 31, even when a boundary 103 is formed by black or white between the gradation pattern 101*a* with concentration 1 and the gradation pattern 101*b* with concentration 2 in order to distinguish the gradation patterns 101, the gradation pattern 101 partially has a large difference in concentration due to a concentration difference between the boundary 103 and the gradation pattern 101 adjacent to the boundary 103.

As described above, when one of the gradation patterns 101 partially has a higher concentration than an original concentration, it is inconvenient to read concentrations of the gradation patterns 101 for adjusting parameters of the image forming stations Pa to Pd of a development bias, a grid, etc., or to set a γ property and others.

For instance, when an image reading means (image information inputting means) such as the CCD 116 reads the reading gradation pattern chart 100, a plurality of places are read on each of the gradation patterns 101 and the reading values are averaged and a resulting reading value is outputted. This arrangement is devised to solve uneven accuracy (input accuracy) of reading individual light-receiving elements of the CCD 116 and the entire CCD 116, and uneven accuracy of concentrations for image formation in the image forming stations Pa to Pd.

Furthermore, in the reading gradation pattern chart 100, with a larger number of the gradation patterns 101 having different concentrations, parameters of the image forming stations Pa to Pd can be adjusted and a γ property can be determined in a more preferable manner.

In this case, when one of the gradation patterns 101 partially has a higher concentration than an original one, unevenness appears in the final reading values. Hence, if the gradation pattern 101 is formed with a larger size, an area with a higher concentration than the original one becomes relatively smaller in size. The above inconvenience does not occur theoretically. However, in an actual arrangement, if one of the gradation patterns is made larger in size to increase an original concentration area in the gradation pattern 101, a sufficient number of the gradation patterns 101 cannot be formed on a sheet. Hence, concentrations of the gradation patterns 101 are varied due to a change in a formation concentration (i.e., accuracy of forming an image) of the image forming stations Pa to Pd and uneven sheet characteristics, resulting in irregular concentrations of the gradation patterns 101. Consequently, the concentrations of the gradation patterns 101 are read inaccurately.

One of the image forming properties of the image forming stations Pa to Pd is responsivity in replenishing toner. Namely, toner concentrations of the developing devices 224*a* to 224*d* are determined based on concentrations of specific parts thereon. And then, judgement is made based on the concentrations if toner should be replenished or not. Therefore, when each column of the gradation patterns 101, which are aligned in the main scanning direction, has high-concentration parts successively in the sub-scanning direction of the gradation patterns 101, a toner concentration is lower than an original value in the successive high-concentration parts of the column, which includes the gradation patterns 101 aligned in the main scanning direction.

However, a toner concentration is appropriate in the other column of the gradation patterns 101, which are aligned in the main scanning direction without successively including high-concentration parts.

In contrast, toner is added to the successive high-concentration parts, so that some parts have higher toner concentration values than an original value. A concentration of the gradation pattern 101 developed on the parts may be higher than an original concentration. Further, in the image forming stations Pa to Pd of CMYK, a forming concentration of the reading gradation pattern chart 100 is divided into a color with an original concentration and a color with a concentration being different from an original one. Consequently, it is not possible to suitably set balance between the colors.

Thus, in the image forming apparatus 1 of the present invention, image information of the gradation patterns 101 is previously determined in view of an image forming property of the image forming section 210 so as to prevent an electric field from being intensified by a potential difference at a boundary of electrostatic latent images in the gradation patterns 101, which are adjacent to each other in the sub-scanning direction of image formation. The image information of the gradation patterns 101 is stored in the hard disks 43a to 43d and others.

Figure 1:
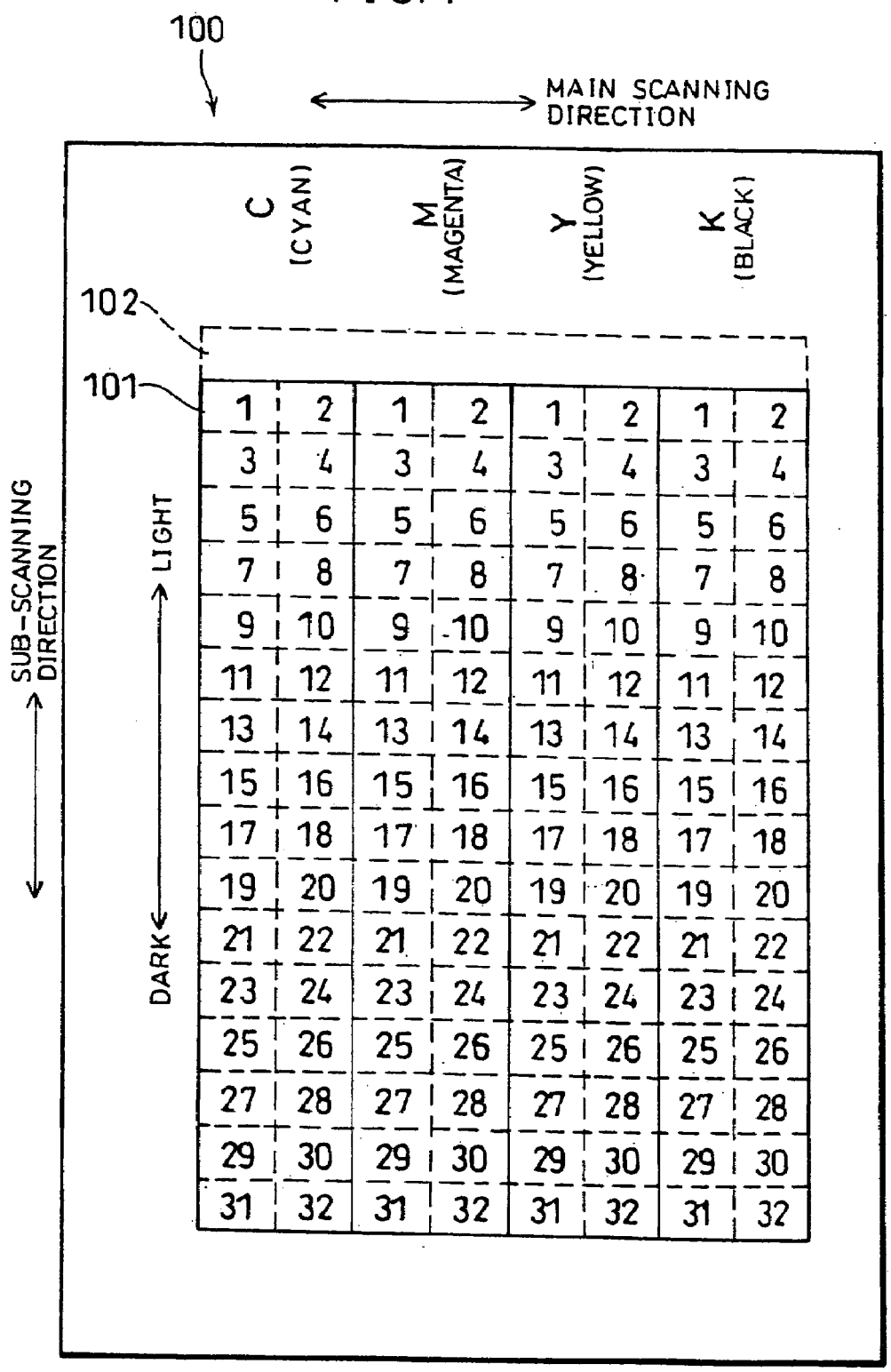
FIG. 1 is an explanatory drawing showing the order of concentrations regarding gradation patterns on a reading gradation pattern chart, that are used for an image forming apparatus according to one embodiment of the present invention.

To be specific, as shown in FIGS. 18 and 1, the reading gradation pattern chart 100 includes 16 the gradation patterns 101 in each column aligned in a sub-scanning direction. Every two columns corresponds to each of CMYK in a main scanning direction. Moreover, the gradation patterns 101 are aligned in increasing order of concentration in the sub-scanning direction, and a plurality of the gradation patterns 101 having the closest concentrations are adjacent to each other in the main scanning direction.

Here, in FIG. 1, numbers of the gradation patterns 101 indicate the order of the concentration values of the gradation patterns 101. In this case, a small number indicates a low concentration (light color).

In the reading gradation pattern chart 100, the gradation patterns 101 are aligned in increasing order of concentration in the sub-scanning direction, and the gradation patterns 101 having close concentrations are adjacent to each other in the main scanning direction. To be specific, the concentrations are aligned as follows: the gradation patterns 101 having close concentrations are aligned in the main scanning direction, and another gradation pattern 101 having a higher concentration is disposed so as to be adjacent to the previous gradation pattern in the sub-scanning direction.

Namely, in increasing order of concentration, for example, cyan has the gradation patterns of concentration 1 and 2 that are adjacent to each other in the main scanning direction, next to the base concentration measuring section 102. The gradation patterns of concentrations 3 and 4 are disposed at the sub-scanning direction side of a higher concentration. In other words, in the reading gradation pattern chart 100, the concentrations of the gradation patterns 101 are aligned in a staggered arrangement.

With such an arrangement of the gradation patterns 101 in the reading gradation pattern 100, the gradation patterns 101 with a large concentration difference are not adjacent to each other in the sub-scanning direction during image formation. Hence, it is possible to suppress the influence of the edge effect (area with an original concentration is reduced). In addition, the gradation patterns 101 with high and close concentrations are not successively aligned in the sub-scanning direction, so that proper response can be made for responsivity in replenishing toner.

Besides, in the above reading gradation pattern chart 100, the gradation patterns 101, which are adjacent to each other in the sub-scanning direction of image formation, are directly brought contact with each other. This arrangement does not include the boundary 103 colored in white or black between the gradation patterns 101, which are aligned in the sub-scanning direction. Thus, it is also possible to prevent the influence of the edge effect caused by the boundary 103.

In the reading gradation pattern chart 100 of FIG. 1, a concentration difference is not so large between the base concentration measuring section 102 and the gradation pattern 101 of concentration 1 or the gradation pattern 101 of concentration 2. However, the concentrations 1 and 2 are extremely low concentration areas, so that the edge effect may increase a difference from an original concentration as compared with the high-concentration gradation pattern 101. In the same manner, a concentration difference is quite large between a) the gradation pattern 101 of concentration 31 and the gradation pattern 101 of concentration 32 and b) the base, so that the edge effect may strongly appear.

Therefore, it is preferable to form a dummy pattern beside the gradation pattern 101 which is disposed at an end in the sub-scanning direction. The dummy pattern has a concentration close to the gradation pattern 101 at the end. With this arrangement of the reading gradation pattern chart 100, as shown in FIG. 32, dummy gradation patterns (hereinafter, referred to as dummy patterns) 131 are disposed between the base (base concentration measuring section 102) and the gradation patterns 101 of concentrations 1 and 2, and between the base and the gradation patterns 101 of concentrations 31 and 32.

A concentration of the dummy pattern 131 may be close to or the same as concentrations 1 and 2 or concentrations 31 and 32. When the dummy pattern 131 is disposed beside the gradation pattern 101 having a high concentration, it is preferable to slightly reduce a concentration of the dummy pattern 131 in view of the responsivity in replenishing toner. When more than one kind of the reading gradation pattern charts 100 are formed or a high-concentration side is initially developed, the responsivity in replenishing toner should be taken into consideration for the dummy pattern 131 disposed beside the high-concentration gradation pattern 101.

Figure 32:
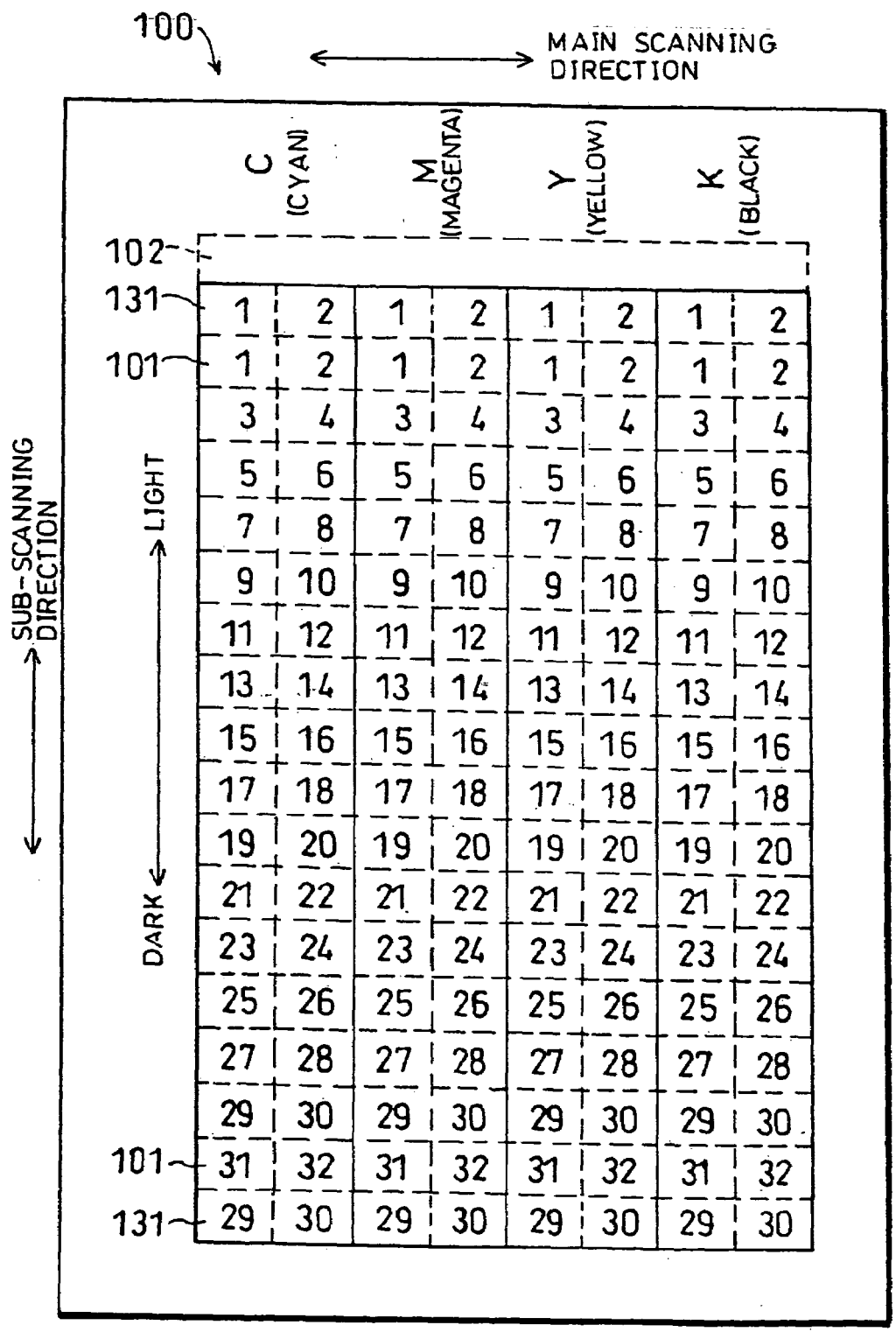
FIG. 32 is an explanatory drawing showing another example of the reading gradation pattern chart shown in FIG. 1.

For instance, in FIG. 32, in the case of the dummy pattern 131 adjacent to the gradation patterns 101 of concentrations 1 and 2 at a low-concentration side, the concentration is the same as that of the gradation pattern 101 (concentrations 1 and 2). In the case of the dummy pattern 131 adjacent to the gradation patterns 101 of concentrations 31 and 32 at a high-concentration side, the concentration is set slightly lower at concentrations 29 and 30.

Figure 33:
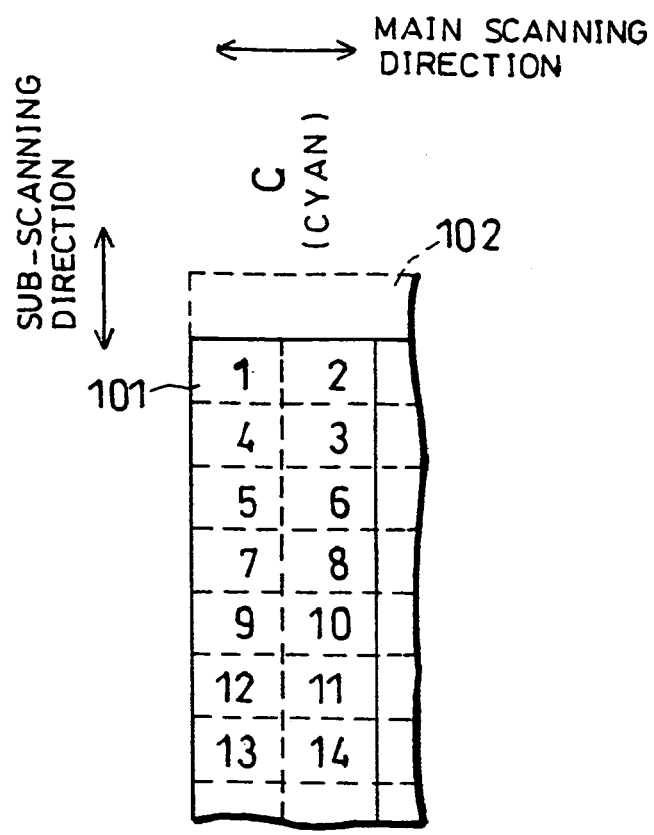
FIG. 33 is an explanatory drawing showing still another example of the reading gradation pattern chart shown in FIG. 1.
Figure 34:
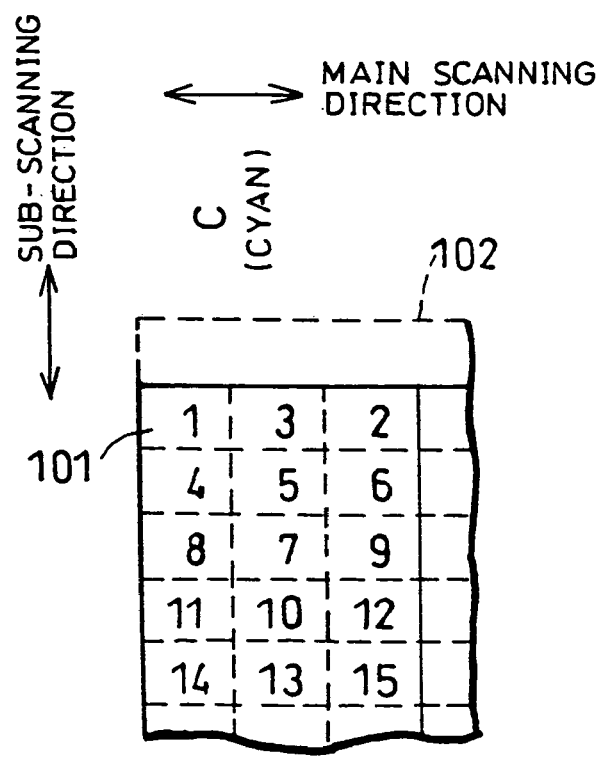
FIG. 34 is an explanatory drawing showing still another example of the reading gradation pattern chart shown in FIG. 1.

Besides, the alignment of the gradation patterns 101 in a sub-scanning direction is not limited to those of FIGS. 1 and 32, in which every other concentration is successively aligned. As long as a concentration difference does not cause the edge effect or affect the responsivity on toner, the concentrations may be aligned at random as shown in FIG. 33 or in FIG. 34, in which three columns instead of two columns of the gradation patterns 101 are disposed in the sub-scanning direction.

Namely, in the reading gradation pattern chart 100, the gradation patterns 101 are aligned in increasing order of concentration in the sub-scanning direction of the image formation, and the gradation patterns 101 having the closest concentrations are adjacent to each other in the main scanning direction.

The edge effect and the responsivity in replenishing toner are varied due to the following factors: a developing method used for the developing devices 224a to 224d of the image forming stations Pa to Pd, a developing bias value, a charging potential of the light sensitive drums 222a to 222d, and diameters and rotation speeds of the developing rollers 2241a to 2241d for feeding toner onto electrostatic latent images, and in the case of a binary method, a method of replenishing toner during development, an agitating ability for obtaining even concentrations of toner during development, a position of a toner concentration sensor for detecting a toner concentration during development, and a change value of a toner concentration until a toner replenishing signal is outputted from the toner concentration sensor during development.

For this reason, pattern information (including a dither value and information about a position) of the gradation pattern 101 may be determined in advance based on actual properties of the image forming stations Pa to Pd and the developing devices 224a to 224d, such that a concentration difference between the gradation patterns 101 in the sub-scanning direction can suppress the influence of the edge effect and responsivity in replenishing toner.

The gradation patterns 101 and the base (base concentration measuring section 102) of the reading gradation pattern chart 100 are read in each element of the CCD 116, and a reading value is stored in a storing means such as hard disks 43a to 43d of the image memory 43. Assuming that n gradation patterns are read in the sub-scanning direction and m gradation patterns are read in the main scanning direction, as for each of the gradation patterns 101, when a reading part is represented by A, an area surrounded by four points A11, A1n, Am1, and Amn serves as a reading area.

In the reading area, an area surrounded by Acd, Aek, Abl, and Aij serves as an area with an original concentration (referred to as an original concentration area 101α), and an area corresponding to an area having a high concentration due to the edge effect (diagonally shaded area in FIG. 35, referred to as a high-concentration area 101β) is provided around the original concentration area 101α. Namely, each of the gradation patterns 101 includes an area having a high concentration due to the edge effect.

Therefore, in order to obtain a more accurate reading value, the following steps are preferable: a readout value of the high-concentration area 101β is computed, that is quite different from those of the gradation pattern 101, a predetermined number of readout values are sampled from the original concentration area 101α other than the high-concentration area 101β to compute an average value, and a readout value of the corresponding gradation pattern 101 is determined. The predetermined number of the sampling is not particularly limited. In the present embodiment, 256 values of 16 (main scanning direction)×16 (sub-scanning direction) are sampled.

As earlier mentioned, the gradation pattern 101 is composed of known dither values. The way of sampling the readout values relative to a dither matrix size of a dither value in the gradation pattern 101 determines if irregular readout values can be prevented or not.

Figure 36A:
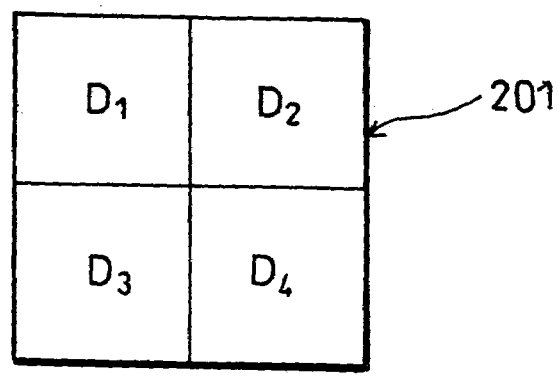
FIG. 36($a$) is an explanatory drawing showing a corresponding relationship between a pixel, which is read by a CCD provided in the image forming apparatus of FIG. 2, and a dot of a dither matrix.

For instance, in the image forming apparatus 1, the image forming section 210 has an image forming density of 600 dpi, a resolution of the image reading section 110 is adaptable to 600 dpi. As shown in FIG. 36(a), a single pixel 201 is constituted by a 2×2 dither matrix, in which two 1-dot Ds ($D_1 \cdot D_2 \cdot D_3 \cdot D_4$ in FIG. 36(a)) are aligned vertically and horizontally. In the image forming section 210, one-dot size of a writing laser (LSU 42b, 42c, 42d, and 42e) is the same as a reading size of a single element of the CCD 116. When the pixel 201 is composed of a 2×2 dither matrix, a reading size of a single element of the CCD 116 corresponds to one fourth of the pixel 201.

Figure 36B:
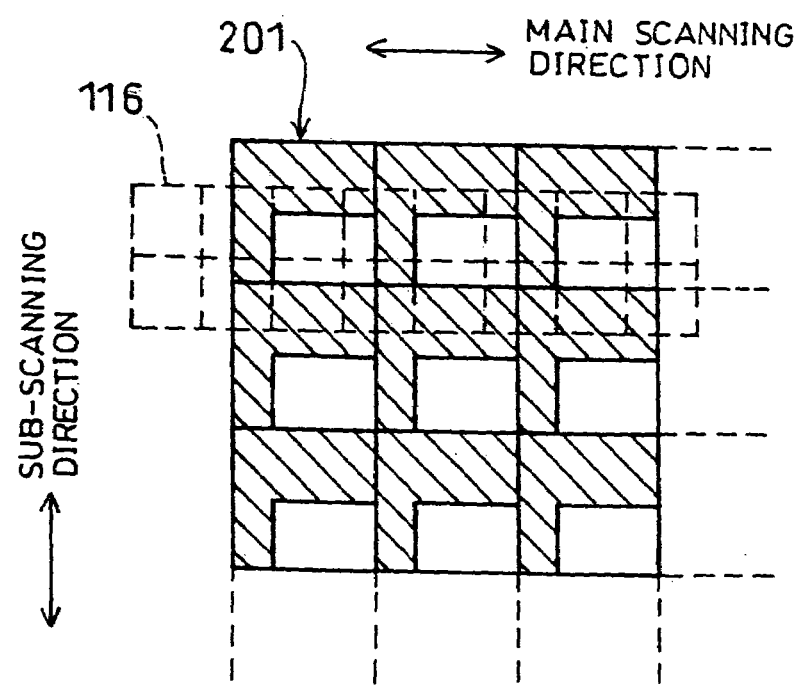

Therefore, as shown in FIG. 36(b), when a readout value of the CCD 116 element is used as a readout value of the gradation pattern 101, the readout values are considerably varied due to a relative position between the CCD 116 and the pixel 201. Hence, in the present embodiment, in order to prevent this problem, computing is performed by using a readout value of the four adjacent CCD 116 elements as a readout value of the gradation pattern 101, based on a readout value of the CCD 116, that is stored in a memory means such as the image memory 43.

In other words, as shown in FIG. 36(b), of readout values of the gradation pattern areas, that is read in the CCD 116, readout values of the two adjacent areas are added in a sub-scanning direction and a main scanning direction to obtain a one fourth readout value serving as a readout value of the CCD 116 element. To be specific, $D_1+D_2=D_{12}$, $D_1+D_3=D_{13}$, $D_2+D_4=D_{24}$, and $D_3+D_4=D_{34}$ each correspond to one fourth.

In this case, the gradation patterns 101 are read through an image filter which is identical in size to the dither matrix of the gradation pattern 101. Such a reading operation is generally described that "a readout value of the CCD 116 is read through the image filter". This arrangement makes it possible to prevent a readout value of the CCD 116 from being considerably varied due to a relative relationship between an element and the pixel 201, so that a suitable readout value can be obtained.

Furthermore, when reading a normal document, shading correction is carried out, in which an output value is determined by setting a white level for a readout value of the CCD 116 based on a value obtained by reading a reference whiteboard. Here, in the case of the reading gradation pattern chart 100 which is read based on a readout value of the reference whiteboard, when the base having the gradation pattern 101 thereon has a higher white level than the reference whiteboard, it is not possible to suitably determine a white level.

For this reason, in the present embodiment, of the readout values which are read in the CCD 116, regarding the base, an operation is carried out to set an output value of the readout value at 0 value. This arrangement makes it possible to suitably determine a white level. To be specific, the following method can be adopted to set a readout value of the base at 0 value.

First, when a white level of the reference whiteboard is set sufficiently higher than that of the reading gradation pattern chart 100, a readout value of the CCD 116 is subtracted to obtain a readout value of the gradation pattern 101. Meanwhile, when a white level of the reference whiteboard is lower than that of the base of the reading gradation pattern chart 100, for example, as shown in a graph $b_1$ of FIG. 37, a readout value of the "gradation pattern 1" (CCD output value in FIG. 37) is lower than a 0 value. Thus, a readout value of the gradation pattern is included which is not applicable as a readout value of the CCD 116.

Hence, when the CCD 116 reads the gradation patterns 101, a readout value reducing operation is carried out, in which a quantity of lamp light emitted to a document (gradation pattern chart 100) is reduced or a readout gain of the CCD 116 is reduced such that a readout value of the CCD 116 is smaller than an actual value. Moreover, regarding a readout value of the reference whiteboard that is read by the CCD 116, a readout value before the above readout value reducing operation (i.e., an original readout value) is used as a readout value of the CCD 116.

In this way, when a white level of the reference whiteboard is lower than that of the base, the following readout value reducing operation is carried out such that a concentration of the base of the reading gradation pattern chart 100, that is read by the CCD 116, is larger than a 0 value of a readout value (output value) of the CCD 116, namely, when the CCD 116 reads a value of the base, a concentration of the base is obtained as an output value of the CCD 116.

Figure 37:
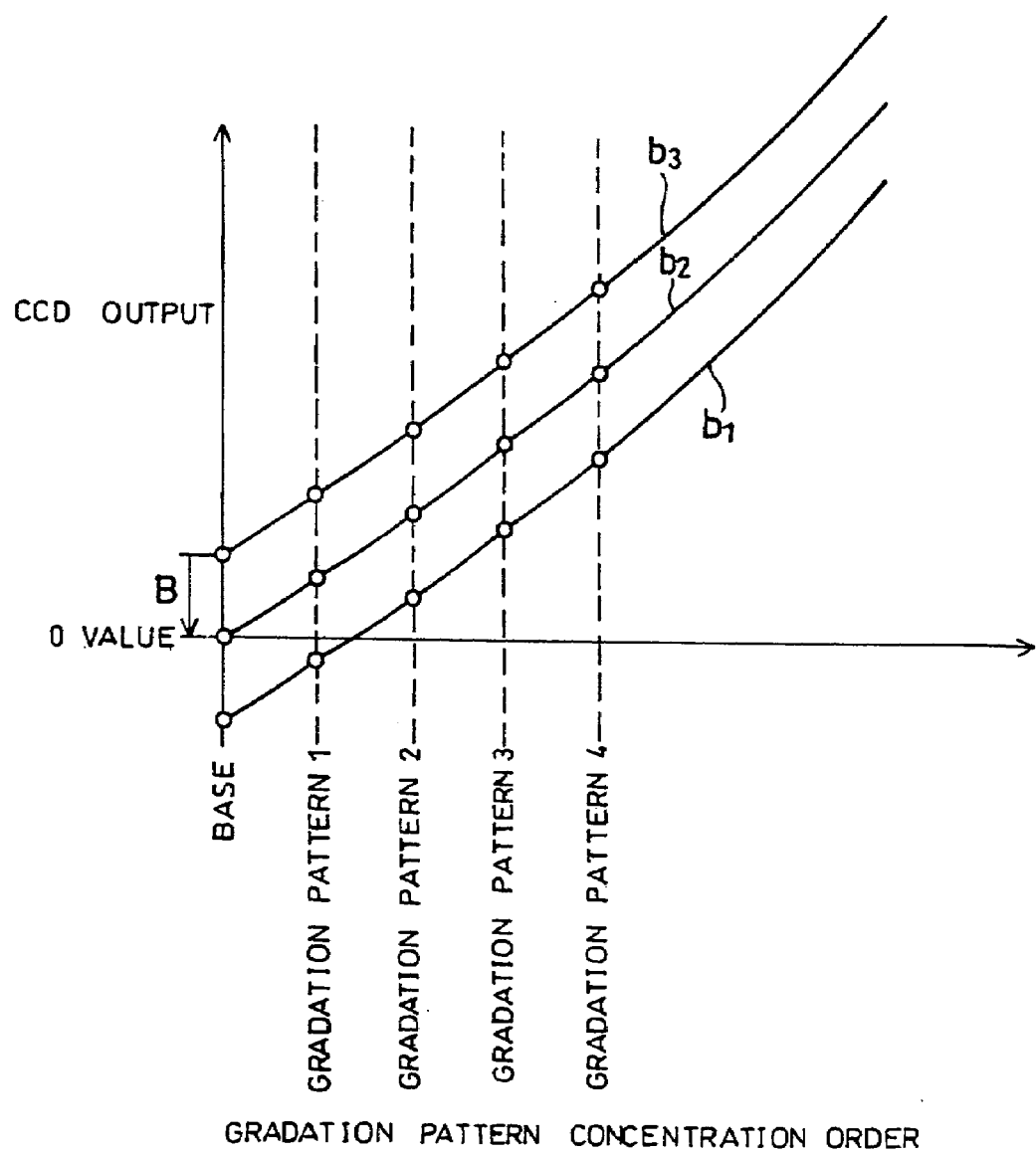
FIG. 37 is an explanatory drawing showing an example in which when the CCD provided in the image forming apparatus of FIG. 2 reads the reading gradation pattern chart of FIG. 1, a white level of a base is corrected on the reading gradation pattern chart.

Consequently, regarding a readout value of the CCD 116, i.e., an output value of the CCD 116, a concentration of the base is larger than a 0 value as shown in a graph $b_3$ of FIG. 37. And then, the image processing section 2 may shift all the readout values by a readout value (arrow B in FIG. 37) of the base as shown in FIG. 37. With this arrangement, even when a white level of the reference whiteboard is lower than that of the base of the reading gradation pattern chart 100, a concentration of the base can be read by the CCD 116. As a result, it is possible to obtain a suitable input concentration of the gradation pattern 101 relative to the base so as to read the gradation pattern 101 in a more stable manner.

In FIG. 37, a vertical axis represents an output from the CCD 116, and a horizontal axis represents a concentration order of the gradation pattern 101. Further, the graph $b_1$ shows a readout value of the base that is read without reducing a readout value of the CCD 116 when a white level of the base is higher than that of the reference whiteboard. Also, graph $b_2$ is made by shifting the graph $b_3$ so as to set a readout value of the base at 0 value.

The above example discussed an operation for setting a reference white level at an output level of the CCD 116 to suitably determine a white level. However, the operation is not particularly limited. For example, a white level may be obtained based on the individual output levels of the CCD 116.

Figure 40:
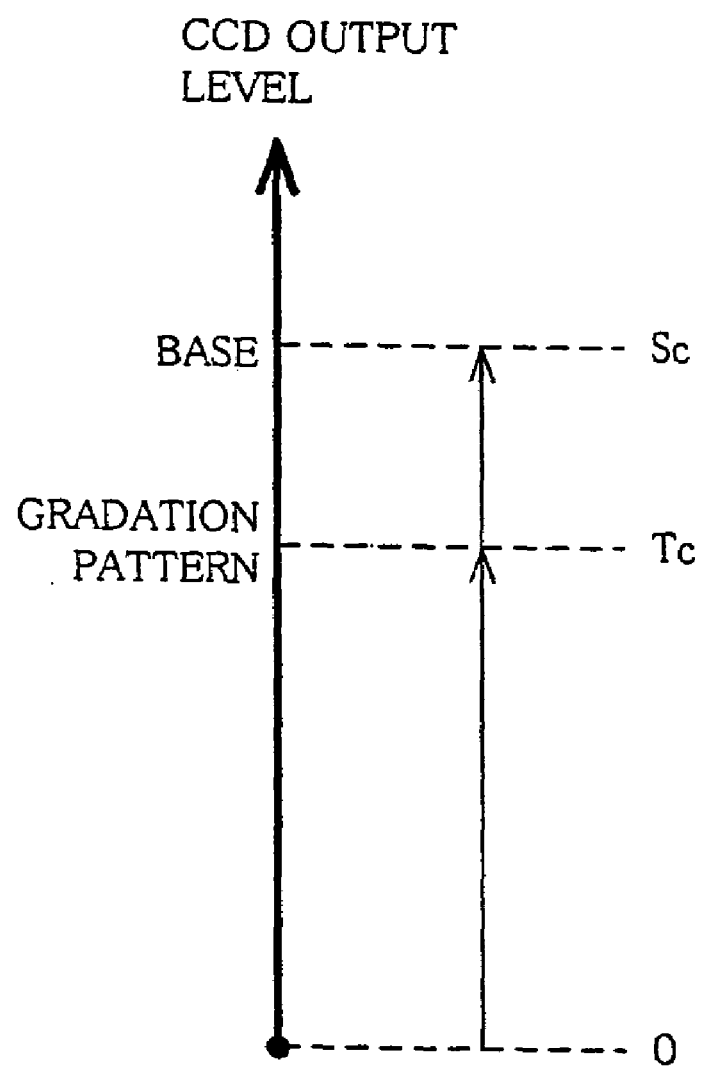
FIG. 40 is an explanatory drawing showing a relationship between an output level of the base and an output level of the gradation pattern when the CCD provided in the image forming apparatus of FIG. 2 reads the reading gradation pattern chart of FIG. 1.

For example, when an output level of the CCD 116, that corresponds to the base, is represented by Sc, and an output level of the gradation patterns 101 is represented by Tc, as shown in FIG. 40, an output level Sc of the CCD 116 is added to the output level Tc of the gradation patterns. Here, on the assumption that a maximum value of the outputted gradation steps is represented by n and the n is applied to the Sc, a white level correction value Sn of the base is obtained according to the following equation.

$$Sn = n - \{(n-Tc)/(n-Sc)\} \times n$$

Here, the gradation steps n is a maximum value for forming the image forming apparatus 1. The n is not particularly limited to a specific number. For instance, in the present embodiment, on the assumption that 256-step gradation is used for image formation, a maximum value of the gradation step is represented by n=255 (0 to 255 steps in the case of 256-step gradation).

Figure 38:
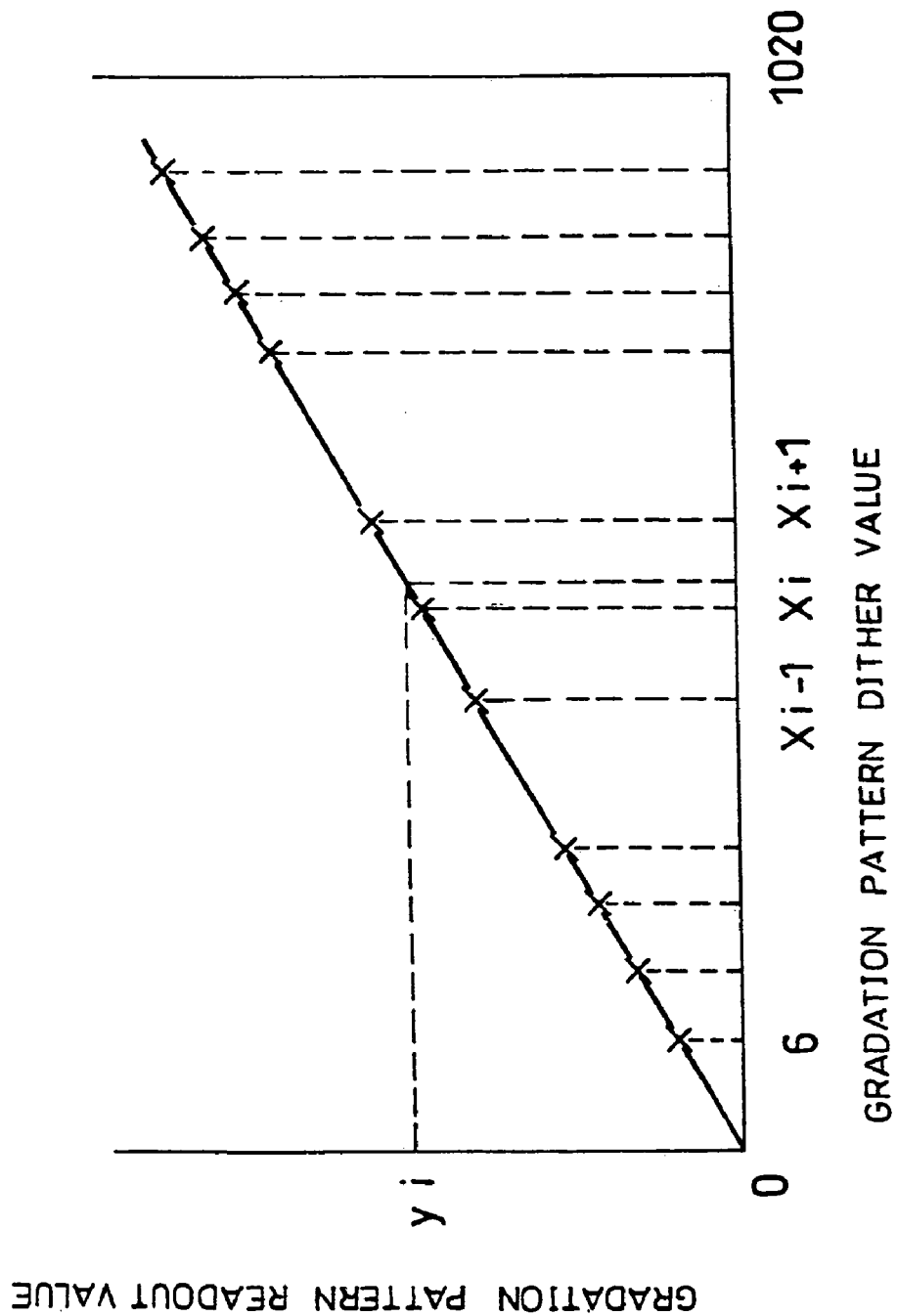
FIG. 38 is a graph showing a relationship between a readout value of the gradation pattern and a dither value thereof in the image forming apparatus of FIG. 2.

In this way, a relationship between a dither value and a readout value of the gradation pattern 101 is shown by virtually a straight line of FIG. 38. Here, in FIG. 38, a horizontal axis represents a dither value of the gradation pattern 101 with a scale of 0 to 1020 (xi represents an arbitrary value on the line). Besides, a vertical axis represents a readout value of the gradation pattern (yi represents an arbitrary value). Further, x marks in the figure are readout values corresponding to 32 kinds of dither values, which are used for the reading gradation pattern 101. In this manner, a relationship is determined between a dither value and a readout value of the gradation pattern 101 shown in FIG. 38.

Furthermore, as shown in Table 1, in addition to the above relationship, a relationship is determined in advance by an experiment, etc. between a) a readout value of an input concentration, i.e., a target readout value (target input value, referred to as a target concentration in the flowchart of FIG. 15 and the description thereof) and b) an output value of the CCD 116, i.e., a readout reference value (input reference value). The readout value of an input concentration is obtained by reading a standard gradation pattern chart (image formation with a dither value is not necessary as long as a standard-concentration pattern chart showing a standard concentration is used) by the CCD 116. The CCD 116 defines a white level for the target reading value so as to obtain a 256-step gradation.

TABLE 1

| CONCENTRATION VALUE | TARGET READOUT VALUE | CCD OUTPUT VALUE |
| --- | --- | --- |
| 0.1 | y1 | 5 |
| : | : | : |
| 0.4 | yi | 100 |
| : | : | : |
| 1.5 | y16 | 248 |

The relationship between a target readout value and a readout reference value of the CCD 116, that is shown in Table 1, is stored as a relationship table (corresponding table) in each of the memory means of the image forming apparatus 1. The relationship table only requires a smaller memory capacity as compared with a relationship of a reference γ property and is always capable of readily computing an optimum γ property. The readout reference value serves as an input value transmitted to the image forming section 210. To be specific, the readout reference value is an input value transmitted to the image data processing section 41 shown in FIG. 3. Besides, the relationship table between a target readout value and a readout reference value requires not more than about 10 pairs of values.

When determining a γ property, a dither value of the gradation pattern 101 is computed based on the relationship of FIG. 38, that is obtained by reading the reading gradation pattern chart formed by the image forming section 210, relative to the standard readout value corresponding to a readout reference value (output value of the CCD 116) in the relationship table.

In other words, based on the relationship between a target readout value of Table 1 and an output value of the CCD 116, from a readout value of the gradation pattern 101 in FIG. 38, that corresponds to an arbitrary target readout value, a closest dither value is traced in a direction of a dither value of the gradation pattern according to a virtually straight line relationship in FIG. 38. And then, the dither value is linked with an output value of the CCD 116 (input value to the image forming section 210), that corresponds to the target readout value, so as to obtain a curved relationship shown in FIG. 39.

Figure 39:
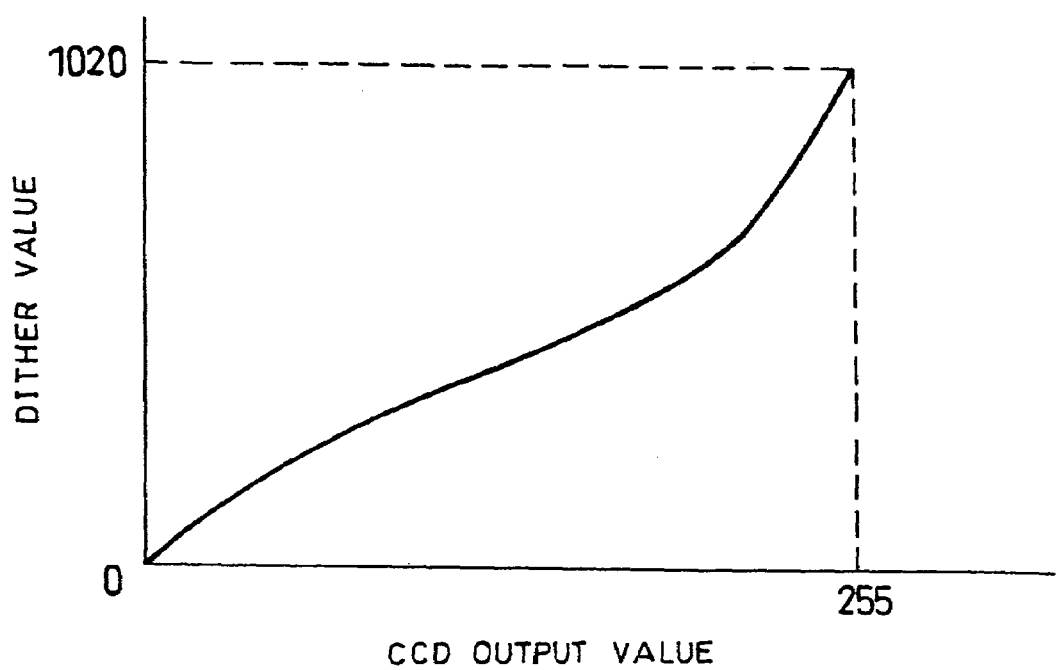
FIG. 39 is a graph showing the relationship of FIG. 38 between a readout value of the gradation pattern and a dither value thereof, and a relationship between a dither value and a CCD output value, that is obtained by a relationship between a target readout value and a CCD output value.

In FIG. 39, a vertical axis represents a dither value (maximum 1020), and a horizontal axis represents an output value of the CCD 116 (maximum 255, namely, 256-step gradation). This relationship makes it possible to adjust a relationship between a) the second image information of the image forming section 210 and b) an input value and an output value of concentration, namely, an image processing condition for arbitrarily determining a γ property.

Here, in the present embodiment, the relationship table between a target readout value and a readout reference value is determined in advance and is stored in the memory means. Or a relationship table between a target readout value and a readout reference value may be obtained by inputting a concentration of a standard concentration chart into the readout reference values obtained by reading the standard concentration chart in the image forming apparatus 1, in which a γ property is set.

Here, in the above embodiment, when a dither value of the gradation pattern 101 is read in the image reading section 110 after forming a gradation pattern chart in the image forming section 210, irregular reading may appear in the image reading section 110 or uneven image formation may appear in the image forming section 210.

Namely, when an image of the reading gradation pattern chart 100 is formed in the image forming section 210, a concentration of the gradation pattern is varied depending upon accuracy of image formation relative to a concentration of the image forming section 210. When the reading gradation pattern chart 100 is read by the image reading section 110, a readout value is varied depending upon accuracy of reading a concentration of the image reading section 110. Due to such variations, the gradation pattern 101 disposed on a high-concentration side may have a low readout value (a value corresponding to a low-concentration side) in the reading gradation pattern chart 100.

Therefore, when a value is reversed due to such variations and is used for adjusting the image forming conditions, the adjustment cannot be performed in a suitable manner, so that such a value is not applicable. Thus, the reading gradation pattern chart 100 may become useless.

For this reason, in the image forming section 210, based on accuracy of reading in the image reading section 110 and accuracy of image formation regarding a concentration of the image forming section 210, the gradation patterns 101 are preferably formed such that a readout value of the image reading section 110 on a high-concentration side is larger than that on a low-concentration side in the reading gradation pattern chart 100.

To be specific, variations in accuracy of reading in the image reading section 110 and variations in accuracy of image formation regarding a concentration in the image forming section 210 are arbitrarily generated as accuracy information. Or distribution of variations, etc. is stored as accuracy information in the memory means in advance. And then, dither values for forming the gradation patterns 101 are determined in advance base on the accuracy information such that different readout values of the image forming section 110 correspond to the different gradation patterns 101. With this arrangement, the order of the readout values of the gradation patterns 101 is not reversed in the reading gradation pattern chart 100, so that the readout values can be suitably used for determining a γ property.

As described above, an image forming method of the present invention includes a first step of forming the reading gradation pattern chart 100 which has a plurality of kinds of the gradation patterns 101 corresponding to different known dither values, a second step of reading the reading gradation pattern chart 100 by the CCD 116 and storing a relationship between the readout values and the dither values, and a third step of obtaining a relationship between an input concentration of the CCD 116 and the dither values based on a readout reference value, which is determined so as to correspond to a target readout value of an input concentration obtained by reading the standard pattern chart by CCD 116 and based on the readout values stored in the second step.

With this arrangement, it is possible to arbitrarily obtain a relationship between a) an input concentration computed according to the readout reference value and an actual readout value and b) a dither value at image formation. Hence, without storing a relationship of a reference γ property, it is always possible to readily compute an optimum γ property.

The image processing method further includes a fourth step of forming the visual gradation pattern chart 200 based on the relationship between an input concentration and a dither value, that is determined in the third step, a fifth step of manually adjusting the relationship while seeing the visual gradation pattern chart 200, and a sixth step of setting the readout reference value at a value corresponding to the target value obtained by the relationship which is adjusted in the fifth step.

With this arrangement, a concentration of the visual gradation pattern chart is visually judged by the user and the judgement can be reflected on the image processing. Thus, a γ property can be determined in a simple and appropriate manner.

Here, the foregoing embodiment describes a setting of a γ property of an image forming apparatus in which an image reading section and an image forming section are provided in an integral manner. This arrangement is also applicable to an apparatus in which an image reading section and an image forming section are separately provided, namely, an apparatus in which a scanner and a printer are connected to each other on a network. The scanner has only a function of reading a document image, and the printer has only a function of forming an image based on image data. Further, this arrangement is applicable to a construction in which the printer is simply corrected by the scanner.

Moreover, regarding the method for suppressing the influence of the edge effect on the gradation pattern and for suppressing the influence of the responsivity on replenishing toner, the method can be adopted for the visual gradation pattern chart as well as the reading gradation pattern chart. The method is adopted for the visual gradation pattern chart to prevent a concentration between the gradations from being recognized to be smaller than an actual concentration.

As earlier mentioned, an image forming apparatus of the present invention, which includes an image forming means for forming an image on a recording member by forming an electrostatic latent image on a light sensitive element based on first image information, an image information inputting means for inputting second image information based on the image formed on the recording member, and an image processing means for processing the second image information and adjusting an image processing condition when the image is a pattern chart having different gradation patterns aligned thereon, may be arranged such that when the image forming means forms the pattern chart, the gradation patterns are formed so as to prevent an intensified electric field, that is caused by a potential difference at a boundary of the electrostatic latent images of the gradation patterns adjacent to each other in a sub-scanning direction of the image forming means.

According to the above arrangement, when the pattern chart is formed and is inputted to the image information input means so as to suitably correct the gradation, the pattern chart is formed in which a concentration difference is smaller than a predetermined value between the gradation patterns adjacent to each other in a sub-scanning direction. It is therefore possible to prevent uneven concentrations of the gradation patterns, that are caused by the occurrence of an edge effect and the responsivity in replenishing toner, resulting in entirely even concentrations of the gradation patterns in the pattern chart. As a result, the gradation patterns can be read in a stable manner so as to positively and appropriately adjust the image forming conditions.

In the above image forming apparatus, the image forming means preferably forms the pattern chart such that the gradation patterns adjacent to each other in a sub-scanning direction directly come into contact with each other.

According to this arrangement, a boundary is not provided in a white display or a black display between the gradation patterns, so that the edge effect can be prevented between the gradation patterns and the boundary. Therefore, it is possible to further improve stability of inputting the gradation patterns while entirely achieving more even concentrations of the gradation patterns.

In the above image forming apparatus, the image forming apparatus preferably forms a dummy pattern, which is adjacent to the gradation pattern disposed at an end with respect to the sub-scanning direction of the pattern chart and which is equal or a close to the gradation pattern at the end in concentration.

According to this arrangement, the dummy pattern is formed at the end in the sub-scanning direction of the pattern chart so as to reduce a concentration difference between a) the base of the recording member for forming the pattern chart and b) the gradation pattern. As a result, it is possible to more positively prevent the edge effect on the gradation pattern of the sub-scanning direction end.

In the image forming apparatus, the image forming means preferably forms the pattern chart such that the gradation patterns are disposed in increasing order of concentration along the sub-scanning direction and a plurality of gradation patterns having the closest concentrations are aligned in the main scanning direction.

According to this arrangement, when the image forming apparatus forms the pattern chart, the gradation patterns with higher concentrations are not successively disposed in a direction of developing the pattern chart. Thus, it is possible to preferably prevent uneven concentrations of the gradation patterns, that are caused by responsivity in replenishing toner during the formation of the pattern chart.

The image forming apparatus of the present invention, which includes an image forming means for forming an image on the recording member based on first image information, an image reading means for reading the image formed on the recording member as second image information, and an image processing means for processing the second image information and adjusting image processing conditions when the image is a pattern chart having different gradation patterns aligned thereon, may be arranged such that the image processing means performs image processing on the second image information and adjusts image processing conditions with reference to a color of the base of the recording member having the pattern chart formed thereon.

According to this arrangement, when correcting the shading, an image processing is performed in view of a color on the base of the recording member for forming the pattern chart. Hence, an input concentration of the gradation pattern is more preferable to the base; therefore, the gradation patterns can be read in a stable manner so as to positively and suitably adjust image forming conditions.

In the image forming apparatus, when reading the pattern chart, the image processing means preferably processes the second image information based on a readout value, which is obtained by reducing a quantity of light emitted to the pattern chart or reducing a readout gain of the image reading means.

According to this arrangement, a readout value of the pattern chart (gradation pattern) is read by the image reading means as a value smaller than actual one. Therefore, when correcting shading, even if a white level of a reference whiteboard is lower than that of a base concentration of the pattern chart, the image reading means can read the base concentration. Consequently, even when a white level of the reference whiteboard is lower than that of the base concentration, an input concentration of the gradation pattern is made more suitable to the base, so that the gradation pattern can be read in a stable manner.

The image forming apparatus of the present invention, which includes an image forming means for forming an image on the recording member based on first image information, an image reading means for reading the image formed on the recording member as second image information, and an image processing means for processing the second image information and adjusting image processing conditions when the image is a pattern chart having different gradation patterns aligned thereon, may be arranged such that the first image information for forming the pattern chart is provided as multi-step gradation by adding a dither value of a dither matrix, and the image reading means reads the pattern chart through a image filter which is identical to the dither matrix in size.

According to this arrangement, the pattern chart is read through the image filter which is identical in size to the dither matrix of the image information so as to prevent interference between spacial frequencies of the gradation pattern and the image reading means, that causes moire, without a mechanical means. Hence, it is possible to readily improve accuracy of reading the gradation pattern while eliminating the need for a complicated apparatus.

The image forming apparatus of the present invention, which includes an image forming means for forming an image on the recording member based on first image information, an image reading means for reading the image formed on the recording member as second image information, and an image processing means for processing the second image information and adjusting image processing conditions when the image is a pattern chart having different gradation patterns aligned thereon, may have a construction in which the image forming means forms the pattern chart based on input accuracy of the image reading means and image forming accuracy as for a concentration of the image forming means such that an output value of the image reading means at a high-concentration gradation pattern is larger than that of the image reading means on a low-concentration gradation pattern.

According to this arrangement, an image is formed based on image forming accuracy regarding a concentration of the image forming means and input accuracy as for a concentration of the image reading means, so that the pattern chart can be formed in view of unevenness of the image forming accuracy and the input accuracy. Consequently, it is possible to prevent a reverse phenomenon which is likely to occur on the pattern chart. In the reverse phenomenon, a gradation pattern originally disposed at a high concentration side is reversed to a low-concentration side. By preventing the phenomenon, it is possible to prevent excessive formation of the pattern chart and to adjust the image forming conditions in a more accurate manner.

The image forming apparatus of the present invention, which includes an image forming means for forming an image on the recording member based on first image information with multi-step gradation obtained by adding a dither value of a dither matrix, an image reading means for reading the image formed on the recording member as second image information, and an image processing means for processing the second image information and adjusting image processing conditions when the image is a pattern chart having different gradation patterns aligned thereon, may have a construction in which the image processing means performs image processing to obtain a relationship between an input concentration and the dither value of the image forming means based on 1) a relationship between a) a target readout value of a readout concentration of the image reading means and b) a readout reference value of the image reading means that corresponds to the target readout value, and 2) a relationship between the dither value and an actual readout value obtained by reading the pattern chart by the image reading means.

Further, a image processing method of the present invention used for an image forming apparatus, which forms an image based on image information by the image forming means, the method including the steps of: a first step of forming a plurality of kinds of gradation patterns, that correspond to known different dither values, as a reading pattern chart on the recording member by using the image forming means, a second step of directly reading the reading pattern chart by the image reading means before inputting and storing a relationship between an input value and the dither value, and a third step of obtaining a relationship between an input concentration and the dither value of the image forming means based on a) a readout reference value corresponding to a target value of an input concentration of the image reading means and b) the readout value stored in the second step.

According to this arrangement and method, it is possible to arbitrarily find the relationship between an input concentration and a dither value, which is obtained based on a readout reference value and an actual readout value, and a dither value at image formation. Hence, it is always possible to readily obtain an optimum γ property without storing a relationship of a reference γ property in the memory means.

Furthermore, the image processing method preferably includes a fourth step of forming a visual pattern chart on the recording member based on the relationship determined in the third step between an input concentration and a dither value, a fifth step of manually adjusting the relationship while seeing the visual pattern chart, and a sixth step of setting the readout reference value at a value corresponding to the target value obtained by the relationship adjusted in the fifth step.

According to this method, a concentration of the visual pattern chart visually judged by the user as well as a concentration of the reading pattern chart can be reflected in the image processing. Therefore, a γ property can be determined in a simple and appropriate manner.

In the above processing method, it is preferable to use any one of a) the readout reference value obtained in the sixth step and b) a readout reference value corresponding to a target input value of an input concentration determined in the third step, as a readout reference value of the third step.

According to this method, one of the two readout reference values is arbitrarily used, which include a standard readout reference value (a value determined in the third step) and a readout reference value reflecting the user's preference (a value obtained in the sixth step) Therefore, for example, when shipping the image forming apparatus from the factory, a standard readout reference value is used because it is not necessary to consider the user's preference. Further, when the apparatus is installed at the user's end, a readout reference value is set so as to reflect the user's preference.

Moreover, when the apparatus is moved by the user, an original standard readout reference value is used. Hence, it is possible to suitably set a readout reference value in response to the conditions. Consequently, a simple setting is available.

The image processing method of the present invention, in which a first image is formed on the recording member based on first image information, a second image is formed on the recording member based on information obtained by reading the first image by the image reading means, and then, information visually obtained from the second image is inputted by a manual input means to adjust the image processing conditions, may be arranged such that the first image is larger than the second image in the number of the graduation steps.

Generally, when the gradation is judged by the image reading means, the more gradation steps, the more accurate judgement is made on the gradation. However, when the user visually judges gradation, too many gradation steps result in complicated judgement, so that the gradation cannot be precisely judged. In contrast, fewer gradation steps are preferable for the user's judgement; however, in this case, precise judgement cannot be made by the image reading means. Meanwhile, according to the above method, the first image is larger than the second image in the number of gradation steps, so that more precise judgement can be made on the gradation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus comprising:
    an image forming section for forming a pattern chart having a plurality of gradation patterns aligned thereon so as to suppress an uneven concentration appearing depending upon a scale of an electrostatic potential difference on the gradation patterns which are adjacent to each other in a sub-scanning direction of image formation,
    an image reading section for reading image information from said pattern chart, and
    an image processing section for adjusting an image forming condition based on the image information;
    wherein said image forming section forms a dummy pattern which is adjacent to a gradation pattern at an end in the sub-scanning direction of said pattern chart and which is equal or close to said end gradation pattern in concentration.

2. The image forming apparatus as defined in claim 1, wherein said image forming section forms said pattern chart such that a plurality of the gradation patterns have concentrations arranged in a staggered configuration.

3. The image forming apparatus as defined in claim 1, wherein said image forming section forms said pattern chart such that the gradation patterns adjacent to each other in the sub-scanning direction are brought into contact with each other.

4. The image forming apparatus as defined in claim 1, wherein a main scanning direction of image formation is perpendicular to the sub-scanning direction, and said image forming section forms said pattern chart such that a plurality of said gradation patterns are aligned in increasing order of concentration from an end to the other end of said pattern chart.

5. The image forming apparatus as defined in claim 4, wherein said image forming section forms said pattern chart such that said gradation patterns are aligned in increasing order of concentration from an end to the other end of said pattern chart.

6. The image forming apparatus as defined in claim 1, wherein said image processing section processes the image information read by said image reading section, with reference to a color of a base of said pattern chart, and said image processing section adjusts the image forming condition based on the processed image information.

7. The image forming apparatus as defined in claim 6, wherein said image reading section performs a readout-reducing operation so as to obtain a base concentration as an output value of said image reading section when reading a base concentration of said pattern chart.

8. An image forming apparatus, comprising:
   image forming means for forming an image on a recording member by forming an electrostatic latent image on a light sensitive element based on first image information;
   image information input means for inputting second image information obtained based on the image formed on the recording member, and
   image processing means which processes the second image information and adjusts an image forming condition when the image is a pattern chart having different gradation patterns aligned thereon,
   wherein when said image forming means forms said pattern chart, said pattern chart is formed so as to prevent an intensified electric field caused by a potential difference at a boundary of an electrostatic latent image on the gradation patterns which are adjacent to each other in a sub-scanning direction of said image forming means; and
   wherein said image forming means forms a dummy pattern which is adjacent to a gradation pattern at an end in the sub-scanning direction of said pattern chart and which is equal or close to said end gradation pattern in concentration.

9. The image forming apparatus as defined in claim 8, wherein said image forming means forms said pattern chart such that the gradation patterns adjacent to each other in the sub-scanning direction of said image forming means are brought into contact with each other.

10. The image forming apparatus as defined in claim 8, wherein said image forming means forms said pattern chart such that said gradation patterns are aligned in increasing order of concentration in a sub-scanning direction of said image forming means and a plurality of said gradation patterns with closest concentrations are aligned in a main scanning direction.

11. An image forming apparatus, comprising:
   image forming means for forming an image on a recording member based on first image information,
   image reading means for reading the image formed on the recording member as second image information, and
   image processing means which processes the second image information and adjusts an image forming condition when the image is a pattern chart having different gradation patterns aligned thereon,
   wherein said image processing means performs image processing on the second image information and adjusts an image forming condition with reference to a base color of the recording member having said pattern chart formed thereon; and
   wherein said image forming means forms a dummy pattern which is adjacent to a gradation pattern at an end in the sub-scanning direction of said pattern chart and is equal or close to said end gradation pattern in concentration.

12. The image forming apparatus as defined in claim 11, wherein said image processing means reduces the quantity of light emitted to said pattern chart when said image reading means reads said pattern chart, or said image processing means performs image processing on the second image information according to a readout value obtained by reducing a readout gain of said image reading means.

* * * * *